US008582543B2

(12) United States Patent
Nakamura et al.

(10) Patent No.: US 8,582,543 B2
(45) Date of Patent: Nov. 12, 2013

(54) WIRELESS COMMUNICATION DEVICE AND ACCESS POINT CONNECTION METHOD

(75) Inventors: Koji Nakamura, Kanagawa (JP); Toshio Oka, Kanagawa (JP); Hirokazu Kobayashi, Tokyo (JP); Satoshi Senga, Aichi (JP)

(73) Assignee: Panasonic Corporation, Osaka (JP)

( * ) Notice: Subject to any disclaimer, the term of this patent is extended or adjusted under 35 U.S.C. 154(b) by 1094 days.

(21) Appl. No.: 12/531,148

(22) PCT Filed: Mar. 17, 2008

(86) PCT No.: PCT/JP2008/000618
§ 371 (c)(1),
(2), (4) Date: Sep. 14, 2009

(87) PCT Pub. No.: WO2008/111319
PCT Pub. Date: Sep. 18, 2008

(65) Prior Publication Data
US 2010/0111057 A1 May 6, 2010

(30) Foreign Application Priority Data

Mar. 15, 2007 (JP) ................................. 2007-067639

(51) Int. Cl.
*H04W 4/00* (2009.01)
*H04B 7/00* (2006.01)

(52) U.S. Cl.
USPC ............................ 370/338; 370/328; 370/310

(58) Field of Classification Search
USPC ........................................................ 370/338
See application file for complete search history.

(56) References Cited

U.S. PATENT DOCUMENTS 7,903,620 B2   3/2011   Rudolf et al.

2005/0053043 A1   3/2005   Rudolf et al.
2006/0193287 A1   8/2006   Ooshima et al.
2006/0234655 A1   10/2006   Ikedo
2007/0230423 A1   10/2007   Yoshida et al.

(Continued)

FOREIGN PATENT DOCUMENTS

JP   2004-297482   10/2004
JP   2004-343458   12/2004

(Continued)

OTHER PUBLICATIONS

English language Abstract of JP 2006-270614, Oct. 5, 2006.

(Continued)

*Primary Examiner* — Shripal Khajuria
(74) *Attorney, Agent, or Firm* — Greenblum & Bernstein, P.L.C.

(57) ABSTRACT

A wireless communication device is quickly connectable to an access point of a destination service area without wasting power when the wireless communication device moves from a service area to a different one. When a state change detector of the wireless communication device detects that the received radio field intensity of the radio wave from the connected access point lowers to a threshold or less, a service area information acquirer acquires information on the service area where the wireless communication device is present and information on a neighboring service area. A profile information acquirer acquires profile information corresponding to the service area information. A priority order setter sets the order of priority to the acquired profile information in such a way that the access point of a neighboring service area neighboring to the service area formed by the connected access point is precedingly connected. According to the profile information to which orders of priority are set, a request for connection to the access point is made.

9 Claims, 32 Drawing Sheets

(56) References Cited

U.S. PATENT DOCUMENTS

| | | |
|---|---|---|
| 2008/0260069 A1 | 10/2008 | Murakami et al. |
| 2008/0274709 A1 | 11/2008 | Goto |
| 2008/0317148 A1 | 12/2008 | Murakami et al. |
| 2011/0149867 A1 | 6/2011 | Rudolf et al. |

FOREIGN PATENT DOCUMENTS

| | | |
|---|---|---|
| JP | 2005-39571 | 2/2005 |
| JP | 2006-510271 | 3/2006 |
| JP | 2006-236236 | 9/2006 |
| JP | 2006-270614 | 10/2006 |
| WO | 2005/011134 | 2/2005 |

OTHER PUBLICATIONS

English language Abstract of JP 2004-297482, Oct. 21, 2004.
English language Abstract of JP 2006-236236, Sep. 7, 2006.
English language Abstract of JP 2004-343458, Dec. 2, 2004.
English language Abstract of JP 2005-39571, Feb. 10, 2005.
Japan Office action, mail date is Apr. 10, 2012.

SSID : service_AreaE11
WEP KEY: jeoiuoitlkj22
IP_Addr:132.186.2.22
— P31

SSID : Service_AreaE12
WEP KEY:klaujoeiu93
IP_Addr:192.168.0.2
— P32

SSID : Service_AreaE14
WEP KEY:koitoiroiiuo2
IP_Addr:10.68.36.22
— P34

FIG.10

```
                                                    300a
┌─────────────────────────────────────────────────┐
│ <Local service area>        : In Service_AreaE12│
│ <Adjacent service area(s)>  : Service_AreaE11   │
│                             : Service_AreaE13   │
│                             : Service_AreaE14   │
│ <Surrounding service area(s)> :                 │
└─────────────────────────────────────────────────┘
```

| <Access point information> | <Location information> |
|---|---|
| A34 | 0 |
| A35 | 1 |
| A36 | 2 |
| A33 | −1 |
| A32 | −2 |
| A31 | −3 |
| A30 | −4 |

<Connected access point>   : A34
<Adjacent access point(s)>  : A33,35
<Surrounding access point(s)> : A30,A31
                                A32,36

FIG.30B

WIRELESS COMMUNICATION DEVICE AND ACCESS POINT CONNECTION METHOD

TECHNICAL FIELD

The present invention relates to a wireless communication apparatus and access point connection method, and more particularly to a wireless communication apparatus and access point connection method that enable radio connection to a suitable access point when a user moves between different service areas.

BACKGROUND ART

Heretofore, a method has been proposed whereby, in a wireless LAN communication system, a wireless communication apparatus in a fixed service area selects and connects to a suitable access point from among a plurality of access points, as shown in Patent Document 1, for example.

In this method, a wireless communication apparatus first executes a probe request that does not specify an SSID (Service Set Identifier) using a wireless LAN interface, and searches for the presence of an access point in the surrounding region. Next, the wireless communication apparatus acquires the received radio field intensity of all access points that return an SSID, and manages information associating a received radio field intensity with an SSID as profile information. Lastly, the wireless communication apparatus reads profile information storing SSIDs in order of priority, and performs connection to an access point whose received radio field intensity exceeds a threshold value from among access points identified by an SSID. By performing these processes, a wireless communication apparatus can quickly and easily connect to an access point having a good connection state within a fixed service area.

Patent Document 1: Japanese Patent Application Laid-Open No. 2005-39571

DISCLOSURE OF INVENTION

Problems to be Solved by the Invention

In a conventional wireless LAN communication system, when a wireless communication apparatus moves between different service areas, and enters a service area having a different provision source, it is impossible for the wireless communication apparatus to connect to an access point using profile information (including an SSID, encryption method, IP address, and so forth) used up to that point.

In this situation, according to Patent Document 1, since the wireless communication apparatus attempts to perform connection by means of profile information of the service provision source to which it was connected up to that point, loss of connection occurs when the area changes due to movement. Also, although moving to an area different from the area in which service has been received up to that point makes it impossible to connect to an access point by means of currently held profile information, access point searching continues to be performed based on the held profile information, resulting in wasted power consumption.

The present invention has been implemented taking into account the problems described above, and it is an object of the present invention to provide a wireless communication apparatus and access point connection method that make it possible to connect quickly to an access point of a destination service area without wasting power when moving between different service areas.

Means for Solving the Problem

A wireless communication apparatus of the present invention employs a configuration having: a state change detection section that detects a change in the connection reception state of a signal from a connected access point; a profile information acquisition section that acquires profile information necessary for connecting to an access point forming a service area in which the wireless communication apparatus is currently located and a service area different from that service area in which the wireless communication apparatus is currently located, present in the neighborhood of the service area in which the wireless communication apparatus is currently located; a priority order setting section that performs priority order setting for profile information acquired from the profile information acquisition section in a service area in which the wireless communication apparatus is currently located as profile information indicating an access point that is the next connection destination; a priority profile information selection section that selects highest-priority profile information; and a connection section that, when a connection reception level lower than a fixed value is detected by the state change detection section, issues a connection request to an access point indicated by highest-priority profile information selected by the priority profile information selection section from priority-ordered profile information.

A wireless communication apparatus of the present invention employs a configuration having: a state change detection section that detects a change in the connection reception level of a signal from a connected access point; a profile information acquisition section that acquires profile information necessary for connecting to an access point forming a service area in which the wireless communication apparatus is currently located and a neighboring/surrounding-region service area different from that service area in which the wireless communication apparatus is currently located, present in the neighborhood of the service area in which the wireless communication apparatus is currently located; a priority order setting section that performs priority order setting in an order indicating an access point of a service area to be connected to next for acquired profile information of each service area in a service area in which the wireless communication apparatus is currently located; a priority profile information selection section that selects highest-priority profile information; and a connection section that, when the connection reception level is lower than a fixed value, issues a probe request to an access point indicated by highest-priority profile information selected by the priority profile information selection section from priority-ordered profile information, and performs control determining whether or not it is possible to connect to the access point that is the object of the probe request.

A wireless communication apparatus of the present invention employs a configuration having: a priority order setting section that performs priority order setting for profile information necessary for connecting to an access point forming a service area in which the wireless communication apparatus is currently located and a service area present in the neighborhood of the service area in which the wireless communication apparatus is currently located respectively; a received radio field intensity acquisition section that issues, to an access point indicated by highest-priority profile information, a probe request using that profile information, and performs received radio field intensity measurement from a response from the access point corresponding to the probe request; and an access point connection determination section that determines whether or not it is possible to connect to a probe-request-destination access point using an acquired reception state, and if connection is possible, issues a connection request to the probe-request-destination access point.

An access point connection method of the present invention is an access point connection method of a wireless communication apparatus, and has: a state change detecting step of detecting a change in the connection reception state of a signal from a connected access point; a profile information acquiring step of acquiring profile information necessary for connecting to an access point forming a service area in which the wireless communication apparatus is currently located and a service area different from that service area in which the wireless communication apparatus is currently located, present in the neighborhood of the service area in which the wireless communication apparatus is currently located; a priority order setting step of performing priority order setting for profile information acquired by the profile information acquiring step in a service area in which the wireless communication apparatus is currently located as profile information indicating an access point that is the next connection destination; a priority profile information selecting step of selecting highest-priority profile information; and a connecting step of, when a connection reception level lower than a fixed value is detected by the state change detecting step, issuing a connection request to an access point indicated by highest-priority profile information selected by the priority profile information selecting step from priority-ordered profile information.

A base station apparatus of the present invention is a base station apparatus that serves as an access point connected to a wireless communication apparatus having an above-described configuration, and employs a configuration having: a service area information request receiving section that receives a service area information acquisition request from the service area information acquisition section of the wireless communication apparatus; and a transmitting section that receives a service area information request, and transmits to the wireless communication apparatus that issued the service area information request service area information indicating access points forming a service area in which that wireless communication apparatus is currently located and a neighboring service area different from that service area in which the wireless communication apparatus is currently located.

Advantageous Effects of Invention

The present invention makes it possible to connect to an access point quickly when entering a different service area while moving, and enables power consumption to be reduced.

BRIEF DESCRIPTION OF DRAWINGS

FIG. 10 is a drawing showing an example of profile information read from a nonvolatile storage section by a profile information acquisition section;

FIG. 17 is a drawing showing an example of service area information acquired from an access point;

FIG. 30 is a drawing showing examples of service area information acquired from an access point;

BEST MODE FOR CARRYING OUT THE INVENTION

Now, embodiments of the present invention will be described in detail with reference to the accompanying drawings. The embodiments shown below are examples, and their system configurations and function block configurations are not limited.

In the embodiments, by connecting to access points forming different service areas in a wireless communication system using profile information (including an SSID, encryption method, IP address, and so forth), a wireless communication apparatus receives provision of service from the respective access points. Here, different service areas are assumed to be service areas for which profile information necessary for access point connection is not held by a wireless communication apparatus. In other words, different service areas are assumed to be service areas to which connection is not possible by means of profile information utilized in the service area in which a wireless communication apparatus is located. A plurality of service areas in a wireless communication system of the embodiments are assumed, for example, to offer the same kind of service (for instance, Internet connection service), but to be composed of service areas with different service provision sources (administrators), and so forth.

Embodiment 1

Figure 1:
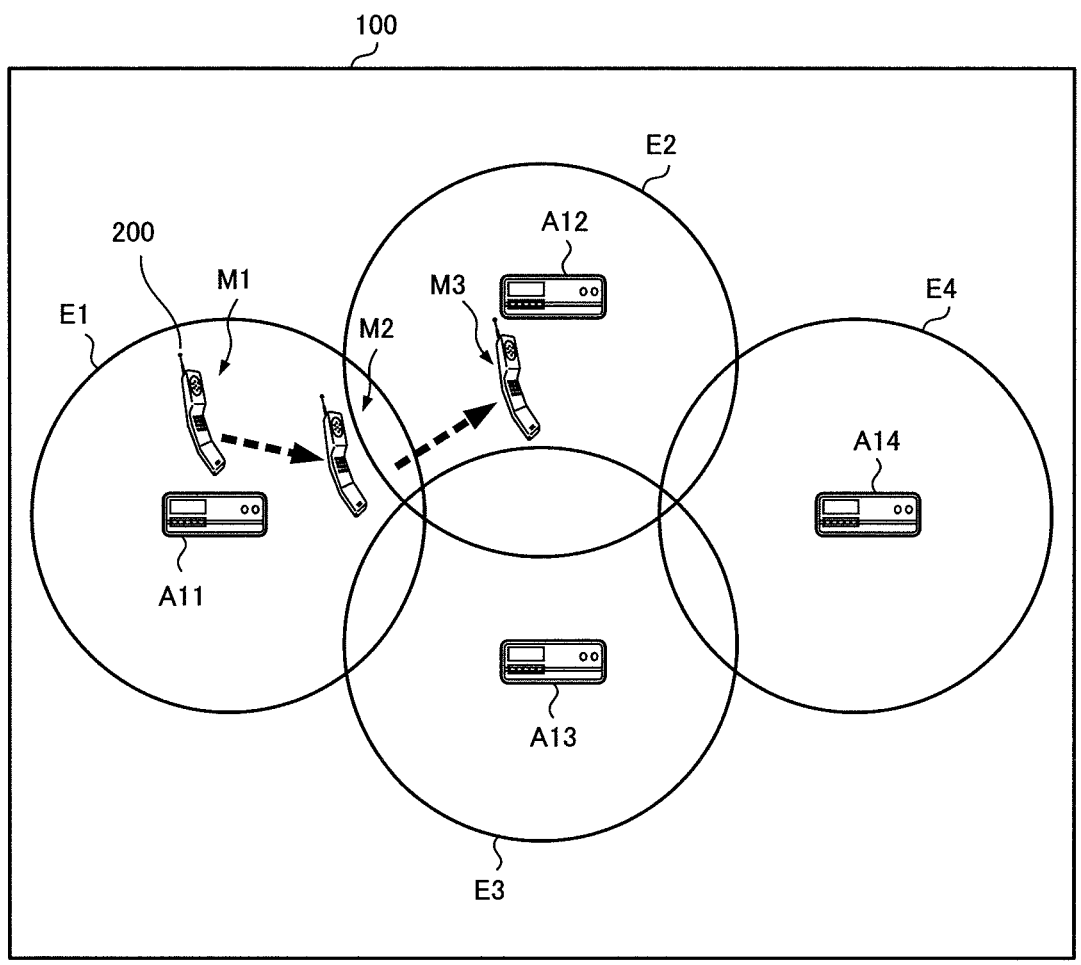
FIG. 1 is a conceptual diagram showing a configuration of a wireless communication system having a wireless communication apparatus according to Embodiment 1 of the present invention.

FIG. 1 is a conceptual diagram showing a configuration of a wireless communication system having a wireless communication apparatus according to Embodiment 1 of the present invention. Wireless communication system 100 shown in FIG. 1 comprises wireless communication apparatus 200, access point A11, and access points A12 through A14.

Wireless communication apparatus 200 is located in service area E1 formed by access point A11. Service areas E2 and E3, formed by access points A12 and A13 respectively, are different service areas adjacent to service area E1, and service area E4, formed by access point A14, is a different service area adjacent to service areas E2 and E3.

It is assumed that access points A11 through A14 formed by service areas E1 through E4 can all communicate with wireless communication apparatus 200, and can respond to a probe request or connection request from wireless communication apparatus 200, and provide service. Access points A11 through A14 each have a service area information request receiving section that receives a service area information acquisition request from wireless communication apparatus 200, and a neighboring connection information reporting section that reports to wireless communication apparatus 200 issuing a service area information acquisition request service area information indicating access points forming the service area in which that wireless communication apparatus 200 is currently located and a neighboring service area different from the service area in which that wireless communication apparatus 200 is currently located.

Figure 2:
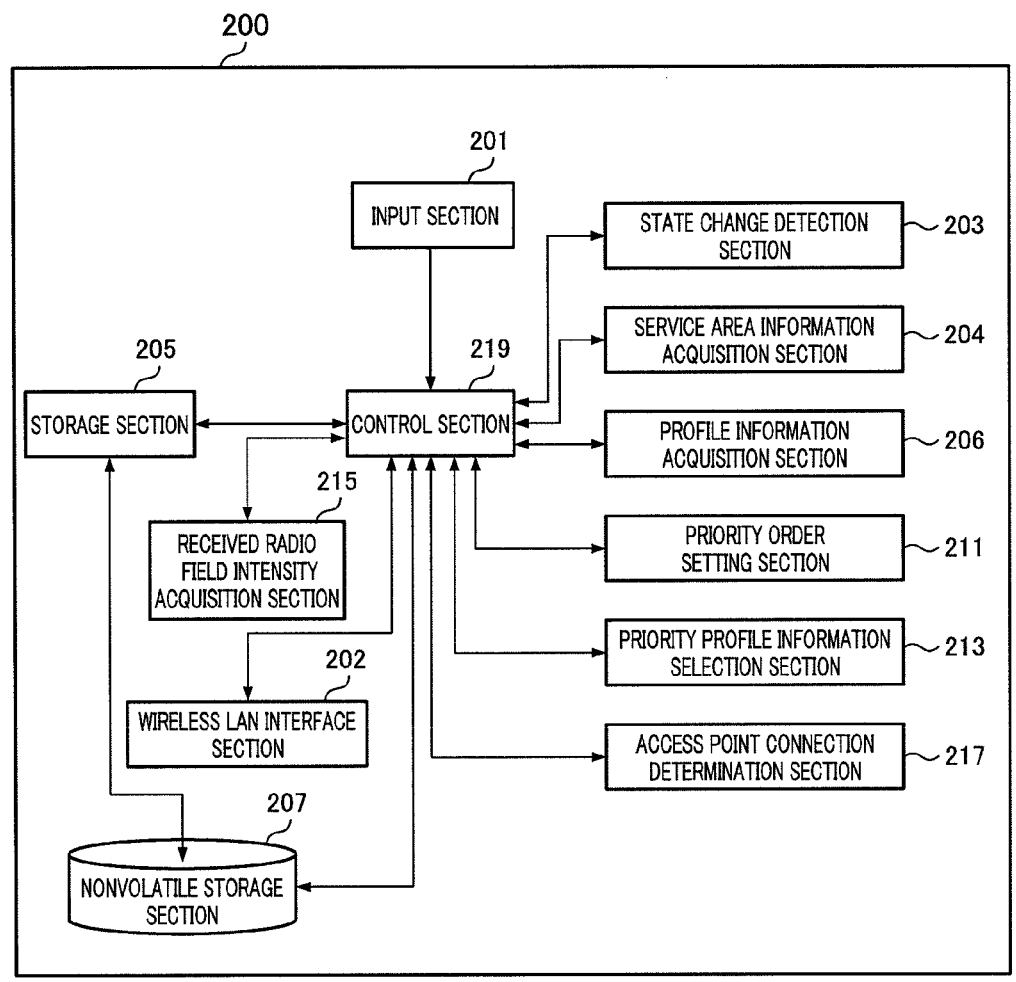
FIG. 2 is a function block diagram showing a principal-part configuration of a wireless communication apparatus that is a main configuration element of a wireless communication system according to the present invention.

FIG. 2 is a function block diagram showing a principal-part configuration of wireless communication apparatus 200 that is a main configuration element of wireless communication system 100 according to the present invention.

Wireless communication apparatus 200 shown in FIG. 2 has input section 201, wireless LAN interface section 202, state change detection section 203, service area information acquisition section 204, storage section 205, profile information acquisition section 206, nonvolatile storage section 207, priority order setting section 211, priority profile information selection section 213, received radio field intensity acquisition section 215, access point connection determination section 217, and control section 219.

In wireless communication apparatus 200, sections such as input section 201, wireless LAN interface section 202, state change detection section 203, service area information acquisition section 204, storage section 205, profile information acquisition section 206, nonvolatile storage section 207, priority order setting section 211, priority profile information selection section 213, received radio field intensity acquisition section 215, access point connection determination section 217, and control section 219, are typically implemented by means of LSI (Large Scale Integration), comprising integrated circuits.

These sections may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used. Furthermore, integration of sections 201 through 207, 211, 213, 215, and 219 may be performed by means of an integrated circuit implementation technology whereby LSI is replaced by a different technology as an advance in, or derivation from, semiconductor technology. For example, integration may be performed by the application of biotechnology.

Input section 201 receives user operation input via an operating key or the like, for example, which is output to control section 219 and performs various kinds of operations in wireless communication apparatus 200. For example, a communication application initiation start request is output to state change detection section 203 via control section 219.

Wireless LAN interface section 202 performs signal transmission/reception to/from an access point forming a service area.

State change detection section 203 detects a change in the usage state of wireless communication apparatus 200 itself using information input via control section 219, and outputs this to control section 219.

Specifically, state change detection section 203 detects a communication application initiation directive input by a user via input section 201 as a state change of wireless communication apparatus 200 itself, and outputs this to received radio field intensity acquisition section 215 via control section 219.

State change detection section 203 also determines the reception level of a beacon (signal) from an access point forming the service area in which wireless communication apparatus 200 is located, which is input via wireless LAN interface section 202 and control section 219.

Determination of the reception level of a beacon by state change detection section 203 is performed, for example, by comparing the reception level of the received beacon with a preset threshold value. If the reception level is higher than that threshold value, wireless LAN interface section 202 is instructed via control section 219 to continue connection to the currently connected access point, whereas if the reception level is lower than or equal to the threshold value, this fact is reported to service area information acquisition section 204 via control section 219.

Based on state change information detected by wireless LAN interface section 202, service area information acquisition section 204 outputs to wireless LAN interface section 202 a service area information acquisition request for the access point forming the connected service area.

Specifically, in accordance with state change information indicating that the reception level is lower than or equal to the threshold value, input from state change detection section 203 via control section 219, service area information acquisition section 204 issues a service area information acquisition request for an access point forming the service area in which wireless communication apparatus 200 is located, and thereby acquires this information.

That is to say, service area information transmitted from the access point by means of the access point response to this acquisition request is output from wireless LAN interface section 202 to control section 219, and the acquired service area information is stored in storage section 205.

If profile information indicating information on access points dispersed among service areas has been added to this acquired service area information, service area information acquisition section 204 outputs a setting processing request signal to priority order setting section 211 via control section 219. Acquired profile information is stored in storage section 205 together with acquired service area information.

If a priority order has been set in advance in profile information added to service area information, service area information acquisition section 204 outputs a selection processing request signal to priority profile information selection section 213 via control section 219.

Storage section 205 stores information input/output via control section 219. Below, input/output of information between sections via control section 219 may also be described as input/output between sections.

Specifically, storage section 205 stores service area information acquired by service area information acquisition section 204 via control section 219, and service area (to be precise, access point) profile information from nonvolatile storage section 207. If profile information or already priority-ordered profile information has been added to service area information acquired by service area information acquisition section 204, the profile information or already priority-ordered profile information is also stored together with the service area information.

Storage section 205 also stores the radio field intensity of a signal measured by received radio field intensity acquisition section 215, and correspondence information of the SSID of that signal.

In addition, storage section 205 stores profile information priority-ordered by priority order setting section 211 using a list structure, for example, and in a management format enabling access in order of priority from high-priority profile information P22.

The data structure of service area information stored in storage section 205 will now be described.

Figure 3:
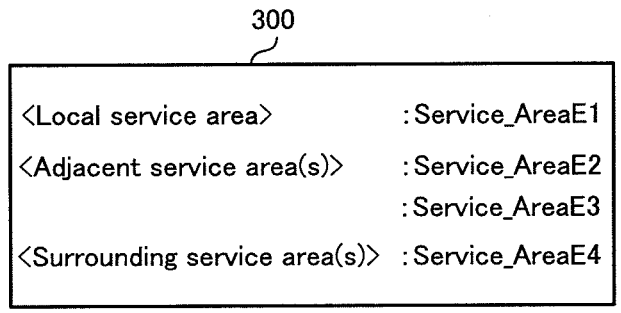
FIG. 3 is a drawing showing an example of service area information acquired from an access point.

FIG. 3 is a drawing showing an example of service area information acquired from an access point. Acquired service area information 300 has a text-based configuration in this embodiment, and here includes three kinds of information: <Local service area>, <Adjacent service area(s)>, and <Surrounding service area(s)>.

In the service area information, <Local service area> indicates a service area provided by the currently connected access point, <Adjacent service area(s)> indicates a service area or service areas adjacent to the currently connected access point, and <Surrounding service area(s)> indicates a service area or service areas located in the surrounding region.

<Adjacent service area(s)> and <Surrounding service area(s)> shown in FIG. 3 indicate service areas present in the neighborhood of <Local service area>.

Service area information 300 shown in FIG. 3 indicates that the connected access point provides service area E1 to which wireless communication apparatus 200 currently belongs (the local service area). Service area information 300 also indicates that service areas adjacent to this service area E1 are E2 and E3, and a service area located in the region surrounding service area E1 is E4. In this embodiment, service area information has a text-based configuration, but the present invention is not limited to this, and service area information may also be configured using MAP information.

Using stored service area information (here, service area E1, E2, E3, and E4 information), profile information acquisition section 206 acquires profile information (for example, profile information P22, P23, and P24) corresponding to the service areas indicated by these items of service area information.

Profile information corresponding to a service area is synonymous with information on an access point forming a service area, and is used when connecting to an access point.

In this embodiment, profile information acquisition section 206 acquires service area information acquired by service area information acquisition section 204 from storage section 205, uses this to read profile information of an access point corresponding to a service area indicated by service area information from nonvolatile storage section 207, and stores this profile information in storage section 205.

When storing profile information (for example, profile information P22, P23, and P24) in storage section 205, profile information acquisition section 206 outputs a report to that effect to priority order setting section 211 via control section 219.

Nonvolatile storage section 207 is a section that stores service area related profile information that can be read via control section 219, and in this embodiment stores this information in advance.

Profile information includes information for each access point forming a service area, including, for example, identification information (an SSID) for identifying an access point providing service, key information (for example, a WEP (Wired Equivalent Privacy) KEY) required in an encryption method and encryption, information (an IP address) necessary for connecting to an access point, and so forth.

Figure 4:
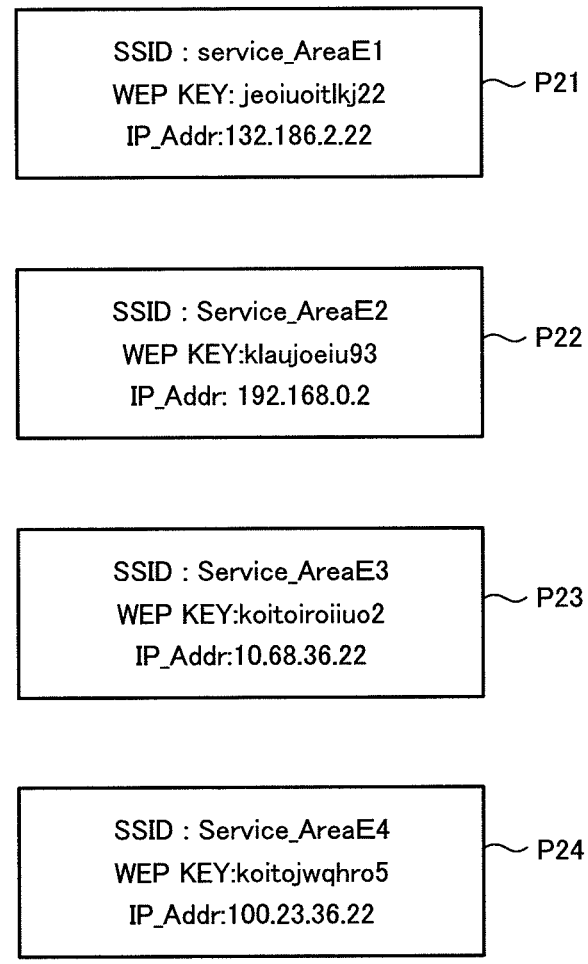
FIG. 4 is a drawing showing an example of profile information stored in a nonvolatile storage section.

FIG. 4 is a drawing showing an example of profile information stored in nonvolatile storage section 207.

The profile information shown in FIG. 4 has a text-based structure, for example, and service area E1, E2, E3, and E4 information is indicated by profile information P21, P22, P23, and P24, respectively.

For example, in FIG. 4, service area E1 profile information P21 includes "service_AreaE1" as an SSID for identifying an access point providing service, "jeoiuoitlkj22" as WEP KEY information required in an encryption method and encryption, and "132.186.2.22" as an IP address (IP_Addr) necessary for connecting to an access point. Similarly, service area E2 profile information P22 includes "SSID: Service_AreaE2", "WEP KEY: klaujoeiu93", and "IP_Addr: 192.168.0.2"; service area E3 profile information P23 includes "SSID: Service_AreaE3", "WEP KEY: koitoiroiiuo2", and "IP_Addr: 10.68.36.22"; and service area E4 profile information P24 includes "SSID: Service_AreaE4", "WEP KEY: koitojwqhro5", and "IP_Addr: 100.23.36.22."

Priority order setting section 211 receives input from service area information acquisition section 204 or profile information acquisition section 206, sets a priority order as information used when connecting for profile information (for example, P21 through P24) relating to access points (for example, A11 through A14) present in service areas (for example, service areas E1 through E4) from information acquired by service area information acquisition section 204 and information acquired by profile information acquisition section 206, and stores profile information (for example, P21 through P24) in storage section 205 in the set priority order. When profile information (for example, P21 through P24) is stored in storage section 205 in the set order, control section 219 outputs information indicating that profile information (for example, P21 through P24) has been stored to priority profile information selection section 213.

The priority order set by priority order setting section 211 is assigned by priority order setting section 211 in order from profile information having a high possibility of being selected in the course of moving from the current location to the next destination service area.

That is to say, using received radio field intensity from the connected access point and service area information from the connected access point, priority order setting section 211 sets the priorities of service areas to be connected (specifically, connection-destination access points) in order of probable satisfactoriness of the connection state, and sorts profile information into a priority order accordingly.

Here, if received radio field intensity from the connected access point becomes low, sorting is performed based on service area information and profile information so that profile information of an access point forming another service area near the local service area (the service area to which wireless communication apparatus 200 belongs) has the highest priority.

When priorities are assigned, if proximity to the local service area is of the same order for target service areas, priority order setting section 211 performs priority order setting for profile information of access points in these target service areas randomly.

For example, if wireless communication apparatus 200 is located in service area E1 and is moving toward the edge of service area E1, since service areas E2 and E3 are adjacent to service area E1, profile information P22 and profile information P23 are set as high-priority profile information.

Regarding the priority order setting of profile information P22 and P23 at this time, it can be determined that there is the same degree of possibility of moving to service areas E2 and E3 formed by access points set in profile information P22 and P23 based on currently acquired information.

In this case, one possible option is to set the priority order randomly, for example. That is to say, priority order setting section 211 performs priority order setting randomly for profile information P21 through P23, sets profile information P22 as highest-priority profile information, and sets profile information P23 as second-highest-priority profile information. Then priority order setting section 211 sets profile information P24 located in the surrounding region as high-priority profile information.

Profile information P21 in which currently connected access point information is included may indicate that received radio field intensity has become low due to movement and the user is preparing to leave service area E1, and it can be determined that the possibility of subsequent use is low. Therefore, priority order setting section 211 performs priority order setting of profile information P21 as lowest-priority profile information. As a result, priorities are set in the following order: profile information P22, P23, P24, P21. The priorities of profile information P21 through P24 are sorted according to this decision.

Figure 5:
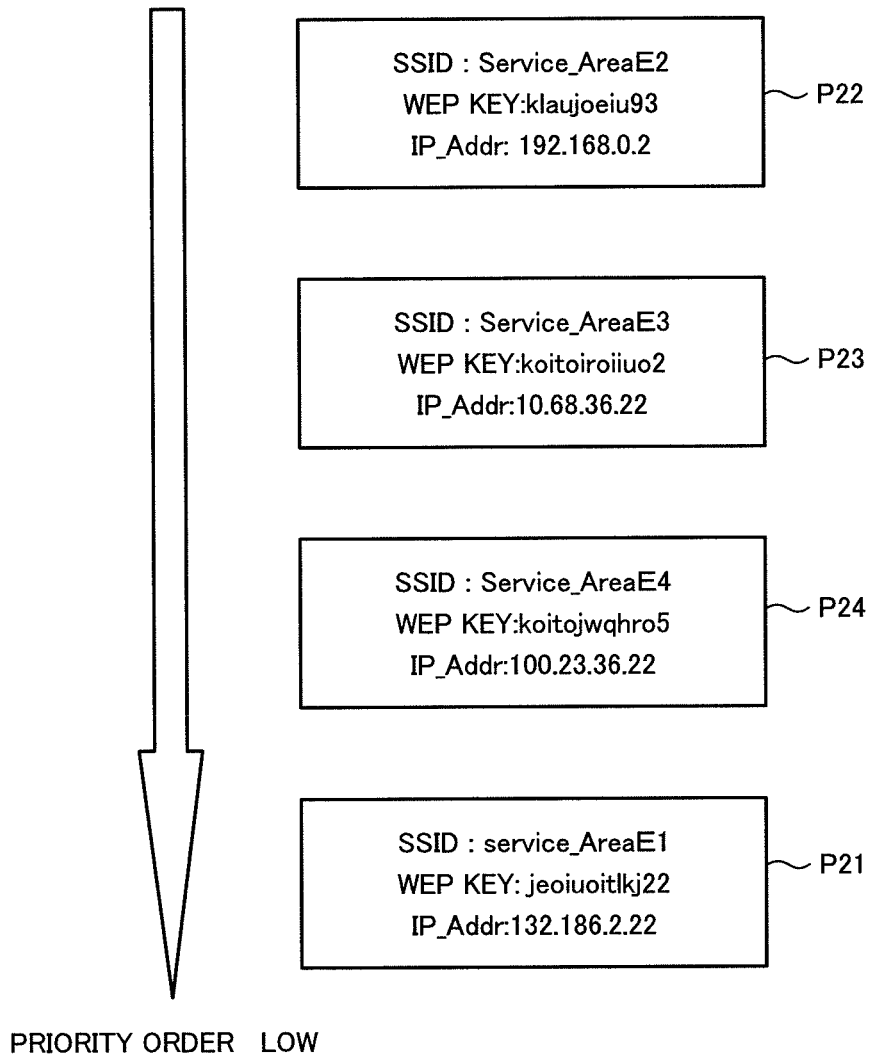
FIG. 5 is a drawing showing an example of a state in which a priority order is set for profile information by a priority order setting section, and the profile information is sorted in that order.

FIG. 5 is a drawing showing an example of a state in which priorities are set for profile information by priority order setting section 211, and the profile information is sorted in that order.

As shown in FIG. 5, profile information P22 associated with service area E2 access point A12 is sorted and managed by priority order setting section 211 as highest-priority profile information. Profile information P23 associated with service area E3 access point A13 is managed as next-highest-priority profile information after this profile information P22.

Profile information P21 through P24 is managed using a list structure, for example, and is stored in storage section 205 using a management format that enables access in order of priority from high-priority profile information P22.

In accordance with information from control section 219 indicating that profile information P21 through P24 has been stored, priority profile information selection section 213 selects the highest-priority profile information for the current location of wireless communication apparatus 200, and reads this from storage section 205.

In accordance with input of a selection processing request signal from service area information acquisition section 204, priority profile information selection section 213 selects the highest-priority profile information for the current location of wireless communication apparatus 200, and reads this from storage section 205.

After terminating read processing, priority profile information selection section 213 outputs a termination report to received radio field intensity acquisition section 215 via control section 219.

Received radio field intensity acquisition section 215 measures the radio field intensity of a signal from a predetermined access point, and stores the measured radio field intensity and correspondence information of the SSID of the received signal in storage section 205 via control section 219.

To be specific, when communication application initiation start information is input as state change information of wireless communication apparatus 200 itself from state change detection section 203 via control section 219, received radio field intensity acquisition section 215 makes a report to wireless LAN interface section 202 via control section 219 to have a probe request issued that does not specify an SSID.

When a response from an access point that received the probe request is reported to wireless LAN interface section 202, and to received radio field intensity acquisition section 215 via control section 219, received radio field intensity acquisition section 215 measures the radio field intensity of the signal at that time, stores the measured received radio field intensity in storage section 205 together with SSID correspondence information via control section 219, and also outputs the measured radio field intensity to access point connection determination section 217.

Also, received radio field intensity acquisition section 215 receives a profile information read termination report from priority profile information selection section 213, and issues a probe request to an access point indicated by an SSID that is access point information set in profile information (for example, P22) selected as priority profile information.

Using received radio field intensity measured by received radio field intensity acquisition section 215 input via control section 219, access point connection determination section 217 determines whether or not it is possible to connect to the access point that transmitted the signal corresponding to that received radio field intensity. Based on the result of this determination, access point connection determination section 217 issues to wireless LAN interface section 202, via control section 219, a request for connection to the access point corresponding to the profile information selected by priority profile information selection section 213. Alternatively, based on the above determination result, access point connection determination section 217 issues a selection request to priority profile information selection section 213 via control section 219 to select the next-highest-priority profile information.

Specifically, access point connection determination section 217 evokes information holding an SSID corresponding to an access point that transmitted a signal corresponding to input received radio field intensity in order from storage section 205, and if that radio field intensity exceeds a threshold value, issues a connection request to the access point corresponding to the evoked information. If the threshold value is not exceeded, access point connection determination section 217 references information of another access point that returned an SSID, and determines whether or not that value exceeds the threshold value. When issuing a connection request to an access point via control section 219, access point connection determination section 217 references profile information including key information necessary for an encryption method and encryption, an IP address necessary for connecting to the access point, and the like, reported from the access point following the probe request, and identifies a connection-destination access point.

Control section 219 controls input/output of signals among input section 201, wireless LAN interface section 202, state change detection section 203, service area information acquisition section 204, storage section 205, profile information acquisition section 206, nonvolatile storage section 207, priority order setting section 211, priority profile information selection section 213, received radio field intensity acquisition section 215, access point connection determination section 217, and control section 219.

By controlling sections 202, 203, 204, 206, 211, 213, 215, 217, and so forth, control section 219 issues an acquisition request to an access point for information on a service area present in the neighborhood according to the situation where wireless communication apparatus 200 is located, and performs priority order setting of profile information referenced based on information reported from an access point. By means of this priority order setting, wireless communication apparatus 200 selects on a priority basis profile information of an access point forming a service area having a high possibility of being moved to next, and performs control for issuing a connection request.

Next, access point connection processing by wireless communication apparatus 200 of this embodiment will be described.

Figure 6:
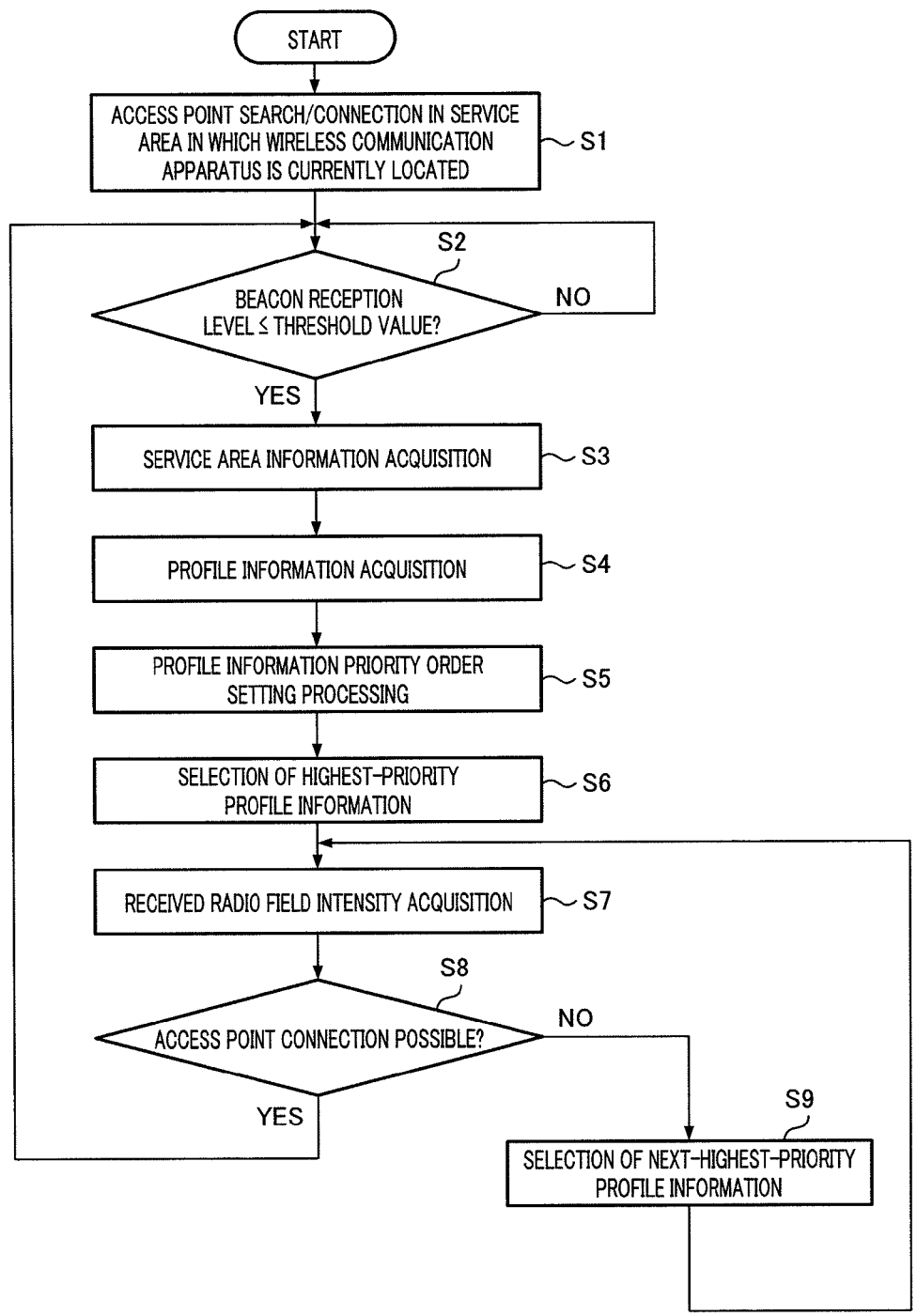
FIG. 6 is a flowchart for explaining access point connection processing executed by a wireless communication apparatus according to the present invention.

FIG. 6 is a flowchart for explaining access point connection processing executed by wireless communication apparatus 200 according to the present invention.

Wireless communication apparatus 200 repeatedly performs the processing in steps S1 through S9 shown in FIG. 6.

Here, access point connection processing by wireless communication apparatus 200 will be described with reference to FIG. 6, assuming that wireless communication apparatus 200 moves to points M1, M2, and M3 in that order in the directions indicated by the arrows between different service areas E1 and E2 in wireless communication system 100 shown in FIG. 1.

FIG. 1 shows that wireless communication apparatus 200 located at point M1 moves within service area E1, becoming located in the neighborhood of service areas E2 and E3. FIG. 1 also shows a state in which wireless communication apparatus 200 located at point M3 has moved completely inside service area E2.

First, assume that wireless communication apparatus 200 is located at point M1 in FIG. 1. When input for communication application initiation is reported from the user to control section 219 via input section 201 in wireless communication apparatus 200 located at this point M1, control section 219 performs communication application initiation. At this time, application initiation is reported to state change detection section 203.

When application initiation is detected by state change detection section 203 in wireless communication apparatus 200, information indicating this is reported to received radio field intensity acquisition section 215 via control section 219.

On receiving this application initiation report, received radio field intensity acquisition section 215 reports to wireless LAN interface section 202 via control section 219 so as to issue a probe request that does not specify an SSID.

In wireless communication system 100, an access point that receives a probe request from wireless communication apparatus 200 located at point M1 (in FIG. 1, access point A11, since wireless communication apparatus 200 is within service area E1) transmits SSID information to wireless communication apparatus 200.

Wireless communication apparatus 200 receives SSID information transmitted by the access point in wireless LAN interface section 202, and reports (outputs) this to received radio field intensity acquisition section 215 via control section 219. At this time, received radio field intensity acquisition section 215 measures the radio field intensity of the input SSID information, and stores the measured received radio field intensity and SSID correspondence information in storage section 205.

Using this information stored in storage section 205, wireless communication apparatus 200 searches for and connects to an access point in the service area in which it (wireless communication apparatus 200) is currently located (step S1).

Specifically, in wireless communication apparatus 200, access point connection determination section 217 evokes information holding an SSID in order from storage section 205, and if the corresponding radio field intensity exceeds a threshold value, issues a connection request to that access point. If the threshold value is not exceeded, access point connection determination section 217 references information of another access point that transmitted an SSID, and determines whether or not that value exceeds the threshold value. When issuing a connection request to an access point, access point connection determination section 217 references profile information including key information necessary for an encryption method and encryption, an IP address necessary for connecting to the access point, and the like, reported from the access point following the probe request. Referencing this profile information makes it possible to identify an access point to be connected to.

In FIG. 1, wireless communication apparatus 200 located at point M1 is located within service area E1, and therefore connects to access point A11 using the IP address of profile information P21 (see FIG. 4).

Received radio field intensity acquisition section 215 of wireless communication apparatus 200 determines whether or not a beacon transmitted from the connection-destination access point (here, access point A11) is lower than or equal to a threshold value (step S2). If the beacon is lower than or equal to the threshold value in step S2 the processing flow proceeds to step S3, whereas if the beacon exceeds the threshold value the processing in step S2 is repeated.

For example, if the beacon exceeds the threshold value in step S2 and wireless communication apparatus 200 repeats the processing in step S2, it is assumed that wireless communication apparatus 200 is at a location at which the access point A11 connection state is good within service area E1, such as at point M1 in wireless communication system 100 shown in FIG. 1.

On the other hand, if the beacon from the access point is lower than or equal to the threshold value in step S2, a case is assumed in which wireless communication apparatus 200 moves within service area E1 shown in FIG. 1, and is located near the edge of the service area formed by the connection-destination access point, such as a situation in which wireless communication apparatus 200 is located in the neighborhood of service areas E2 and E3.

Specifically, in step S2, for example, state change detection section 203 of wireless communication apparatus 200 receives a beacon reported from access point A11 forming service area E1 in which wireless communication apparatus 200 is located, via wireless LAN interface section 202 and control section 219, and determines whether or not the reception level is lower than or equal to a threshold value. If the reception level is detected to be lower than or equal to the threshold value, this is reported to control section 219. If the reception level exceeds the threshold value, connection to currently connected access point A11 is continued.

If wireless communication apparatus 200 changes its service provision access point, such as when moving out of the service provision range in the service area to which it actually belongs (is connected), wireless communication apparatus 200 acquires service area information from the service provision access point (step S3). Each access point has a service area information request receiving section that receives a service area information acquisition request from wireless communication apparatus 200, and a neighboring connection information reporting section that receives a service area information request and reports, to wireless communication apparatus 200 that issued the service area information request, service area information indicating access points forming the service area in which that wireless communication apparatus 200 is currently located and a neighboring service area different from the service area in which that wireless communication apparatus 200 is currently located. By means of this configuration, an access point, on receiving a service area information request from wireless communication apparatus 200 by means of the service area information request receiving section, reads service area information indicating access points forming the service area in which the relevant wireless communication apparatus 200 is currently located and a neighboring service area different from the service area in which wireless communication apparatus 200 is currently located, and transmits this information to wireless communication apparatus 200 that issued the service area information request via the neighboring connection information reporting section. By this means, wireless communication apparatus 200 acquires service area information via wireless LAN interface section 202.

In step S3, as timing at which wireless communication apparatus 200 acquires profile information from a connection-destination access point, a setting can be made using, for example, a communication state with respect to the access point forming the local service area (the service area to which wireless communication apparatus 200 belongs), or a positional relationship relative to that access point. Here, a case is described in which service area information acquisition is performed based on a determination using the reception level from the connected access point but the present invention is not limited to this, and, for example, service area information acquisition may also be performed using wireless communication apparatus 200 location information for wireless communication apparatus 200 itself. In this case, a function for positioning wireless communication apparatus (for example, a GPS apparatus) may be installed in wireless communication apparatus 200, and movement out of a service area may be determined using a positional relationship to the connected access point. Service area information acquisition may also be performed by means of user input via input section 201 so as to accept provision of service different from the service whose provision is being accepted.

Step S3 will now be described in detail as applied to a case in which wireless communication apparatus 200 is located at point M2.

Specifically, on being notified by state change detection section 203 via control section 219 that the reception level is lower than or equal to the threshold value, service area information acquisition section 204 issues a service area information acquisition request to the access point (for example, access point A11) forming the service area (for example, service area E1) in which wireless communication apparatus 200 is located.

An acquisition request by service area information acquisition section 204 is reported to wireless LAN interface section 202 via control section 219, and is transmitted to the access point (for example, access point A11).

The access point (for example, access point A11) responds to the acquisition request from wireless communication apparatus 200 by transmitting service area information 300 (see FIG. 3). The response from the access point is reported to control section 219 from wireless LAN interface section 202, and the acquired information (service area information 300 shown in FIG. 3) is stored in storage section 205.

If profile information indicating information on access points dispersed among service areas has been added to service area information transmitted from a connection-destination access point (for example, access point A11), acquired information (service area information 300 and profile information added thereto) is stored in storage section 205 via control section 219, and service area information acquisition section 204 reports a setting processing request signal—that is, a signal indicating that priority order setting processing is to be performed for the acquired profile information—to priority order setting section 211 via control section 219.

Next, using service area information acquired by wireless communication apparatus 200, profile information acquisition section 206 acquires profile information corresponding to the local service area, adjacent service area(s), and surrounding service area(s), respectively (step S4). Service areas adjacent to the service area to which wireless communication apparatus 200 belongs (the local service area), and surrounding service areas, are collectively referred to as neighboring service areas. That is to say, when service area information is acquired by service area information acquisition section 204, profile information acquisition section 206 reads profile information corresponding to neighboring service areas in acquired service area information from nonvolatile storage section 207, and stores this profile information in storage section 205.

Specifically, on receiving a report of service area E2, E3, and E4 information acquisition from service area information acquisition section 204 via control section 219, profile information acquisition section 206 references information on service areas E2, E3, and E4 stored in storage section 205, and on confirming that service areas present in the neighborhood are service areas E2, E3, and E4, performs reading of service area E2, E3, and E4 profile information P22, P23, and P24 (see FIG. 4) stored in advance in nonvolatile storage section 207, and stores this profile information in storage section 205. Profile information acquisition section 206 also makes a report indicating profile information storage to priority order setting section 211.

Then, on receiving the report indicating profile information storage from profile information acquisition section 206, priority order setting section 211 performs priority order setting for the profile information acquired by profile information acquisition section 206 (step S5). In this priority order setting processing, when the priority order of profile information has been set by priority order setting section 211, priority-ordered profile information is stored in storage section 205, and information indicating that this has been stored is output to priority profile information selection section 213.

Specifically, when wireless communication apparatus 200 is located at point M2, a report indicating that profile information P22, P23, and P24 has been stored in storage section 205 is input to priority order setting section 211 from profile information acquisition section 206 via control section 219.

On receiving this, priority order setting section 211 sets a priority order for profile information P21, P22, P23, and P24 of access points A11, A12, A13, and A14 present in service areas E1, E2, E3, and E4, based on the information acquired by service area information acquisition section 204 and the information acquired by profile information acquisition section 206.

Here, since wireless communication apparatus 200 is located at point M2, service areas adjacent to local service area E1 are service areas E2 and E3, and therefore profile information P22 and P23 is set as high-priority profile information.

The priority order of this profile information P22 and P23 is set randomly here since there is the same degree of possibility of moving to service areas E2 and E3 formed by access points set in profile information P22 and P23 based on currently acquired information. For example, profile information P22 may be set as the highest-priority profile information, and profile information P23 as the second-highest-priority profile information.

Next, P24 located in the surrounding region is set as high-priority profile information. With regard to profile information P21 in which currently connected access point information is included, since received radio field intensity has become low due to movement, the possibility of subsequent use is determined to be low, and profile information P21 is therefore set as lowest-priority profile information.

Thus, the decided priority order is P22, P23, P24, P21 (see FIG. 5). When a setting processing request signal is received from service area information acquisition section 204, priority order setting section 211 also includes added profile information in addition to service area information as profile information subject to priority order setting.

Next, when the set profile information priority order is stored, priority profile information selection section 213 selects the highest-priority profile information and reports selection termination to received radio field intensity acquisition section 215 (step S6).

Specifically, in step S6, when a report indicating that address profile information priority order has been stored is input via control section 219, priority profile information selection section 213 selects highest-priority profile information P22 at the current location of wireless communication apparatus 200, and performs storage section 205 read processing. On completion of the read processing, priority profile information selection section 213 sends a termination report to received radio field intensity acquisition section 215 via control section 219. When a selection request signal input is received from service area information acquisition section 204, priority profile information selection section 213 selects profile information to be selected using the priority order set previously at the time of acquisition from an access point.

Then, when priority profile information is selected, received radio field intensity acquisition section 215 acquires received radio field intensity transmitted from the access point corresponding to the selected profile information (step S7).

Specifically, in step S7, on receiving a priority profile information selection report, received radio field intensity acquisition section 215 references an SSID that is access point information set in selected profile information P22, and issues a probe request. On receiving the probe request, access point A12 reports a response to that probe request to wireless LAN interface section 202. The above report is sent to received radio field intensity acquisition section 215 via control section 219, and received radio field intensity acquisition section 215 measures the radio field intensity of the signal at that time.

The measured received radio field intensity is reported to access point connection determination section 217 via control section 219.

Next, on receiving the received radio field intensity report, access point connection determination section 217 determines whether or not connection is possible based on the received radio field intensity (step S8). The processing flow proceeds to step S2 if connection is possible, or to step S9 if connection is not possible.

Specifically, if access point connection determination section 217 determines that connection is possible, it references access point information set in profile information P22 selected by priority profile information selection section 213, and issues a request for connection to access point A12. The connection request is reported to the access point via control section 219 and wireless LAN interface section 202. When there is a response from access point A12, that response is reported to access point connection determination section 217 via wireless LAN interface section 202 and control section 219.

If the report from received radio field intensity acquisition section 215 indicates that reception is not possible, access point connection determination section 217 selects the next-highest-priority profile information (step S9).

Specifically, access point connection determination section 217 reports to priority profile information selection section 213 via control section 219 that the next-highest-priority profile information is to be selected and has priority profile information selection section 213 select the next-highest-priority profile information, and the processing flow proceeds to step S7.

As described above, by means of this configuration it is possible to acquire information on a service area present in the neighborhood according to the situation where wireless communication apparatus 200 is located, select on a priority basis profile information of an access point forming a service area having a high possibility of being moved to, and make a connection accordingly. Consequently, it is possible to implement quick access point connection when wireless communication apparatus 200 moves between different service areas. Also, when wireless communication apparatus 200 moves to point M3 shown in FIG. 1, a drop in the beacon reception intensity from access point A11 is detected, enabling communication to be performed in service area E2 without interruption, and also making it possible to achieve a reduction in power consumption since access point search processing is unnecessary.

Thus, quick access point connection can be implemented when wireless communication apparatus 200 moves between different service areas.

Embodiment 2

Figure 7:
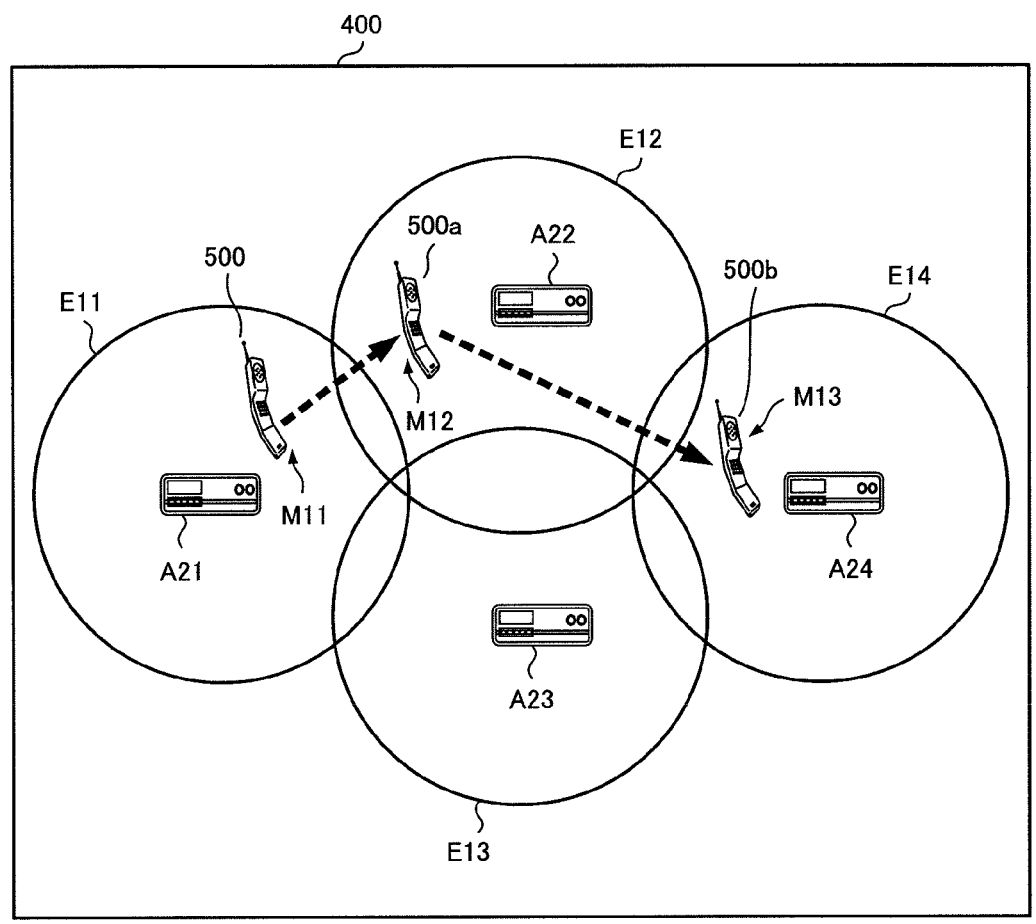
FIG. 7 is a conceptual diagram showing a configuration of a wireless communication system having a wireless communication apparatus according to Embodiment 2 of the present invention.

FIG. 7 is a conceptual diagram showing a configuration of a wireless communication system having a wireless communication apparatus according to Embodiment 2 of the present invention.

As shown in FIG. 7, wireless communication system 400 comprises wireless communication apparatus 500, access point A21, and access points A22 through A24. Wireless communication apparatus 500 is located in service area E11 formed by access point A21. Service areas E12 and E13, formed by access points A22 and A23 respectively, are service areas adjacent to service area E11, and service area E14, formed by access point A24, is a service area adjacent to service areas E12 and E13. Wireless communication apparatuses 500a and 500b shown in FIG. 7 indicate states in which wireless communication apparatus 500 located at point M11 within service area E11 has moved to point M12 within service area E12 and point M13 within service area E13 respectively in wireless communication system 400. Access points A21 through A24, forming mutually different service areas E11 through E14 respectively, can communicate with wireless communication apparatus 500, and can respond to a probe request or connection request from wireless communication apparatus 500, and provide service. Access points A21 through A24 each have a service area information request receiving section that receives a service area information acquisition request from wireless communication apparatus 500, and a neighboring connection information reporting section that reports to wireless communication apparatus 500 issuing a service area information acquisition request service area information indicating access points forming the service area in which that wireless communication apparatus 500 is currently located and a neighboring service area different from the service area in which that wireless communication apparatus 500 is currently located.

Wireless communication apparatus 500 according to Embodiment 2 sets in advance profile information of an access point to be connected to on a priority basis when changing the access point that is its connection destination in line with movement out of the service area to which it belongs (the local service area), and performs connection processing in accordance with that setting.

As an example, FIG. 7 shows a state in which, in wireless communication system 400, wireless communication apparatus 500 moves between service areas E11 and E12, and between service areas E12 and E14, in accordance with a schedule decided in advance by the user prior to moving.

This wireless communication apparatus 500 according to Embodiment 2 differs from wireless communication apparatus 200 of Embodiment 1 in being able to perform priority order setting of profile information without acquiring service area information from the connected access point when connecting to an access point of a service area outside the service area to which it belongs (the local service area).

Figure 8:
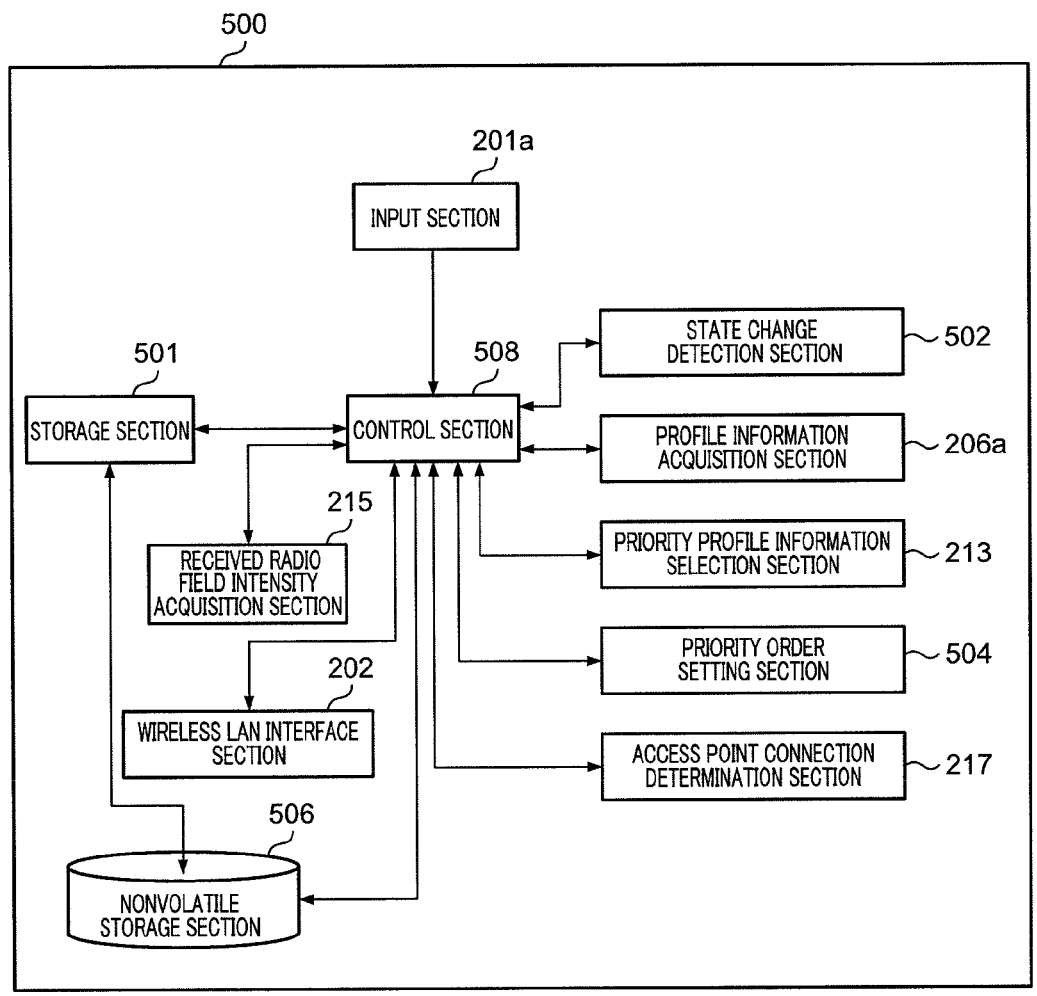
FIG. 8 is a function block diagram showing a principal-part configuration of a wireless communication apparatus according to Embodiment 2 of the present invention.

FIG. 8 is a function block diagram showing a principal-part configuration of wireless communication apparatus 500 according to Embodiment 2 of the present invention. Wireless communication apparatus 500 shown in FIG. 8 has a similar basic configuration to that of wireless communication apparatus 200 of Embodiment 1 shown in FIG. 2, and therefore identical configuration elements are assigned the same reference codes, and descriptions thereof are omitted here.

Wireless communication apparatus 500 shown in FIG. 8 has input section 201a, wireless LAN interface section 202, profile information acquisition section 206a, priority profile information selection section 213, received radio field intensity acquisition section 215, access point connection determination section 217, storage section 501, state change detection section 502, priority order setting section 504, nonvolatile storage section 506, and control section 508.

In wireless communication apparatus 500, as with wireless communication apparatus 200 according to Embodiment 1, sections such as input section 201a, wireless LAN interface section 202, profile information acquisition section 206a, priority profile information selection section 213, received radio field intensity acquisition section 215, access point connection determination section 217, storage section 501, state change detection section 502, priority order setting section 504, nonvolatile storage section 506, and control section 508, are typically implemented by means of LSI (Large Scale Integration), comprising integrated circuits. These sections may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used. Furthermore, integration of sections 201a, 202, 206a, 213, 215, 217, 501, 502, 505, 506, and 508 may be performed by means of an integrated circuit implementation technology whereby LSI is replaced by a different technology as an advance in, or derivation from, semiconductor technology. For example, integration may be performed by the application of biotechnology.

Input section 201a in wireless communication apparatus 500 receives user operation input via an operating key or the like, for example, outputs this to control section 508, and directs various kinds of operations in wireless communication apparatus 500. Specifically, input section 201a receives input from a user of initiation of a schedule application function that connects an access point in line with a schedule, and outputs this to control section 508 to initiate the schedule application. Also, after schedule application initiation, input section 201a stores user input movement schedule <time, place> in storage section 501 via control section 508. The schedule application initiation request is output by this input section 201a to state change detection section 502 via control section 508.

Storage section 501 differs from storage section 205 in storing schedule information on a freely input/output capable basis when moving between service areas, instead of service area information.

Schedule information stored in storage section 501 is here assumed to be a schedule table comprising a schedule having <time> information indicating a scheduled time, and <place> information indicating a meeting place or destination to be located at <time>.

In a schedule, there is assigned to information indicating <place> information associated with an access point to be prioritized as a connection destination at a place indicated by that <place>.

Figure 9:
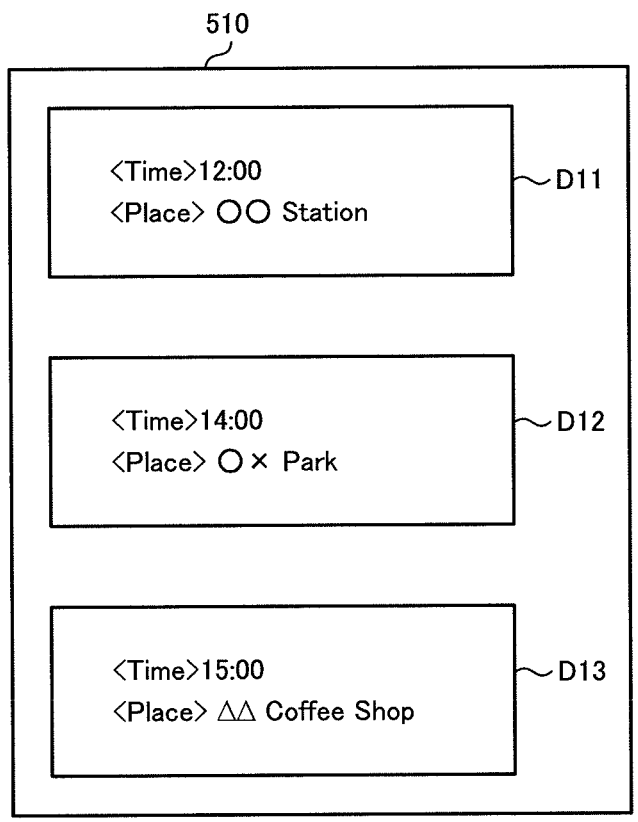
FIG. 9 is a drawing showing an example of a schedule table stored in a storage section.

FIG. 9 is a drawing showing an example of a schedule table stored in storage section 501.

Schedule table 510 shown in FIG. 9 has a data structure, and is constructed by means of data registered and managed by a schedule application found in a mobile phone, for example. Schedule table 510 described here is assumed to have been created using communication states with respect to connected access points when wireless communication apparatus 500 moved in the past.

In schedule table 510, schedule D11 indicates a schedule to move to "○○ Station" at time "12:00", schedule D12 indicates a schedule to move to "○x Park" at time "14:00", and schedule D13 indicates moving to "ΔΔ Coffee Shop" at time "15:00." Schedules D11, D12, and D13 are here assumed to be information (times, places) stored in storage section 501 by being input via input section 201a after schedule application initiation by the user via that input section 201a.

Using stored schedules (here, schedules D11, D12, D13, and so forth), profile information acquisition section 206a reads profile information of access points corresponding to places indicated by these schedules from nonvolatile storage section 506, and stores this profile information in storage section 501. Profile information indicates information necessary for connecting to an access point, and is information for identifying an access point.

Also, on acquiring profile information, profile information acquisition section 206a outputs a report to that effect to priority order setting section 504 via control section 508.

It is possible for profile information acquisition section 206a to read information linked to <place> by referencing <place> set in a schedule of a schedule table. Specifically, location information (for example, a pointer) indicating a profile information location (address) in nonvolatile storage section 506 is associated with <place> of a schedule. Using this location information, profile information acquisition section 206a can acquire corresponding profile information. As with profile information of Embodiment 1, profile information stored in nonvolatile storage section 506 has information, including an SSID for identifying an access point providing a respective service, necessary when connecting to that access point. Here, as with profile information of Embodiment 1, profile information includes, for example, an SSID for identifying an access point providing a respective service, key information (for example, a WEP (Wired Equivalent Privacy) KEY) necessary for an encryption method used for communication and encryption, information (an IP address) necessary for connecting to an access point, and so forth.

FIG. 10 is a drawing showing an example of profile information read from nonvolatile storage section 506 by profile information acquisition section 206a.

The profile information shown in FIG. 10 has a text-based structure, for example, and service area E11, E12, and E14 information is indicated by profile information P31, P32, and P34, respectively.

That is to say, in FIG. 10, service area E11 profile information P31 includes "service_AreaE11" as an SSID for identifying an access point providing service, "jeoiuoitlkj22" as WEP KEY information necessary for an encryption method and encryption, and "132.186.2.22" as an IP address (IP_Addr) necessary for connecting to an access point. Similarly, service area E12 profile information P32 includes "SSID: Service_AreaE12", "WEP KEY: klaujoeiu93", and "IP_Addr: 192.168.0.2"; and service area E14 profile information P34 includes "SSID: Service_AreaE14","WEP KEY: koitoiroiiuo2", and "IP_Addr: 10.68.36.22."

Nonvolatile storage section 506 stores service area related profile information (profile information of an access point forming a service area) that can be read via control section 508, and is here assumed to be stored in advance.

Profile information stored in nonvolatile storage section 506 comprises an SSID for identifying an access point providing a respective service, key information necessary for an encryption method and encryption, an IP address necessary for connecting to an access point, and so forth.

Nonvolatile storage section 506 stores profile information of access points of all different service areas in wireless communication system 400. Nonvolatile storage section 506 according to this embodiment stores at least profile information of each of access points A21 through A24 of service areas E11 through E14.

Using information stored in storage section 501, priority order setting section 504 sets priorities in an order that includes information on an access point to be connected to on a priority basis for profile information acquired by profile information acquisition section 206a.

Specifically, using <time> set in storage section 501 schedules (for example, schedules D11, D12, and D13 shown in FIG. 9), priority order setting section 504 sets priorities for corresponding profile information in order starting with the schedule with the earliest execution time.

Furthermore, when a service area access point connection completion signal is output to control section 508 from wireless LAN interface section 202, priority order setting section 504 reads profile information stored in storage section 501 and performs a priority order change in order to perform connection quickly to the access point of the service area that is the next destination.

Also, on completion of priority order setting processing, priority order setting section 504 outputs a priority order setting termination report signal to priority profile information selection section 213 via control section 508.

In response to priority order setting termination report signal input, priority profile information selection section 213 selects high-priority profile information (priority profile information) among the priority-ordered profile information, and reads this from storage section 501.

As in Embodiment 1, received radio field intensity acquisition section 215 references an SSID set in profile information, and issues a probe request to an access point via control section 508 and wireless LAN interface section 202. Then received radio field intensity acquisition section 215 receives a probe request response from an access point, measures the reception intensity of the received radio wave at the time of the response, and outputs this to access point connection determination section 217 via control section 508.

Specifically, when a signal is input from priority profile information selection section 213 or access point connection determination section 217 via control section 508, received radio field intensity acquisition section 215 determines the reception intensity (connection reception level) of a signal (for example, a beacon) from a priority profile information access point or access point subject to connection determination.

Using a received radio field intensity measurement result, access point connection determination section 217 performs connection determination for the access point that transmitted the signal subject to received radio field intensity measurement. If connection is possible, access point connection determination section 217 issues a connection request to the access point using profile information via control section 508 and wireless LAN interface section 202. On the other hand, if connection is not possible, access point connection determination section 217 outputs a radio field intensity acquisition directive signal to received radio field intensity acquisition section 215 via control section 508 in order to perform determination of radio field intensity from the same access point.

Control section 508 controls input/output of signals among input section 201a, wireless LAN interface section 202, profile information acquisition section 206a, priority profile information selection section 213, received radio field intensity acquisition section 215, access point connection determination section 217, storage section 501, state change detection section 502, priority order setting section 504, and nonvolatile storage section 506.

Through control of sections 202, 206a, 213, 215, 217, 501, 502, 504, and 506, control section 508 manages previously priority-ordered profile information (schedule table 510), selects on a priority basis connection information for an access point forming a service area that is a scheduled destination, and performs control to request connection. Control section 508 also stores schedule table 510.

Next, the access point control method used by wireless communication apparatus 500 will be described using FIG. 11.

Figure 11:
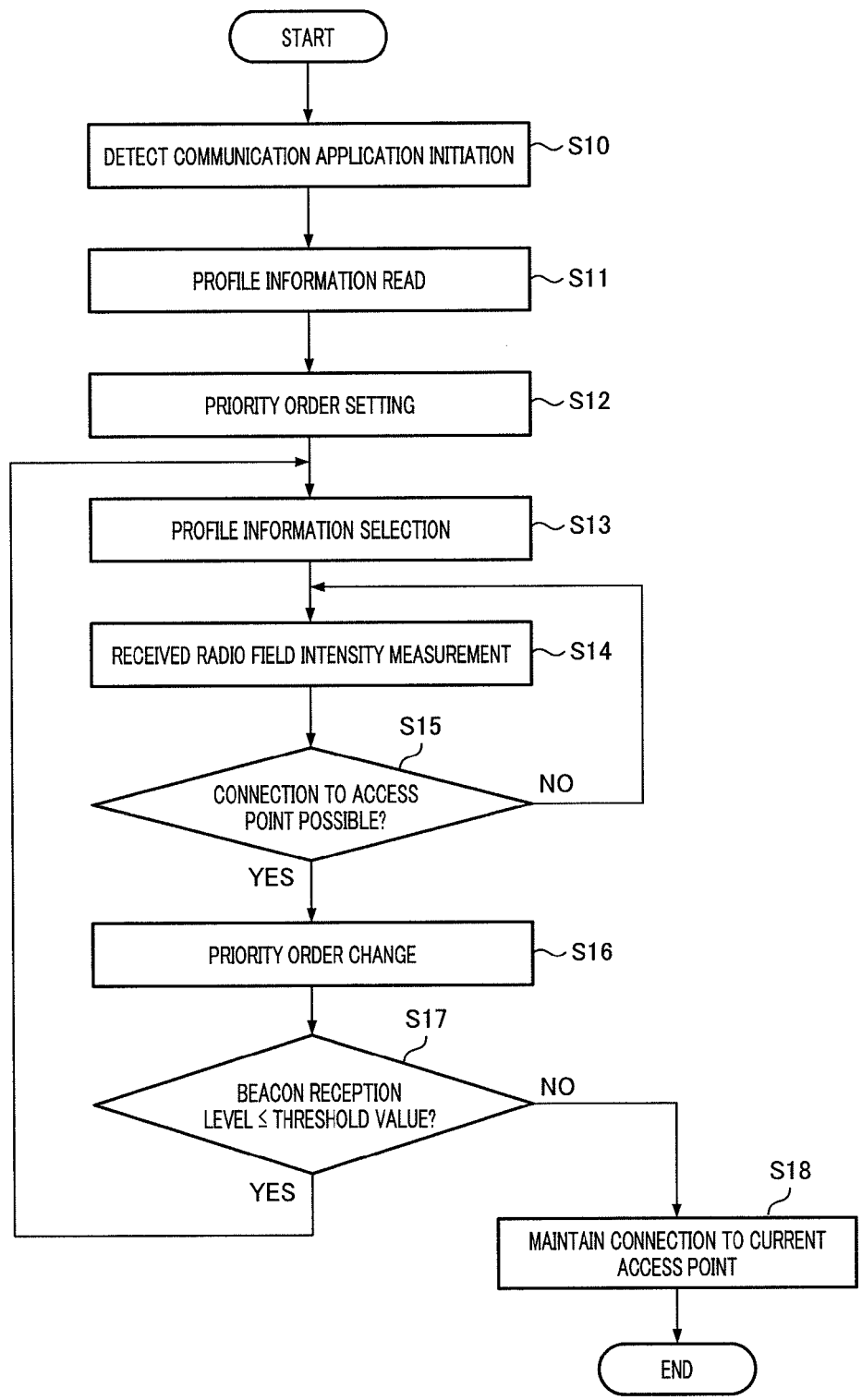
FIG. 11 is a flowchart explaining access point connection by a wireless communication apparatus according to Embodiment 2 of the present invention.

FIG. 11 is a flowchart explaining access point connection by a wireless communication apparatus according to Embodiment 2 of the present invention.

Here, access point connection processing by wireless communication apparatus 500 will be described based on FIG. 11, as applied to a case in which wireless communication apparatus 500 moves through service areas E11, E12, and E14 in that order in accordance with schedule table 510 (see FIG. 9) in wireless communication system 400 shown in FIG. 7.

That is to say, FIG. 7 shows a state in which wireless communication apparatus 500 located at point M11 has arrived in service area E11 at time 12:00 of schedule D11 of schedule table 510. FIG. 7 also shows a state in which wireless communication apparatus 500a located at point M12 has moved within service area E11 and has arrived in service area E12 at time 14:00 of schedule D12 from service area E11. Furthermore, FIG. 7 shows a state in which wireless communication apparatus 500b located at point M13 has moved further from point M12 and has arrived in service area E14 at time 15:00 of schedule D13.

In FIG. 7, when input for communication application initiation is performed from the user of wireless communication apparatus 500 in service area E11, that information is reported to control section 508 via input section 201a, and control section 508 performs communication application initiation and also reports application initiation to state change detection section 502.

Next, state change detection section 502 detects that the application has been initiated by means of information from control section 508, and reports this to control section 508 (step S10).

On receiving this report from control section 508, using <place> set in schedule table 510 (to be precise, schedules) shown in FIG. 9, profile information acquisition section 206a reads corresponding profile information (here, profile information P31, P32, and P34) stored in nonvolatile storage section 506 (step S11).

Profile information indicates information necessary for connecting to an access point as described above, and it is possible for this information to be used as information for identifying an access point.

Profile information is associated with <place> set in a schedule table in storage section 501, and profile information acquisition section 206a reads profile information from nonvolatile storage section 506 using information associating <place> with profile information.

Figure 12:
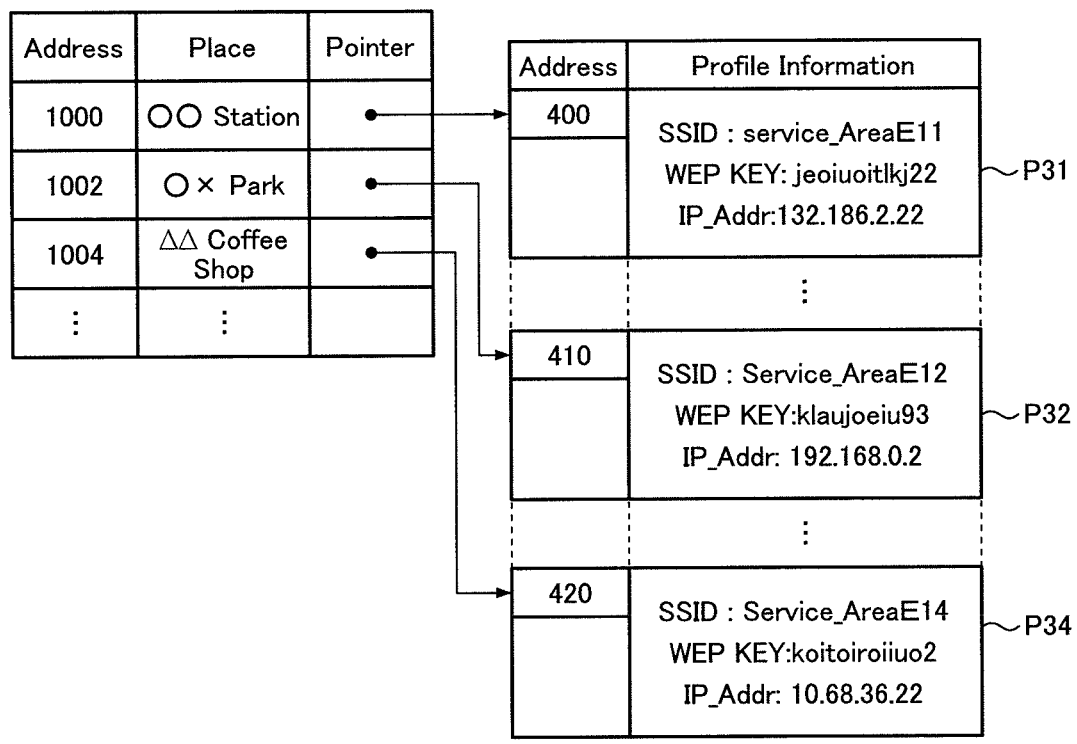
FIG. 12 is a drawing provided to explain reading of profile information using a schedule table by a profile information acquisition section.

FIG. 12 is a drawing provided to explain reading of profile information using a schedule table by a profile information acquisition section.

As shown in FIG. 12, in storage section 501, <place> information in a schedule in a schedule table is managed in separate one-dimensional arrays, and a pointer to an address of profile information stored in nonvolatile storage section 506 is associated with each array. It is also assumed that, for the individual schedules, storage section 501 assigns and stores addresses (for example, "1000", "1002", "1004") in the order of movement of wireless communication apparatus 500.

In this way, by reading <place> in a schedule in storage section 501, profile information acquisition section 206a can use a pointer associated with the read <place> to read profile information of an address indicated by the pointer from nonvolatile storage section 506.

For example, when address-1000 array in storage section 501 in which the information "∘∘ Station" is written is selected in wireless communication apparatus 500, that data has a pointer to address 400, enabling the pointer-destination profile information to be read at the same time.

Profile information read by profile information acquisition section 206a in this way is profile information of an access point that is a service provision source at <place> in a schedule. Here, profile information P31 corresponding to <place> set in schedule D11, profile information P32 corresponding to <place> set in schedule D12, and profile information P34 corresponding to <place> set in schedule D13, are read by profile information acquisition section 206a.

After profile information has been read in this way, profile information acquisition section 206a reports profile information read termination to priority order setting section 504 via control section 508.

Priority order setting section 504 references <time> set in schedules D11, D12, and D13, and performs priority order setting of profile information acquired by profile information acquisition section 206a (step S12).

Here, in the priority order setting performed by priority order setting section 504 in step S12, priorities are assigned to profile information corresponding to the time order in which registered schedules are executed.

For example, since the first schedule executed among the schedules in schedule table 510 in FIG. 9 is schedule D11 for which <time> is set to 12:00, priority order setting is performed such that profile information P31, which is the corresponding profile information, has the highest priority.

Since the next schedule executed is schedule D12 for which <time> is 14:00, priority order setting is performed such that profile information P32, which is the corresponding profile information, is the second-highest-priority profile information. Priority order setting is also performed in a similar way for profile information P34.

An example of profile information priority-ordered as described above is shown in FIG. 13.

Figure 13:
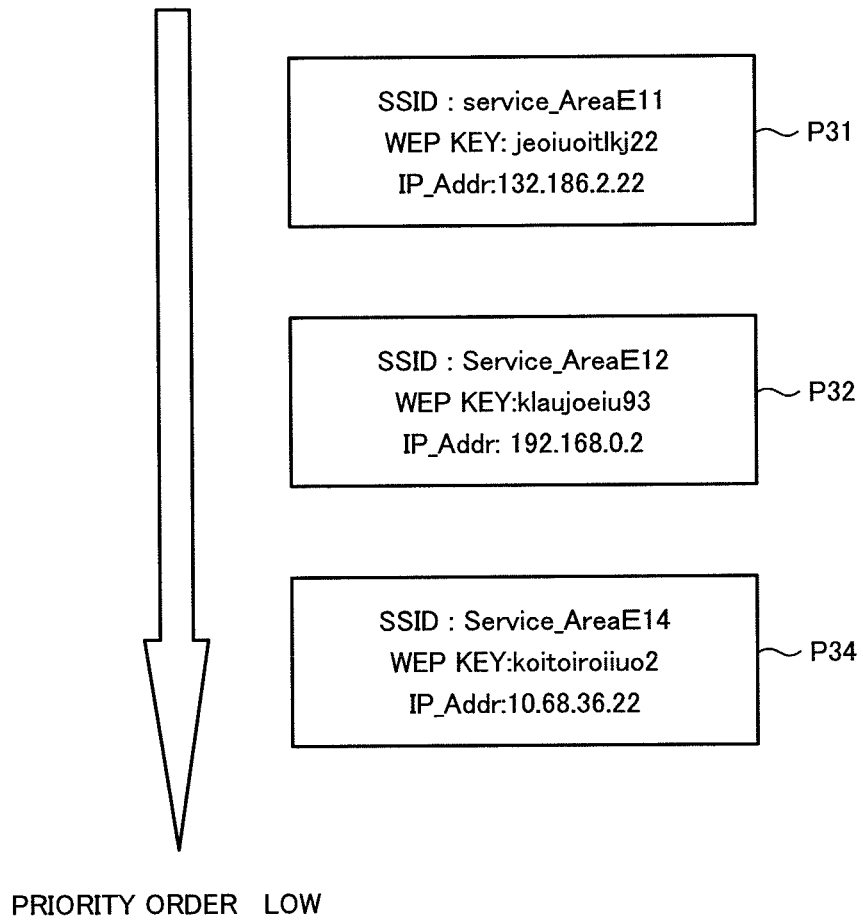
FIG. 13 is a drawing showing an example of the data structure of profile information priority-ordered by a priority order setting section.

FIG. 13 is a drawing showing an example of the data structure of profile information priority-ordered by a priority order setting section.

As shown in FIG. 13, priority order setting section 504 performs priority order setting for profile information in the order: profile information P31→P32→P34.

On completion of the priority order setting processing, priority order setting section 504 reports this to priority profile information selection section 213 via control section 508.

On receiving this report, priority profile information selection section 213 selects highest-priority profile information P31, and performs storage section 501 read processing (step S13). On completion of this selected profile information read processing, priority profile information selection section 213 sends a termination report to received radio field intensity acquisition section 215 via control section 508.

On receiving this priority profile information selection termination report, received radio field intensity acquisition section 215 acquires the intensity of the received radio wave from the access point indicated by the SSID set in selected profile information P31 (step S14).

Specifically, in step S14, received radio field intensity acquisition section 215 references the SSID set in profile information P31, and issues a probe request to an access point via control section 508 and wireless LAN interface section 202. The access point that receives the probe request reports its response thereto to received radio field intensity acquisition section 215 via wireless LAN interface section 202 and control section 508. Using this response signal, received radio field intensity acquisition section 215 measures the reception intensity of the received radio wave, and reports this to access point connection determination section 217 via control section 508. The result of this measurement is reported to access point connection determination section 217 via control section 508.

On receiving this report, access point connection determination section 217 performs access point connection determination—that is, determines whether or not it is possible to connect to the access point that transmitted the received signal (step S15).

If it is determined in step S15 that connection to the access point is possible, control section 508 issues a connection request to the access point (for example, access point A21) via wireless LAN interface section 202. This connection request is made by referencing information set in profile information P31. The access point (for example, access point A21) that receives the above connection request responds to wireless communication apparatus 500, and in wireless communication apparatus 500 this is reported to access point connection determination section 217 via wireless LAN interface section 202 and control section 508. Also, completion of connection to service area E11 access point A21 is reported to control section 508 from wireless LAN interface section 202, control section 508 issues a processing request to priority order setting section 504, and the processing flow proceeds to step S16. The content of the processing request is to read profile information stored in storage section 501 and perform a priority order change in order to perform connection quickly to the access point (here, A22) of the service area (here, E12) that is the next destination.

If it is determined in step S15 that connection to the access point is not possible, a report is made to received radio field intensity acquisition section 215 via control section 508 for acquisition of radio field intensity again, and the processing flow proceeds to step S14.

In step S16, priority order setting section 504 changes the priority order set for profile information.

Specifically, in step S16, priority order setting section 504 makes a lowest-priority setting for profile information P31 set as connection information of currently connected access point A21, as having a low possibility of being used when subsequent wireless communication apparatus 500 movement occurs. Then priority order setting section 504 sets profile information P32, in which connection information for access point A22 forming service area E12 that is the next destination is set, as highest-priority profile information. Profile information P34 is assigned the second-highest priority.

Figure 14:
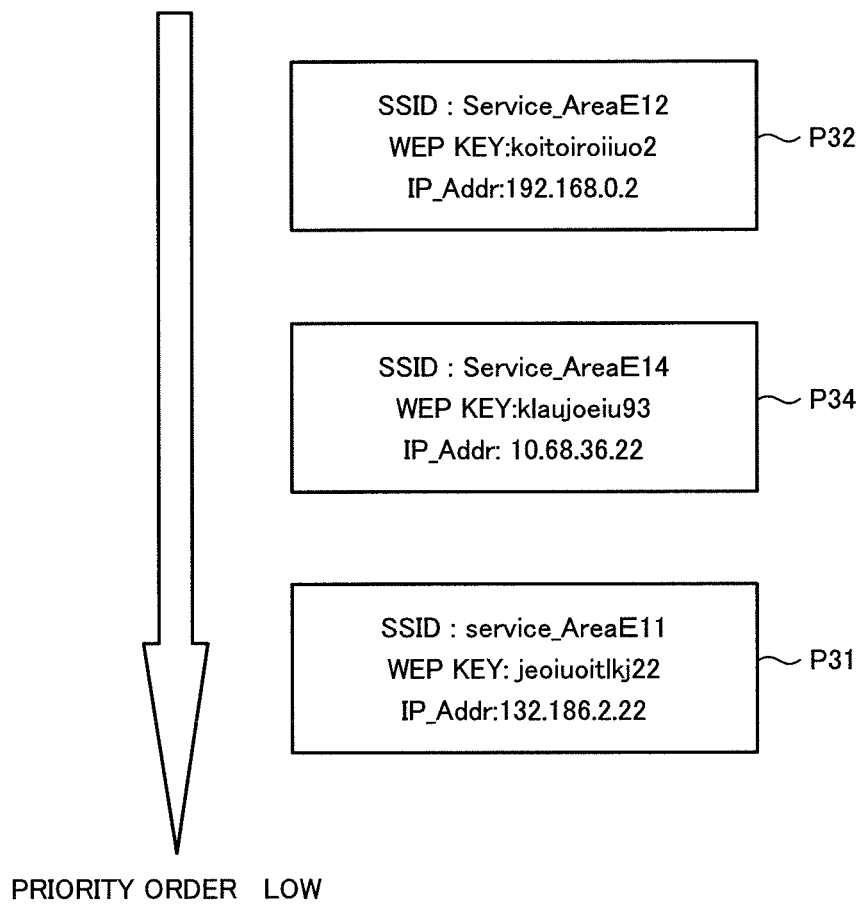
FIG. 14 is a drawing showing the result of a priority order change by a priority order setting section.

FIG. 14 is a drawing showing the result of the priority order change by the priority order setting section.

In FIG. 14, profile information P31 has been set as lowest-priority profile information, and profile information P32 has been set as highest-priority profile information.

After the above processing, it is possible for wireless communication apparatus 500 to prepare for access point connection according to next schedule D12.

A connection request for access point A22, the next connection destination, forming service area E12 related to this next schedule D12 is issued after the processing in step S17.

In step S17, state change detection section 502 determines whether or not the reception level (connection reception level) of a beacon (a signal received via wireless LAN interface section 202 and control section 508) from currently connected access point A21 is lower than or equal to a threshold value.

If the result of the determination by state change detection section 502 in step S17 is that the beacon reception level has been detected to be lower than or equal to the threshold value, the processing flow returns to step S13, and priority profile information selection section 213 selects next-highest-priority profile information P32.

If the result of the determination by state change detection section 502 in step S17 is that the beacon reception level exceeds the threshold value, the processing flow returns to step S13, and connection to the currently connected access point is continued (step S18).

As described above, using storage section 501, wireless communication apparatus 500 of Embodiment 2, when moving in line with schedules of a schedule table, orders profile information related to each schedule on a priority basis, and sets a connection-destination access point when executing each schedule using this priority-ordered profile information.

That is to say, according to wireless communication apparatus 500, by managing profile information priority-ordered in advance, it is possible to select connection information for an access point forming a service area that is a scheduled destination on a priority basis, and issue a connection request.

For example, if a user performs priority order setting of profile information in the order of service areas to be moved through, scheduled-destination profile information can always be selected on a priority basis. Therefore, it is possible to implement quick connection to a destination access point.

Furthermore, power consumption can be reduced since it is not necessary to acquire destination service area information.

Embodiment 3

Figure 15:
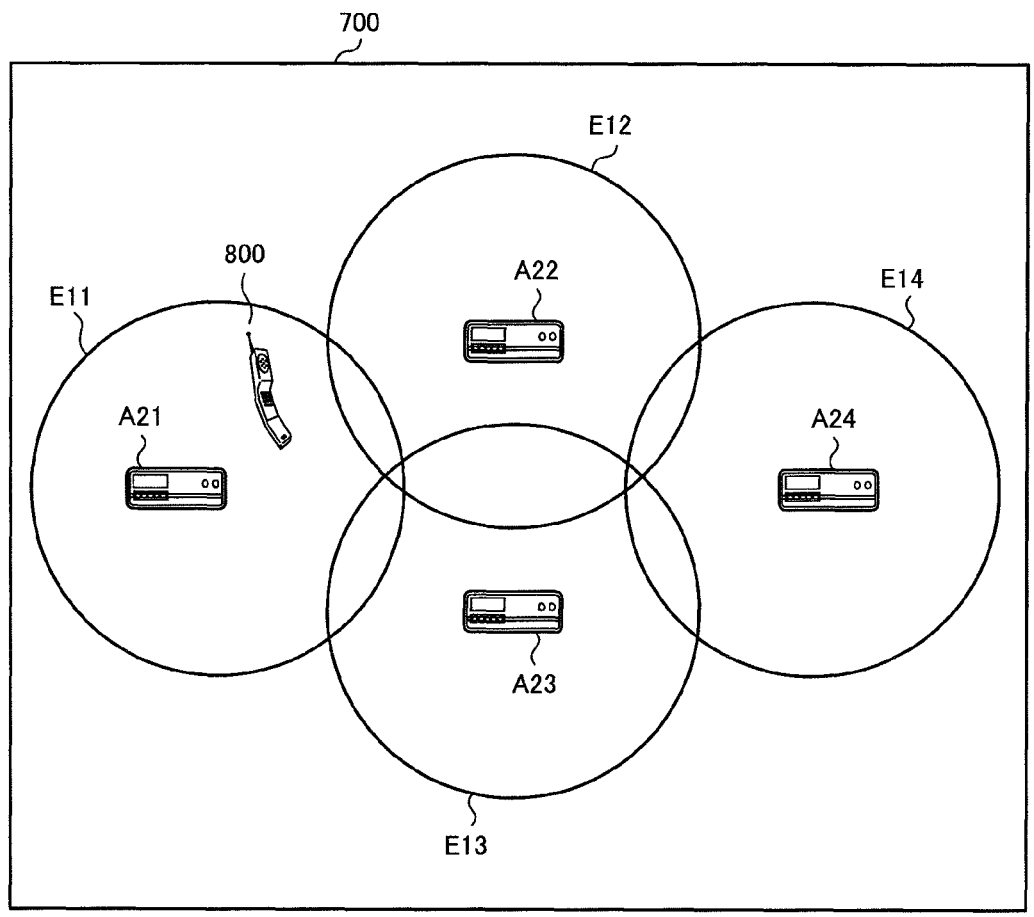
FIG. 15 is a conceptual diagram showing a configuration of a wireless communication system having a wireless communication apparatus according to Embodiment 3 of the present invention.

FIG. 15 is a conceptual diagram showing a configuration of a wireless communication system having a wireless communication apparatus according to Embodiment 3 of the present invention.

Wireless communication system 700 is a system in which wireless communication apparatus 800 is provided instead of wireless communication apparatus 500 in wireless communication system 400 of Embodiment 2, and service areas E11 through E14 and access points A21 through A24 forming these service areas E11 through E14 are the same.

That is to say, wireless communication system 700 shown in FIG. 15 comprises wireless communication apparatus 800, access point A21, and access points A22 through A24. Wireless communication apparatus 800 is located in service area E11 formed by access point A21.

Service areas E12 and E13, formed by access points A22 and A23 respectively, are different service areas adjacent to service area E11, and service area E14, formed by access point A24, is a different service area adjacent to service areas E12 and E13. Access points A21 through A24 each have a service area information request receiving section that receives a service area information acquisition request from wireless communication apparatus 800, and a neighboring connection information reporting section that reports to wireless communication apparatus 800 issuing a service area information acquisition request service area information indicating access points forming the service area in which that wireless communication apparatus 800 is currently located and a neighboring service area different from the service area in which that wireless communication apparatus 800 is currently located.

Figure 16:
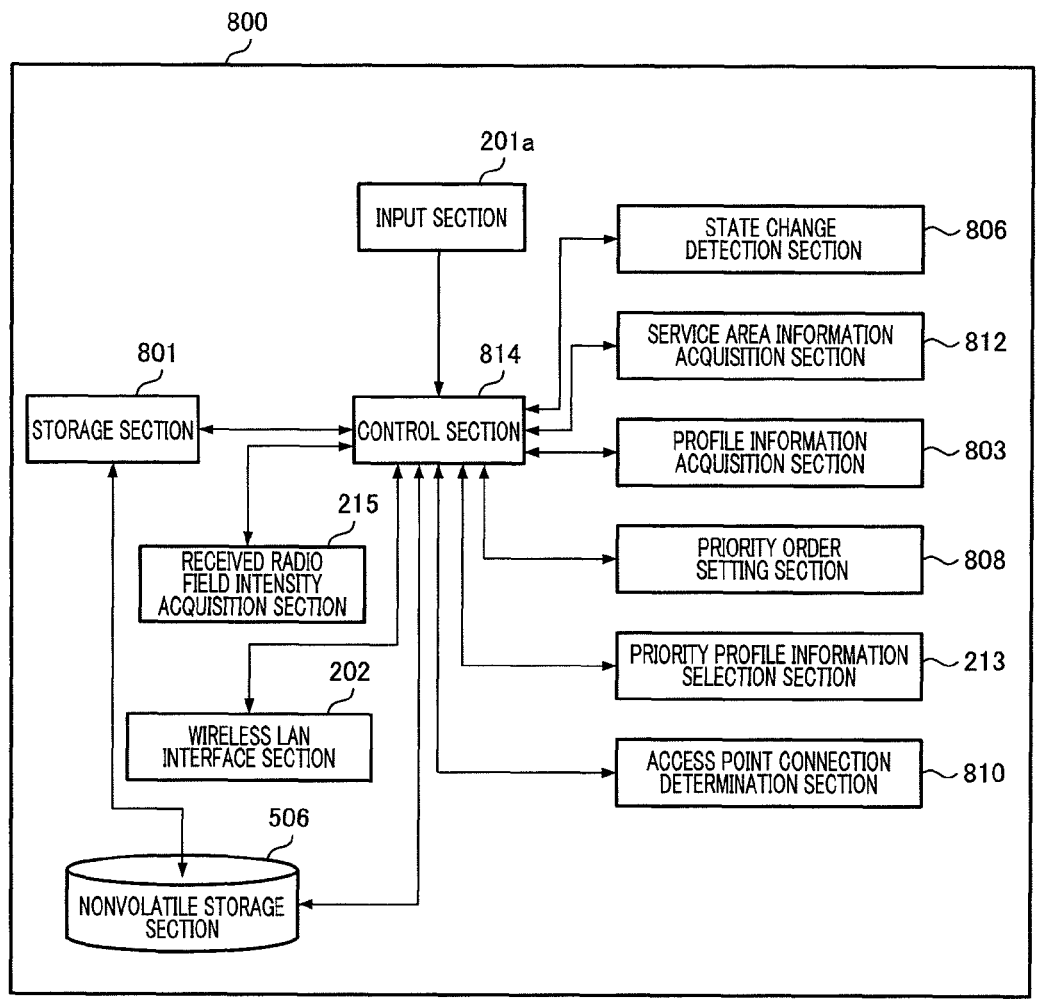
FIG. 16 is a function block diagram showing a principal-part configuration of a wireless communication apparatus according to Embodiment 3 of the present invention.

FIG. 16 is a function block diagram showing a principal-part configuration of wireless communication apparatus 800 according to Embodiment 3 of the present invention. Wireless communication apparatus 800 shown in FIG. 16 has a similar basic configuration to that of wireless communication apparatus 500 of Embodiment 2 shown in FIG. 8, being additionally provided with service area information acquisition section 812, and being provided with a function that performs information collection using this service area information acquisition section 812 in control section 814. Below, therefore, configuration elements of wireless communication apparatus 800 identical to those of wireless communication apparatus 500 are assigned the same reference codes, and descriptions thereof are omitted.

That is to say, in addition to input section 201a, wireless LAN interface section 202, priority profile information selection section 213, received radio field intensity acquisition section 215, and nonvolatile storage section 506 having the same kind of basic functions as in wireless communication apparatus 200, wireless communication apparatus 800 also has storage section 801, profile information acquisition section 803, state change detection section 806, priority order setting section 808, access point connection determination section 810, service area information acquisition section 812, and control section 814.

In wireless communication apparatus 800 in wireless communication system 700, as with wireless communication apparatus 200, input section 201a, wireless LAN interface section 202, priority profile information selection section 213, received radio field intensity acquisition section 215, nonvolatile storage section 506, storage section 801, profile information acquisition section 803, state change detection section 806, priority order setting section 808, access point connection determination section 810, service area information acquisition section 812, and control section 814, are typically implemented by means of LSI (Large Scale Integration), comprising integrated circuits.

These sections may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used. Furthermore, integration of sections 201 through 213 may be performed by means of an integrated circuit implementation technology whereby LSI is replaced by a different technology as an advance in, or derivation from, semiconductor technology. For example, integration may be performed by the application of biotechnology.

Input section 201a performs various kinds of operations using the sections in wireless communication apparatus 800 by means of user operation input via an operating key or the like, for example. Specifically, input section 201a receives input from a user of initiation of a schedule application function that connects an access point in line with a schedule, and outputs this to control section 814 to initiate the schedule application. Also, after schedule application initiation, input section 201a stores user input movement schedule <time, place> in storage section 801 via control section 814. The schedule application initiation request is output by this input section 201a to state change detection section 806 via control section 814.

Nonvolatile storage section 506 is similar to that of wireless communication apparatus 500 of Embodiment 2, and stores service area related profile information (profile information of access points forming service areas) that can be read via control section 814. Here, nonvolatile storage section 506 stores profile information for each of access points A21 through A24 of different service areas E11 through E14 in wireless communication system 700. Profile information comprises an SSID for identifying an access point providing a respective service, key information necessary for an encryption method and encryption, an IP address necessary for connecting to an access point, and so forth.

Storage section 801 stores information input/output via control section 814. Below, input/output of information between sections via control section 814 may also be described as input/output between sections.

Specifically, storage section 801 stores schedule information that is input from input section 201a via control section 814, and is used when moving between service areas.

Storage section 801 also stores service area information acquired by service area information acquisition section 812 and service area (to be precise, an access point) profile information from nonvolatile storage section 506.

Furthermore, storage section 801 stores the radio field intensity of a signal measured by received radio field intensity acquisition section 215, and correspondence information of the SSID of the access point that is the source of that signal.

In addition, storage section 801 stores profile information priority-ordered by priority order setting section 808 using a list structure, for example, and in a management format enabling access in order of priority from high-priority profile information.

Schedule information stored in storage section 801 is here assumed to be a schedule table comprising schedules having <time> information indicating a scheduled time, and <place> information indicating a meeting place or destination to be located at <time>.

In a schedule, there is assigned to information indicating <place> information associated with an access point to be prioritized as a connection destination at a place indicated by that <place>.

Schedule information stored in storage section 801 is assumed to be similar to that of schedule table 510 (see FIG. 9) having schedules D11 through D13 stored in storage section 501.

Profile information acquisition section 803 receives a report from control section 814 and reads profile information (for example, profile information P31, P32, and P34) stored in nonvolatile storage section 506, and when storing profile information in storage section 501, outputs a report to that effect to priority order setting section 808 via control section 814.

Specifically, using stored schedules (here, schedules D11, D12, D13, and so forth shown in FIG. 9), profile information acquisition section 803 reads profile information of access points corresponding to places indicated by these schedules from nonvolatile storage section 506, and stores this profile information in storage section 801.

It is possible for profile information acquisition section 803 to read information linked to <place> by referencing <place> set in a schedule of a schedule table. Specifically, location information (for example, a pointer) indicating a profile information location (address) in nonvolatile storage section 506 is associated with <place> of a schedule.

Using this location information, profile information acquisition section 803 can acquire corresponding profile information from nonvolatile storage section 506. Profile information stored in nonvolatile storage section 506 indicates information necessary for connecting to an access point, and is information for identifying an access point.

Specifically, as with profile information of Embodiment 1, profile information has information, including an SSID for identifying an access point providing a respective service, necessary when connecting to that access point. Here, as in Embodiment 1, profile information includes, for example, an SSID for identifying an access point providing a respective service, key information (for example, a WEP (Wired Equivalent Privacy) KEY) necessary for an encryption method used for communication and encryption, information (an IP address) necessary for connecting to an access point, and so forth. An example of this profile information is that shown in FIG. 10, for instance.

When service area information is stored in storage section 501, profile information acquisition section 803 uses service area information to acquire profile information of access points corresponding to service areas indicated by these items of service area information. Specifically, profile information acquisition section 803 receives input of a service area information acquisition signal from service area information acquisition section 812 via control section 814, and reads service area information stored in storage section 801. Then, using this read service area information, profile information acquisition section 803 acquires profile information of an access point indicated by the service area information from nonvolatile storage section 506.

In this embodiment, profile information acquisition section 803 acquires service area information acquired by service area information acquisition section 812 from storage section 801. Using this acquired service area information, profile information acquisition section 803 reads profile information of an access point corresponding to the service area indicated by that service area information from nonvolatile storage section 506, and stores this profile information in storage section 801.

State change detection section 806 detects a change in the usage state of wireless communication apparatus 800 itself using information input via control section 814, and outputs this to control section 814.

Specifically, state change detection section 806 detects schedule application initiation input by a user via input section 201a as a state change of wireless communication apparatus 800 itself, and outputs this to received radio field intensity acquisition section 215 via control section 814.

State change detection section 806 also determines the reception level (connection reception level) of a beacon (signal) from an access point forming the service area in which wireless communication apparatus 800 is located, which is input via wireless LAN interface section 202 and control section 814.

Determination of the reception level of a beacon by state change detection section 806 is performed, for example, by comparing the reception level of the beacon (signal) from the connection-destination access point with a preset threshold value.

If the beacon reception level is higher than the threshold value, wireless LAN interface section 202 is instructed via control section 814 to continue connection to the currently connected access point, whereas if the reception level is lower than or equal to the threshold value, a signal to that effect is output to profile information acquisition section 803 via control section 814.

Using information stored in storage section 801, priority order setting section 808 sets priorities in an order that includes information on an access point to be connected to on a priority basis for profile information acquired by profile information acquisition section 803.

Specifically, priority order setting section 808 receives a termination signal for profile information storage in storage section 801, input from profile information acquisition section 803 via control section 814, and performs priority order setting for profile information of an access point present in a service area using information acquired by service area information acquisition section 812 and information acquired by profile information acquisition section 803.

For example, using <time> set in storage section 801 schedules (for example, schedules D11, D12, and D13 shown in FIG. 9), priority order setting section 808 sets priorities for corresponding profile information in order starting with the schedule with the earliest execution time.

Furthermore, when a service area access point connection completion signal is output to control section 814 from wireless LAN interface section 202, priority order setting section 808 reads profile information stored in storage section 801 and performs a priority order change in order to perform connection quickly to the access point of the service area that is the next destination.

Also, on completion of priority order setting processing, priority order setting section 808 outputs a priority order setting termination report signal to priority profile information selection section 213 via control section 814.

The priority order set by priority order setting section 808 is assigned by priority order setting section 808 in order from profile information having a high possibility of being selected in the course of moving from the current location to the next destination service area.

Using received radio field intensity from the connected access point, and storage section 801 schedules or service area information from the connected access point, priority order setting section 808 sets the priorities of service areas to be connected (specifically, connection-destination access points) in order of probable satisfactoriness of the connection state, and sorts profile information into a priority order accordingly.

For example, if received radio field intensity from the connected access point becomes low, sorting is performed based on service area information and profile information so that profile information of an access point forming another service area near the local service area has the highest priority.

When priorities are assigned, if proximity to the local service area is of the same order for target service areas, priority order setting section 808 performs priority order setting for profile information of access points forming these target service areas randomly.

Using a received radio field intensity measurement result, access point connection determination section 810 performs connection determination for the access point that transmitted the signal subject to received radio field intensity measurement. If connection is possible, access point connection determination section 810 issues a connection request to the access point using profile information via control section 814 and wireless LAN interface section 202. On the other hand, if connection is not possible, access point connection determination section 810 outputs a radio field intensity acquisition directive signal to received radio field intensity acquisition section 215 via control section 814 in order to perform determination of radio field intensity from the same access point.

Using received radio field intensity measured by received radio field intensity acquisition section 215 input via control section 814, access point connection determination section 810 determines whether or not it is possible to connect to the access point that transmitted the signal corresponding to that received radio field intensity. Based on the result of this determination, access point connection determination section 810 issues to wireless LAN interface section 202, via control section 814, a request for connection to the access point corresponding to the profile information selected by priority profile information selection section 213.

On the other hand, if the determination result is that connection is not possible, via control section 814 access point connection determination section 810 outputs a signal to priority profile information selection section 213 to select the next-highest-priority profile information, or outputs a signal to service area information acquisition section 812 to execute collection of service area information.

On receiving a neighboring service area information collection request input from access point connection determination section 810 via control section 814, service area information acquisition section 812 collects information including information on access points forming service areas.

Specifically, in response to a request from access point connection determination section 810, service area information acquisition section 812 acquires information for acquiring profile information of access points forming neighboring service areas from the access point of the connected service area.

Specifically, service area information acquisition section 812 outputs a service area information acquisition request for the access point forming the connected service area to wireless LAN interface section 202.

Service area information transmitted as an access point response to this acquisition request is acquired by service area information acquisition section 812 by being output to control section 814 from wireless LAN interface section 202, and being stored in storage section 801.

FIG. 17 is a drawing showing an example of service area information acquired from an access point. Acquired service area information 300 is configured in the same way as service area information 300 in FIG. 3. That is to say, service area information 300a has a text-based configuration in this embodiment, and includes, for example, three kinds of information: <Local service area>, <Adjacent service area(s)>, and <Surrounding service area(s)>.

In the service area information, <Local service area> indicates a service area provided by the currently connected access point, <Adjacent service area(s)> indicates a service area or service areas adjacent to the currently connected access point, and <Surrounding service area(s)> indicates a service area or service areas located in the surrounding region of the currently connected service area (located farther away than an adjacent service area). <Adjacent service area(s)> and <Surrounding service area(s)> indicate service areas present in the neighborhood of <Local service area>. The service area information in FIG. 17 indicates that the connected access point provides service area E12, and adjacent service areas are E11, E13, and E14. The <Surrounding service area(s)> column is empty. This indicates that there are adjacent service areas, but there are no other service areas nearby.

Control section 814 controls input/output of signals among wireless LAN interface section 202, priority profile information selection section 213, received radio field intensity acquisition section 215, nonvolatile storage section 506, storage section 801, profile information acquisition section 803, state change detection section 806, priority order setting section 808, access point connection determination section 810, and service area information acquisition section 812.

By controlling the operation of sections 202, 213, 215, 803, 806, 808, 810, and 812, control section 814 manages previously priority-ordered profile information, selects on a priority basis connection information for an access point forming a service area that is a scheduled destination, and issues a connection request. Here, control is performed so that scheduled-destination service area profile information is always selected on a priority basis by performing priority order setting of profile information in the order of service areas through which a user moves. Also, if control section 814 selects highest-priority profile information from previously priority-ordered profile information, and access point connection fails, control section 814 performs control to perform collection of neighboring service area information and profile information of those service areas at that point in time, and to execute priority order setting for the profile information.

Next, the access point control method used by wireless communication apparatus 800 according to the present invention will be described.

Figure 18:
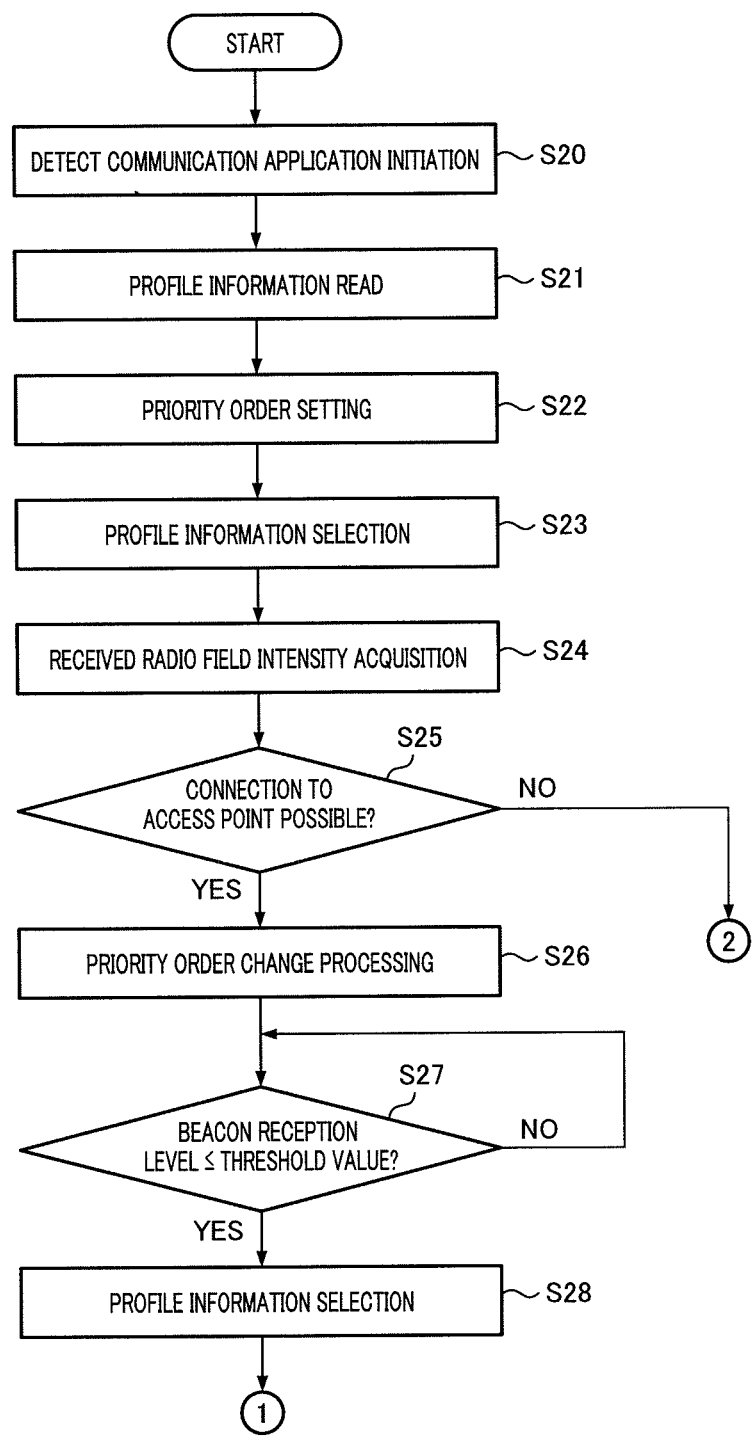
FIG. 18 is a flowchart explaining access point connection by a wireless communication apparatus according to Embodiment 3 of the present invention.
Figure 19:
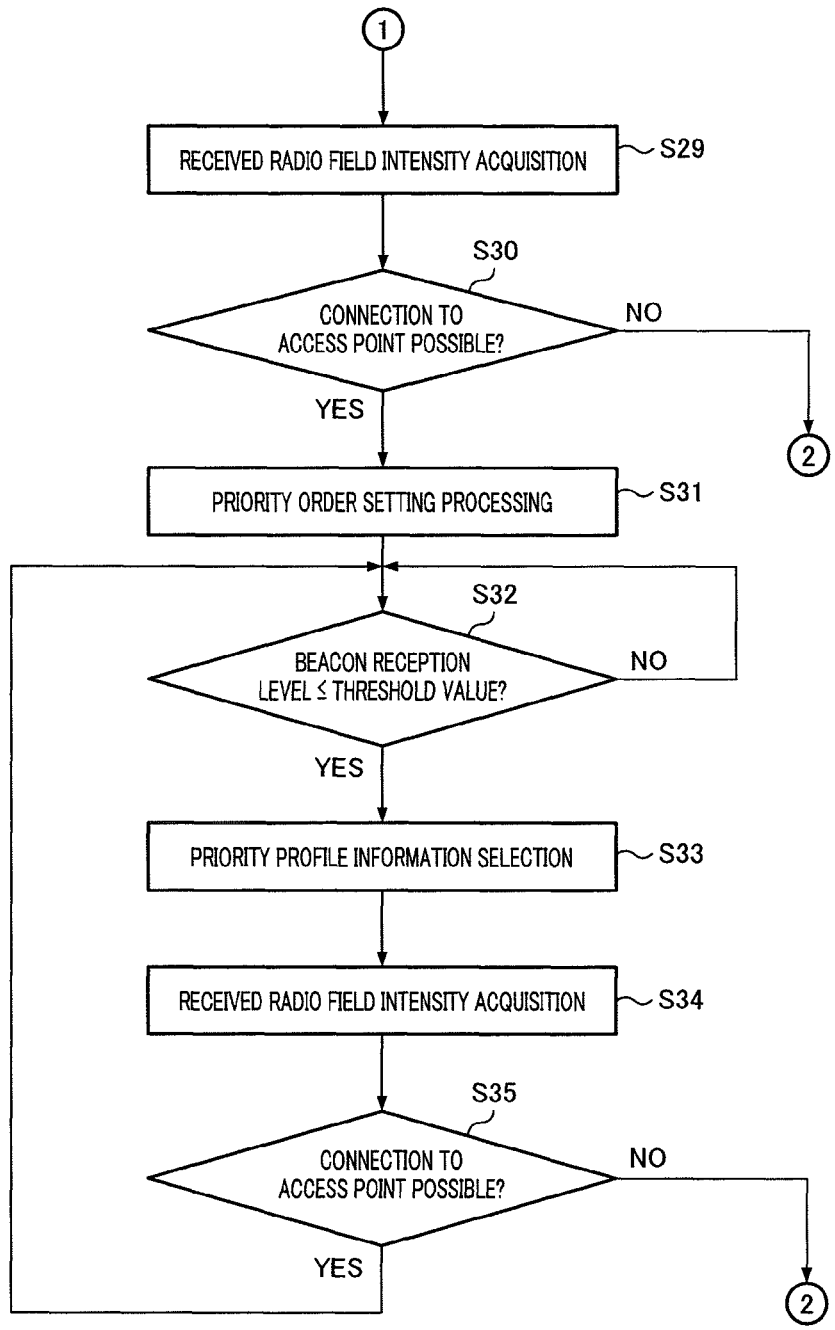
FIG. 19 is a flowchart explaining access point connection by a wireless communication apparatus according to Embodiment 3 of the present invention.
Figure 20:
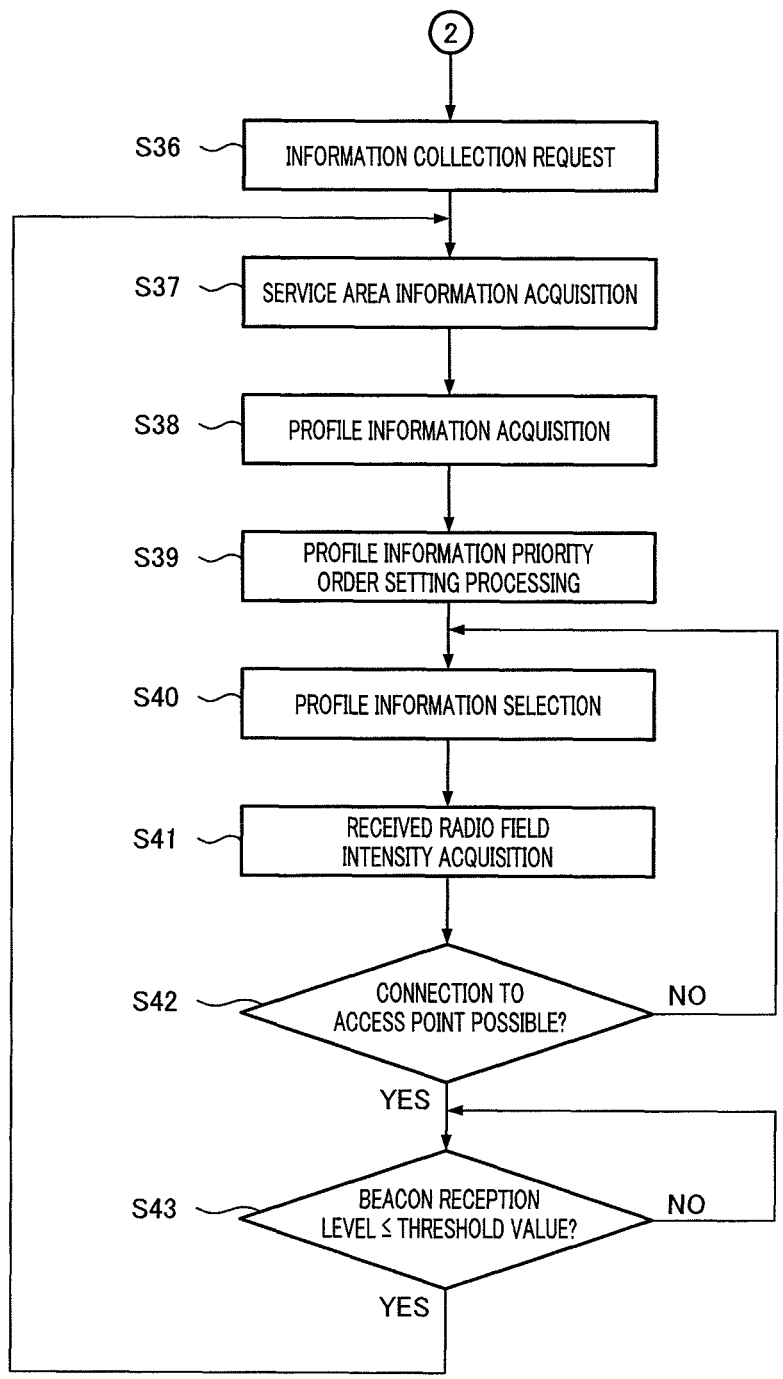
FIG. 20 is a flowchart explaining access point connection by a wireless communication apparatus according to Embodiment 3 of the present invention.

FIG. 18 through FIG. 20 show a flowchart explaining access point connection by a wireless communication apparatus according to Embodiment 3 of the present invention.

Here, the description of access point connection processing by wireless communication apparatus 800 based on FIG. 18 through FIG. 20 refers to a case in which wireless communication apparatus 800 moving in accordance with a preset schedule in wireless communication system 700 shown in FIG. 15 moves to an unscheduled location.

Figure 21:
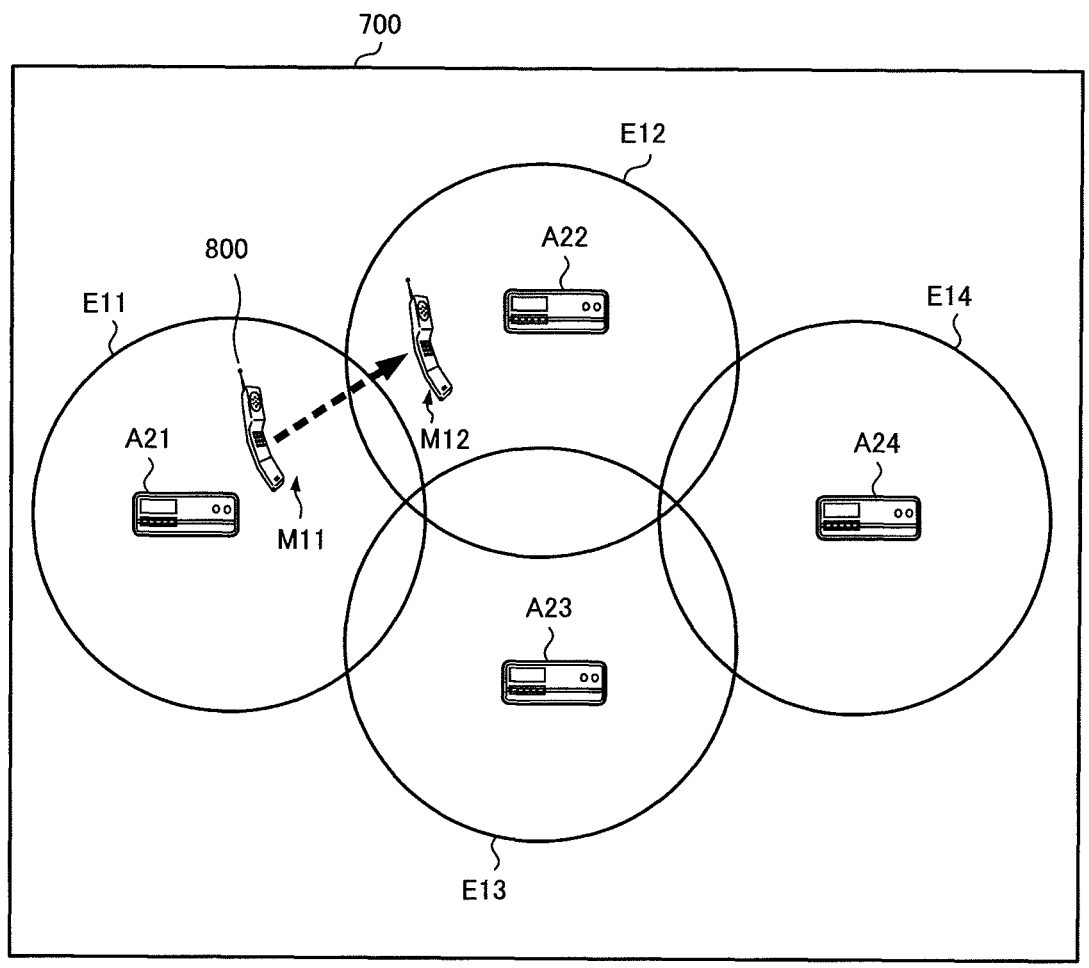
FIG. 21 is a drawing showing movement of a wireless communication apparatus in the wireless communication system shown in FIG. 15.
Figure 22:
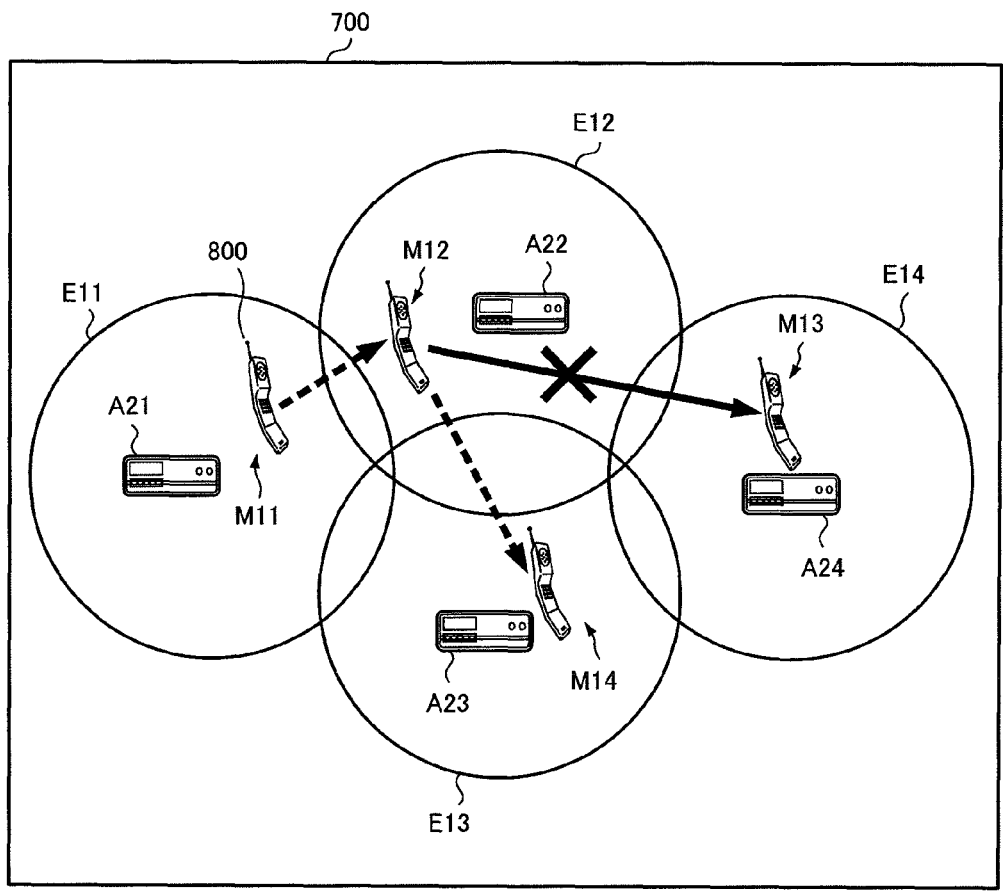
FIG. 22 is a drawing showing movement of a wireless communication apparatus in the wireless communication system shown in FIG. 15.

FIG. 21 and FIG. 22 are drawings showing movement of a wireless communication apparatus in the wireless communication system shown in FIG. 15. To be precise, FIG. 21 is a drawing that shows wireless communication apparatus 800 shown in FIG. 15 moving, and shows movement between different service areas E11 and E12 in accordance with a schedule decided by the user before moving, while FIG. 22 is a drawing that shows a situation in which wireless communication apparatus 800 has moved between service areas E11 and E12, and shows movement different from the schedule set by the user in advance. As with wireless communication system 400 of Embodiment 2 shown in FIG. 7, wireless communication system 700 of Embodiment 3 shown in FIG. 15 includes service areas E11 through E14 formed by access points A21 through A24. Therefore, in the following description, points M11 through M13 in FIG. 15, FIG. 21, and FIG. 22 are assigned the same reference codes as the points used in Embodiment 2.

Also, a schedule set in advance by the user is a schedule table stored in storage section 801 of wireless communication apparatus 800. This schedule table is formed by information input by the user from input section 201a after schedule application initiation in wireless communication apparatus 800 being stored in storage section 801 via control section 814.

In this embodiment, the schedule table stored in storage section 801 is similar to schedule table 510 stored in storage section 501 in Embodiment 2, and therefore wireless communication apparatus 800 will be described as moving in accordance with schedule table 510.

That is to say, here, schedule D11 indicates a schedule to move to "∘∘ Station" at time "12:00", and indicates a state in which wireless communication apparatus 800 is located at point M11 of service area E11 shown in FIG. 15. Also, schedule D12 indicates a schedule to move to "∘x Park" at time "14:00", and indicates that wireless communication apparatus 800 is located at point M12 of service area E12 shown in FIG. 21. Furthermore, schedule D13 indicates moving to "ΔΔ Coffee Shop" at time "15:00", and indicates that wireless communication apparatus 800 is located at point M13 of service area E14 shown in FIG. 22.

First, when input for communication application initiation is performed by the user of wireless communication apparatus 800 in wireless communication system 700 shown in FIG. 15, that information is reported to input section 201a via control section 814. On receiving this report, control section 814 performs communication application initiation, and also reports the fact that the communication apparatus has been initiated to state change detection section 806.

On receiving this report, state change detection section 806 detects communication application initiation, and reports this to profile information acquisition section 803 via control section 814 (step S20).

On receiving this report from control section 814, profile information acquisition section 803 reads profile information (here, profile information P31, P32, and P34) stored in nonvolatile storage section 506 (step S21).

Profile information indicates information necessary for connecting to an access point as described above, and it is possible for this information to be used as information for identifying an access point.

This profile information is associated with <place> set in a schedule table in storage section 801, and profile information acquisition section 803 reads profile information from nonvolatile storage section 506 using information associating <place> with profile information.

Reading of profile information by profile information acquisition section 803 from nonvolatile storage section 506 using a schedule table is the same as in the case of profile information acquisition section 206a of Embodiment 2 described using FIG. 12.

That is to say, as shown in FIG. 12, in storage section 801, <place> information in a schedule in a schedule table is managed in separate one-dimensional arrays, and a pointer to an address of profile information stored in nonvolatile storage section 506 is associated with each array. It is also assumed that, for the individual schedules, storage section 801 assigns and stores addresses (for example, "1000", "1002", "1004") in the order of movement of wireless communication apparatus 800.

In this way, by reading <place> in a schedule in storage section 801, profile information acquisition section 803 can use a pointer associated with the read <place> to read profile information of an address indicated by the pointer from nonvolatile storage section 506.

After profile information has been read in this way by profile information acquisition section 803, profile information acquisition section 803 reports read termination to priority order setting section 808 via control section 814.

On receiving this profile information read termination report, priority order setting section 808 references <time> set in schedules D11, D12, and D13 of storage section 501, and performs priority order setting of profile information acquired by profile information acquisition section 803 (step S22).

Priority order setting performed by priority order setting section 808 in step S22 is similar to the processing by priority order setting section 504 in Embodiment 2 (step S12), and therefore a description thereof is omitted here.

With regard to the data structure of profile information priority-ordered by priority order setting section 808 in step S22, priority order setting is performed for profile information in the order: profile information P31→P32→P34, as shown in FIG. 13.

On completion of the priority order setting processing, priority order setting section 808 reports this to priority profile information selection section 213 via control section 814.

On receiving this priority order setting termination report, priority profile information selection section 213 selects highest-priority profile information P31, and reads this from storage section 801 (step S23). On completion of reading of the profile information selected by priority profile information selection section 213, priority profile information selection section 213 sends a termination report to received radio field intensity acquisition section 215 via control section 814.

On receiving this priority profile information selection termination report, received radio field intensity acquisition section 215 acquires the intensity of the received radio wave from the access point indicated by the SSID set in selected profile information P31 (step S24).

Specifically, in step S24, received radio field intensity acquisition section 215 references the SSID set in profile information P31, and issues a probe request to an access point via control section 814 and wireless LAN interface section 202. The access point that receives the probe request reports its response thereto to received radio field intensity acquisition section 215 via wireless LAN interface section 202 and control section 814. Using this response signal, received radio field intensity acquisition section 215 measures the reception intensity of the received radio wave. The result of this measurement is reported to access point connection determination section 810 via control section 814.

On receiving this measurement result, access point connection determination section 810 performs access point connection determination—that is, determines whether or not it is possible to connect to the access point that transmitted the received signal (step S25).

If access point connection determination section 810 determines in step S25 that connection to the access point is possible, control section 814 issues a connection request to the access point via wireless LAN interface section 202. This connection request is made by referencing information set in profile information P31. The access point that receives the connection request responds to wireless communication apparatus 800, and in wireless communication apparatus 800 this is reported to access point connection determination section 810 via wireless LAN interface section 202 and control section 814. Also, completion of connection to access point A21 of access point service area E11 is reported to control section 814 from wireless LAN interface section 202, control section 814 issues a processing request to priority order setting section 808, and the processing flow proceeds to step S26. The content of the processing request is to read profile information stored in storage section 801 and perform a priority order change in order to perform connection quickly to the access point (here, A22) of the service area (here, E12) that is the next destination.

If access point connection determination section 810 determines in step S25 that connection is not possible, a report is made to service area information acquisition section 804 via control section 814 for execution of collection of service area information, and the processing flow proceeds to step S36.

In step S26, priority order setting section 808 changes the priority order set for profile information.

Specifically, in step S26, priority order setting section 808 makes a lowest-priority setting for profile information P31 set as connection information for currently connected access point A21, as having a low possibility of being used when subsequent wireless communication apparatus 800 movement occurs. Also, priority order setting section 808 sets profile information P32, in which connection information for access point A22 forming service area E12 that is the next destination is set, as highest-priority profile information. Furthermore, priority order setting section 808 sets the second-highest priority for profile information P34. An example of the result of a priority order change is as shown in FIG. 14, and according to this priority-ordered profile information, preparation can be made for quick access point connection when moving to the place set in next schedule D12.

After this priority order setting processing, state change detection section 806 determines whether or not the reception level of a beacon from the connected access point is lower than or equal to a threshold value (step S27).

If the reception level of a beacon from the connected access point exceeds the threshold value in step S27, step S27 processing is repeated, and connection to the currently connected access point is continued. By this means, wireless communication apparatus 800 can receive good service provision via the connected access point.

That is to say, in wireless communication apparatus 800, a connection request to access point A22 that is the next destination is issued when the reception level of a beacon from currently connected access point A21 is detected to be lower than or equal to the threshold value by state change detection section 806.

For example, assume that wireless communication apparatus 800 moves from point M1 of local service area E11 to point M12 of adjacent service area E12 in wireless communication system 700, as shown in FIG. 21.

When wireless communication apparatus 800 moves in this way, on detecting that the reception level of a beacon from access point A21 received via wireless LAN interface section 202 and control section 814 has become lower than or equal to the threshold value, state change detection section 806 reports this fact to control section 814. Control section 814 conveys the above report to priority profile information selection section 213, and the processing flow proceeds to step S28.

In step S28, on receiving the report of the beacon reception level being lower than or equal to the threshold value, priority profile information selection section 213 selects highest-priority profile information P32, and reads this from storage section 801. On completion of the read processing, priority profile information selection section 213 sends a termination report to received radio field intensity acquisition section 215 via control section 814, and the processing flow proceeds to step S29.

When priority profile information is selected by priority profile information selection section 213, received radio field intensity acquisition section 215 acquires received radio field intensity of a signal transmitted from the access point corresponding to the selected profile information (step S29).

Specifically, in step S29, received radio field intensity acquisition section 215 receives a priority profile information selection termination report from control section 814, references the SSID set in profile information P32, and issues a probe request via control section 814 and wireless LAN interface section 202. An access point that receives the probe request reports a response to that request to received radio field intensity acquisition section 215 via wireless LAN interface section 202 and control section 814. Received radio field intensity acquisition section 215 measures radio field intensity from the reported signal, and reports the result to access point connection determination section 810 via control section 814.

On receiving this measurement result, access point connection determination section 810 performs access point connection determination—that is, determines whether or not it is possible to connect to the access point that transmitted the received signal (step S30). If it is determined that connection is possible, control section 814 issues a connection request to the access point via wireless LAN interface section 202. The connection request is made by referencing information set in profile information P32. The access point that receives the above connection request returns a response to wireless communication apparatus 800. This response is reported to access point connection determination section 810 via wireless LAN interface section 202 and control section 814. If it is determined that connection is not possible, a report is made to service area information acquisition section 804 via control section 814 for execution of service area information collection, and the processing flow proceeds to step S36.

When completion of connection to service area E12 access point A22 is reported to control section 814 via wireless LAN interface section 202, a processing request is issued to priority order setting section 808, and the processing flow proceeds to step S31.

In step S31, priority order setting section 808 reads profile information stored in storage section 801, and sets a priority order.

Figure 23:
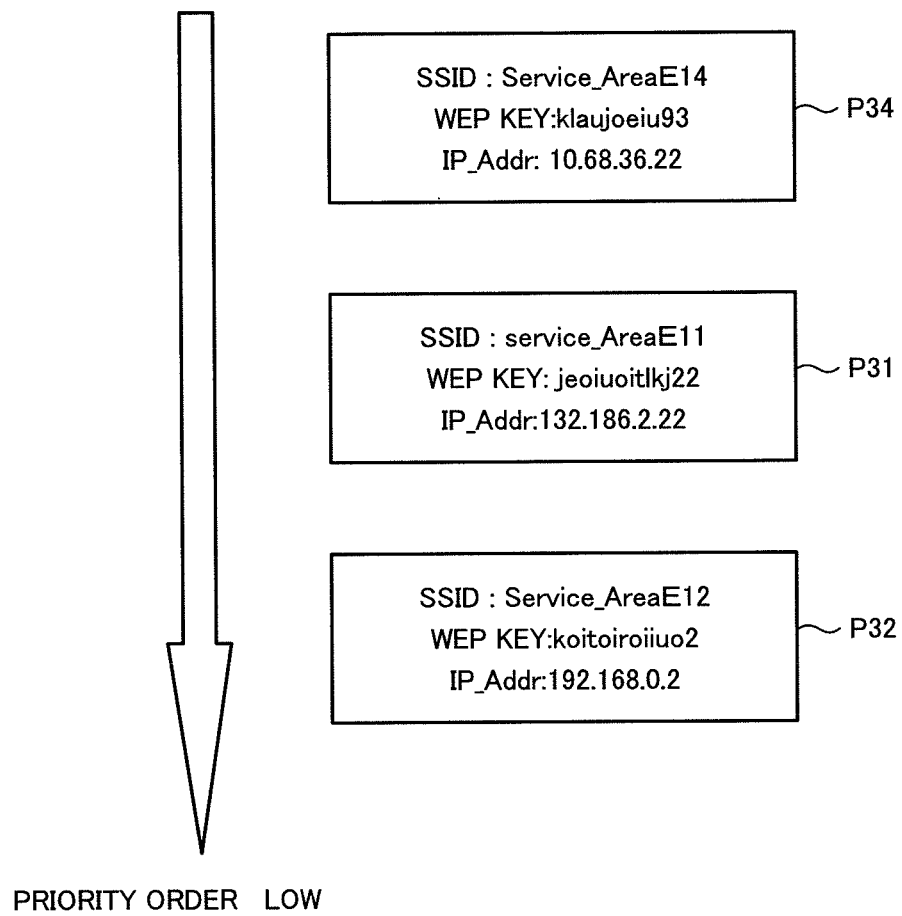
FIG. 23 is a drawing showing the result of a priority order setting change for profile information.

In step S31, priority order setting section 808 makes a third-highest priority setting for profile information P32, in which connection information of currently connected access point A22 is set, since it has a low possibility of being used when subsequent movement occurs, and sets profile information P34, in which connection information for access point A24 forming service area E14 that is the next destination is set, as highest-priority profile information. FIG. 23 shows the result of the priority order setting change for profile information.

After this priority order setting processing, state change detection section 806 determines whether or not the reception level of a beacon from connected access point A22 is lower than or equal to a threshold value (step S32).

As in step S27, if the reception level of a beacon from the connected access point exceeds the threshold value in step S32, step S32 processing is repeated, and connection to currently connected access point A22 is continued.

When state change detection section 806 detects that the reception level of a beacon from access point A22 has become lower than or equal to the threshold value, state change detection section 806 reports this fact to control section 814, control section 814 conveys the report to profile information acquisition section 803, and the processing flow proceeds to step S33.

In this case, it is assumed that wireless communication apparatus 800 present in service area E12 has started moving toward service area E13, which is a destination that differs from the information set in schedule D13, as shown in FIG. 22.

On receiving the above report, priority profile information selection section 213 selects highest-priority profile information P34, and performs storage section 801 read processing (step S33). On completion of the read processing, priority profile information selection section 213 sends a report indicating that reading has ended to received radio field intensity acquisition section 215 via control section 814.

In step S34, received radio field intensity acquisition section 215 acquires received radio field intensity using the signal transmitted from the access point indicated in the selected profile information.

Specifically, in step S34, on receiving the above report from control section 814, received radio field intensity acquisition section 215 references the SSID set in profile information P34, and issues a probe request to an access point via control section 814 and wireless LAN interface section 202. The access point that receives the probe request reports a response to this request to received radio field intensity acquisition section 215 via wireless LAN interface section 202 and control section 814. Received radio field intensity acquisition section 215 measures radio field intensity from the reported signal, and reports the result to access point connection determination section 810 via control section 814.

Access point connection determination section 810 performs access point connection determination based on the above result (step S35). If connection can be determined to be possible, a connection request is issued to the access point via control section 814 and wireless LAN interface section 202. The connection request is made by referencing information set in profile information P34. The access point that receives this connection request returns a response to wireless communication apparatus 800. This response is reported to access point connection determination section 810 via wireless LAN interface section 202 and control section 814. If it is determined that connection is not possible, a request for service area information collection is made to service area information acquisition section 812 via control section 814, and the processing flow proceeds to step S36.

Here, since the user has performed movement to movement location E13 differing from that in schedule D13, as shown in FIG. 22, received radio field intensity acquisition section 215 cannot acquire received radio field intensity, and access point connection determination section 810 determines that connection cannot be performed.

When received radio field intensity cannot be acquired (access point connection cannot be performed), access point connection determination section 810 determines that movement different from that in the schedule has been performed, and reports this to service area information acquisition section 812 via control section 814 so as to have service area information collection performed again for an adjacent neighboring service area (step S36).

On receiving the above report, service area information acquisition section 812 issues a neighboring service area information acquisition request to access point A22 forming service area E12 in which wireless communication apparatus 800 is located (step S37). The acquisition request is reported to wireless LAN interface section 202 via control section 814. The access point returns service area information in response to the acquisition request from wireless communication apparatus 800. The response from the access point is reported to control section 814 via wireless LAN interface section 202, and the acquired information is stored in storage section 801. The acquired service area information is here assumed to be that shown in FIG. 17.

On receiving a report of service area E11, E13, and E14 information acquisition from service area information acquisition section 812 via control section 814, profile information acquisition section 803 references service area information stored in storage section 801. On learning that adjacent service areas are E11, E13, and E14, profile information acquisition section 803 performs reading of service area E11, E13, and E14 profile information P31, P33, and P34 stored in advance in nonvolatile storage section 506, and stores this profile information in storage section 801 (step S38).

Figure 24:
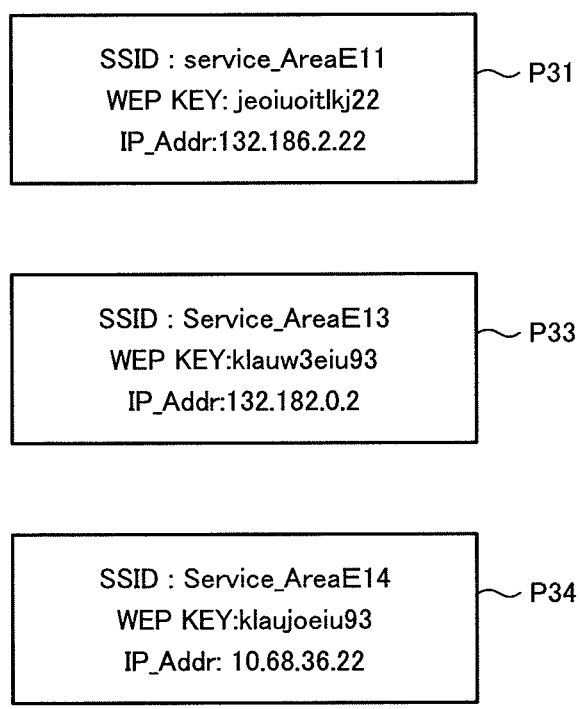
FIG. 24 is a drawing showing an example of profile information read from a nonvolatile storage section by a profile information acquisition section.

FIG. 24 is a drawing showing an example of profile information read from nonvolatile storage section 506 by profile information acquisition section 803. In FIG. 24, profile information P31 indicates service area E11 profile information, profile information P33 indicates service area E13 profile information, and profile information P34 indicates service area E14 profile information.

When storage of profile information P31, P33, and P34 in storage section 801 is reported from profile information acquisition section 803 to priority order setting section 808 via control section 814, priority order setting section 808 performs priority order setting for profile information P31, P33, and P34 of access points A11, A13, and A14 present in service areas E11, E13, and E14, based on the information acquired by service area information acquisition section 812 and the information acquired by profile information acquisition section 803 (step S39).

For example, since wireless communication apparatus 800 is located in service area E12, and service areas E11, E13, and E14 are adjacent and have a high possibility of being moved to, profile information P31, P33, and P34 is set as high-priority profile information. With regard to the priority order setting of profile information P31, P33, and P34 at this time, there is the same degree of possibility of moving to service areas E11, E13, and E14 formed by access points set in profile information P31, P33, and P34 based on currently acquired information, and therefore, as described above, priority order setting is performed randomly here, and profile information P34 is set as highest-priority profile information. As for priority order setting of the other profile information, P33 is set as second-highest-priority profile information, and profile information P31 as third-highest priority profile information. Profile information P32 in which currently connected access point information is included may indicate that received radio field intensity has become low due to movement and the user is preparing to leave service area E12, and it can be determined that the possibility of subsequent use is low. Therefore, priority order setting is performed so that this is lowest-priority profile information. As a result, priorities are set in the order P34→P33→P31→P32.

Figure 25:
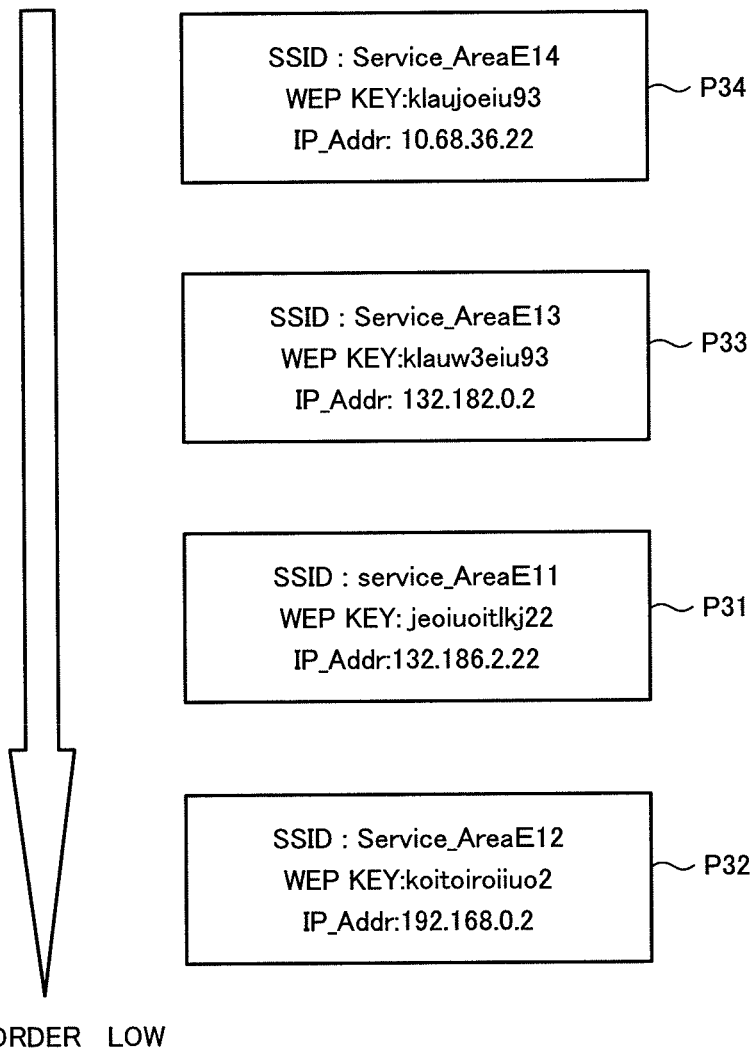
FIG. 25 is a drawing explaining a state in which priority order setting of profile information is performed by a priority order setting section, and profile information is sorted in that order.

FIG. 25 is a drawing explaining a state in which priority order setting of profile information is performed by priority order setting section 808, and profile information is sorted in that order. Profile information P34 is managed as highest-priority profile information, and profile information P33 is managed as next-highest-priority profile information. The fact that priority-ordered profile information has been stored in storage section 801 is reported from priority order setting section 808 to priority profile information selection section 213 via control section 814.

On receiving this report from control section 814, priority profile information selection section 213 selects highest-priority profile information P34 in service area E12 in which wireless communication apparatus 800 is currently located, and performs storage section 801 read processing (step S40).

On completion of this read processing, priority profile information selection section 213 sends a termination report to received radio field intensity acquisition section 215 via control section 814.

On receiving the above report, received radio field intensity acquisition section 215 references the SSID set in selected profile information P34, and issues a probe request via control section 814 and wireless LAN interface section 202. An access point that receives the probe request reports a response to that request to received radio field intensity acquisition section 215 via wireless LAN interface section 202 and control section 814. Received radio field intensity acquisition section 215 measures the radio field intensity of the received signal, and reports the result to access point connection determination section 810 via control section 814 (step S41).

Access point connection determination section 810 performs access point connection determination using the result reported from received radio field intensity acquisition section 215 (step S42). If access point connection determination section 810 can determine that connection is possible is step S42, access point connection determination section 810 references the access point information set in profile information P34 selected by priority profile information selection section 213, and issues an access point connection request. The connection request is reported to the access point via control section 814 and wireless LAN interface section 202. A response from the access point is reported to access point connection determination section 810 via wireless LAN interface section 202 and control section 814. If it is determined that connection is not possible (step S42: NO), access point connection determination section 810 makes a report to priority profile information selection section 213 via control section 814 to select the next-highest-priority profile information.

Specifically, if connection can be determined to be possible in step S42—that is, if a response to the connection request has been received from an access point and connection has become possible (step S42: YES)—communication with that access point is performed. That is to say, it is determined by state change detection section 806 whether or not a beacon reception level is lower than or equal to a threshold value in the next movement (step S43), and if the result is that the beacon reception level is lower than or equal to the threshold value, a processing request is made to service area information acquisition section 804 via control section 814 to collect service area information (the processing flow proceeds to step S37). If the beacon reception level exceeds the threshold value in step S43 (step S43: NO), connection to the currently connected access point is continued.

As described above, according to wireless communication apparatus 800 of Embodiment 3, if highest-priority profile information is selected from previously priority-ordered profile information, and access point connection fails, collection of neighboring service area information and profile information of those service areas at that point in time is performed, and priority order setting is executed for the profile information, enabling a connection request to an access point with low connection capability to be avoided, and making a reduction in power consumption possible.

Wireless communication apparatuses 200, 500, and 800 according to the present invention are not limited to the above embodiments, and it is possible for various modifications thereof to be implemented.

In wireless communication apparatuses 200, 500, and 800 in the above embodiments, an SSID used for connection to an access point has been assumed to be identification information for one access point, but an SSID is not limited to this, and may also be identification information for a plurality of access points.

Also, in wireless communication apparatuses 200, 500, and 800 of the above embodiments, it has been assumed that movement out of a service area formed by a connected access point is detected by determination of a reception level from a connection-destination access point using state change detection section 203/806 and received radio field intensity acquisition section 215, but this is not a limitation. For example, wireless communication apparatuses 200, 500, and 800 may be provided with a positioning apparatus such as a GPS apparatus that detects the position of each wireless communication apparatus, and connection to an access point of a service area different from the service area to which the wireless communication apparatus belongs (the local service area) may be performed using distance from the connected access point.

Embodiment 4

Figure 26:
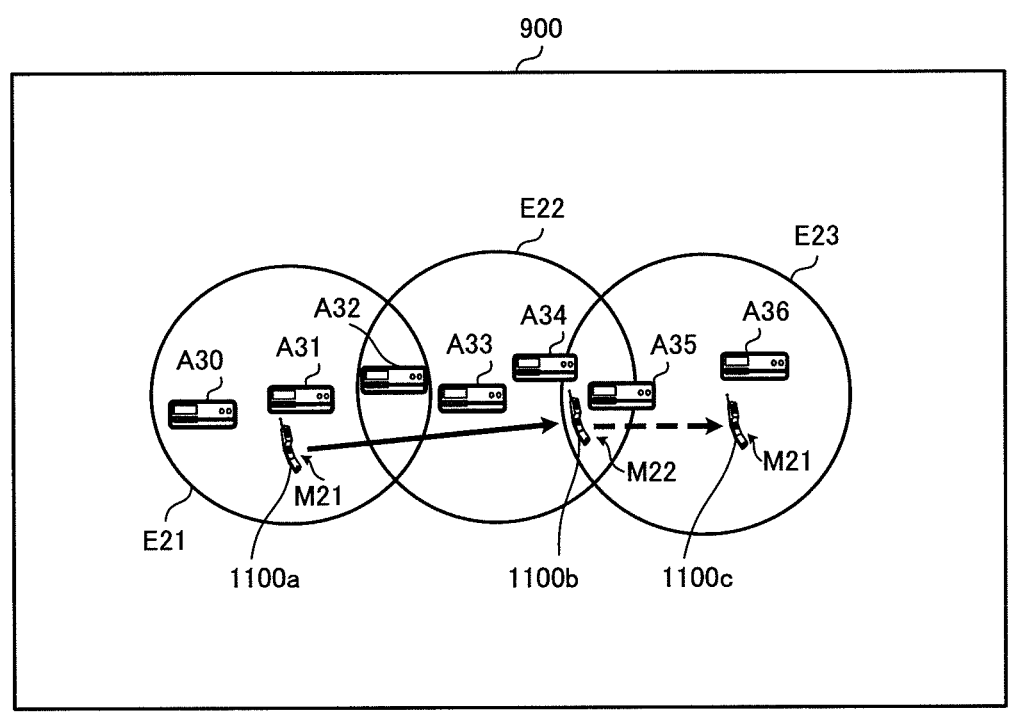
FIG. 26 is a conceptual diagram showing a configuration of a wireless communication system having a wireless communication apparatus according to Embodiment 4 of the present invention.

FIG. 26 is a conceptual diagram showing a configuration of a wireless communication system having a wireless communication apparatus according to Embodiment 4 of the present invention.

Wireless communication system 900 shown in FIG. 26 comprises wireless communication apparatus 1100, access point A21, and base stations (access points) A30 through A36 of service areas E21 through E23 with mutually different service provision sources.

Wireless communication apparatus 1100 of Embodiment 4 differs from wireless communication apparatuses 200, 500, and 800 of Embodiments 1 through 3 in performing connection to an access point in a mobile WiMAX environment conforming to the IEEE802.16 standard, instead of using a wireless LAN method.

Wireless communication apparatus 1100 of Embodiment 4 also differs from wireless communication apparatuses 200, 500, and 800 of Embodiments 1 through 3 in performing quick connection processing with high precision when moving using connection record information, which is information on access points connected to in the past.

Wireless communication apparatus 1100 in a mobile WiMAX environment performs connection to an access point by performing 1) scanning, 2) ranging, 3) basic capability exchange, and 4) an authentication request, in that order.

Here, 1) scanning is processing that scans channels within a defined frequency, and performs radio section scanning and synchronization. Here, this is processing that confirms which base station (access point) the terminal (wireless communication apparatus 1100) can communicate with; 2) ranging is processing that transmits a request MAC (Media Access Control) message to an access point, and requests wireless communication apparatus MAC address registration; 3) basic capability exchange is processing that performs an exchange of radio parameters with an access point; and 4) an authentication request is processing that issues an authentication request to an access point and acquires a key for data encryption.

Thus, access points A30 through A36 forming service areas E21 through E23 in a mobile WiMAX environment are capable of communicating with wireless communication apparatus 1100, respond to a ranging request (MAC address registration request), basic capability exchange (radio parameter negotiation with an access point), an authentication request (authentication request for data encryption key acquisition), and a connection request from wireless communication apparatus 1100, and provide service to wireless communication apparatus 1100.

Access points A30 through A36 each have a neighboring connection information reporting section that reports information on access points located in the neighborhood, and transmit service area information to wireless communication apparatus 1100 using this neighboring connection information reporting section. More specifically, access points A30 through A36 each have a service area information request receiving section that receives a service area information acquisition request from wireless communication apparatus 1100 (to be specific, service area information acquisition section 1112 shown in FIG. 27), and a neighboring connection information reporting section that reports to wireless communication apparatus 1100 issuing a service area information request service area information indicating access points forming the service area in which that wireless communication apparatus 1100 is currently located and a neighboring service area different from the service area in which that wireless communication apparatus 1100 is currently located.

When wireless communication apparatus 1100 executes a change of connection-destination access point through movement out of the service area to which it belongs (the local service area), wireless communication apparatus 1100 performs connection processing using profile information of an access point to be connected to on a priority basis, service area information sent from an access point, and connection record information managed within the wireless communication apparatus.

In wireless communication system 900 shown in FIG. 26, service area E21 is formed by access points A30 and A31, and service area E22 formed by access points A32 through A34 is adjacent to this service area E21. Also, service area E23 formed by access points A35 and A36 is adjacent to service area E22.

In FIG. 26, wireless communication apparatus 1100 located at point M21 in service area E21 is indicated by wireless communication apparatus 1100a, wireless communication apparatus 1100 having moved from service area E21 and now located at point M22 in service area E22 is indicated by wireless communication apparatus 1100b, and wireless communication apparatus 1100 having moved from service area E22 and now located at point M23 in service area E23 is indicated by wireless communication apparatus 1100c.

Wireless communication apparatus 1100 shown in FIG. 26 will now be described.

Figure 27:
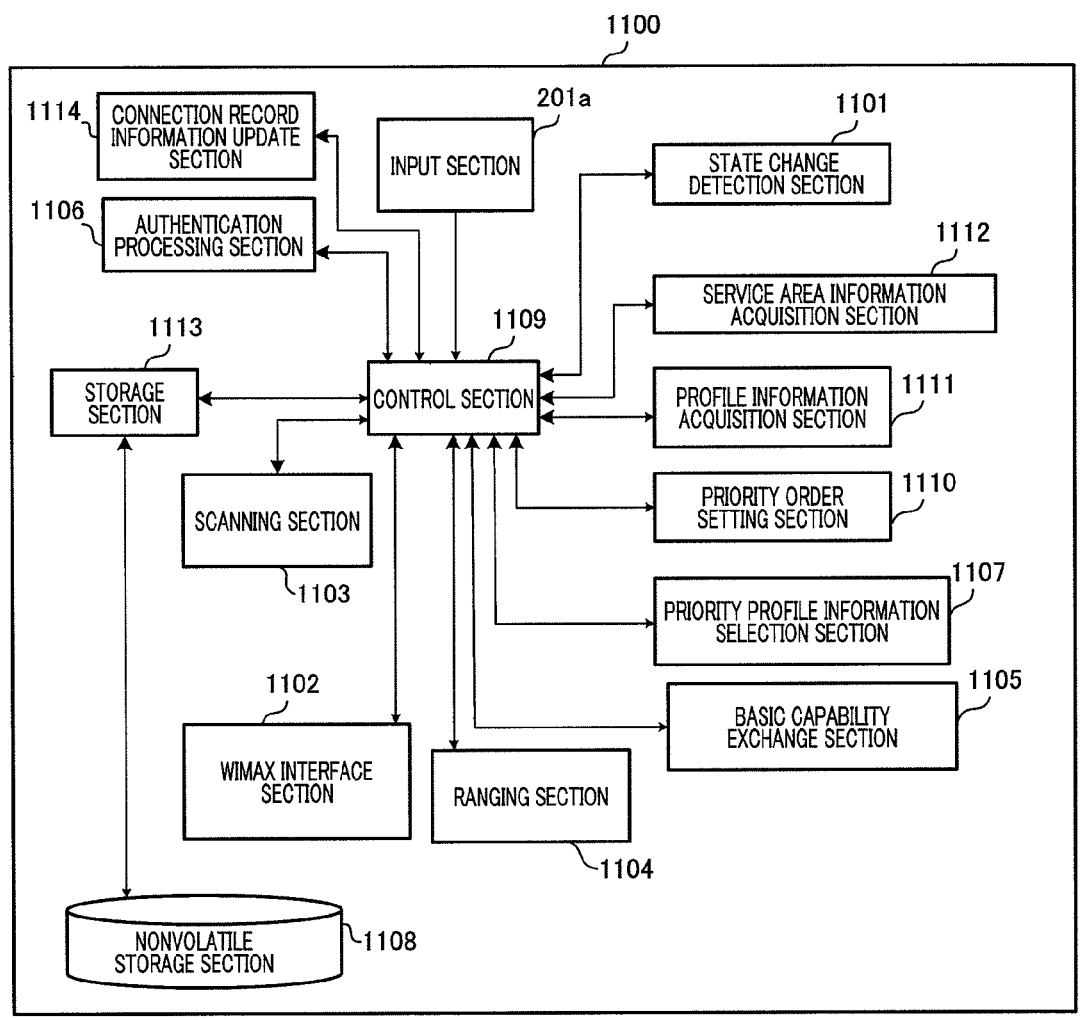
FIG. 27 is a function block diagram showing a principal-part configuration of a wireless communication apparatus according to Embodiment 4 of the present invention.

FIG. 27 is a function block diagram showing a principal-part configuration of wireless communication apparatus 1100 according to Embodiment 4 of the present invention.

Wireless communication apparatus 1100 shown in FIG. 27 has input section 201a, state change detection section 1101, WiMAX interface section 1102, scanning section 1103, ranging section 1104, basic capability exchange section 1105, authentication processing section 1106, priority profile information selection section 1107, nonvolatile storage section 1108, control section 1109, priority order setting section 1110, profile information acquisition section 1111, service area information acquisition section 1112, and storage section 1113.

Input section 201a, state change detection section 1101, WiMAX interface section 1102, scanning section 1103, ranging section 1104, basic capability exchange section 1105, authentication processing section 1106, priority profile information selection section 1107, nonvolatile storage section 1108, control section 1109, priority order setting section 1110, profile information acquisition section 1111, service area information acquisition section 1112, and storage section 1113, are typically implemented by means of LSI (Large Scale Integration), comprising integrated circuits.

These sections 201a and 1101 through 1113 may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry for these sections 201a and 1101 through 1113 is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used for sections 201a and 1101 through 1113. Furthermore, integration of sections 201a and 1101 through 1113 may be performed by means of an integrated circuit implementation technology whereby LSI is replaced by a different technology as an advance in, or derivation from, semiconductor technology. For example, integration of sections 201a and 1101 through 1113 may be performed by the application of biotechnology.

Input section 201a is the same kind of section as input section 201, and receives user operation input via an operating key or the like, for example, which is output to control section 1109 and performs various kinds of operations in wireless communication apparatus 1100. For example, a communication application initiation start request is output to state change detection section 1101 via control section 1109.

State change detection section 1101 has a different determination object from that of state change detection section 203, but has almost the same basic configuration.

That is to say, state change detection section 1101 detects a change in the usage state of wireless communication apparatus 1100 itself using information input via control section 1109, and outputs this to control section 1109.

Specifically, state change detection section 1101 detects a communication application initiation directive input by a user via input section 201a as a state change of wireless communication apparatus 1100 itself, and acquires received radio field intensity. Whereas received radio field intensity acquisition and measurement were performed by a received radio field intensity acquisition section in a wireless LAN environment, it is assumed that a function for processing equivalent to received radio field intensity acquisition is provided in ranging section 1104, and a function for processing equivalent to received radio field intensity measurement is provided in state change detection section 1101.

On receiving a DL-MAP (Downlink Map) message (including information such as a base station ID) from currently connected access point A34, state change detection section 1101 determines the reception level of the received DL-MAP message.

That is to say, state change detection section 1101 measures the reception level of a DL-MAP message input via control section 1109, and determines whether or not the measured reception level is lower than or equal to a threshold value. Determination by state change detection section 1101 is performed, for example, by comparing the reception level of the received DL-MAP message with a preset threshold value. If the result of this determination is that the reception level exceeds the threshold value, WiMAX interface section 1102 is instructed via control section 1109 to continue connection to the currently connected access point, whereas if the result of the determination is that the reception level is lower than or equal to the threshold value, this fact is reported to service area information acquisition section 1112 via control section 1109.

WiMAX interface section 1102 performs signal transmission/reception to/from an access point forming a service area. For example, WiMAX interface section 1102 receives a DL-MAP message and service area information issued by an access point, and outputs the received DL-MAP message signal and service area information to control section 1109.

Also, WiMAX interface section 1102 receives a signal from service area information acquisition section 1112, input via control section 1109, to the currently connected access point.

Furthermore, WiMAX interface section 1102 transmits a request MAC message, input via control section 1109, to an access point to which connection is possible (equivalent to a probe request and connection request in a wireless LAN communication environment), and also receives a request MAC message response from that access point and outputs that response to control section 1109.

Scanning section 1103 performs scanning processing of radio waves emitted from access points A30 through A36, ascertains to which access point connection is possible, and outputs an access point to which connection is possible to control section 1109. Scanning processing refers to the execution of radio section scanning and synchronization processing of radio waves emitted from access points using a frequency defined within wireless communication apparatus 1100.

Ranging section 1104 outputs to control section 1109 a request MAC (Media Access Control) message for transmission to an access point to which connection is possible at transmission timing identified by scanning section 1103 using a signal input via control section 1109.

Also, ranging section 1104 outputs an access point response to communication power exchanged via control section 1109 to authentication processing section 1106 via control section 1109.

Basic capability exchange section 1105 receives an access point request MAC message response from WiMAX interface section 1102 input via control section 1109, and performs communication power exchange by performing radio parameter negotiation with the access point that responded.

Authentication processing section 1106 receives a report from the ranging section, issues an authentication request to an access point via control section 1109 and WiMAX interface section 1102, and also acquires an authentication response including a key for encrypting data from an access point.

Also, authentication processing section 1106 receives an authentication response and issues a request for connection record information 332 update processing to connection record information update section 1114.

Priority profile information selection section 1107 receives information indicating priority order setting termination input via control section 1109, selects highest-priority profile information for the current location of wireless communication apparatus 1100, and reads this from storage section 1113. After terminating read processing, priority profile information selection section 1107 outputs a termination report to scanning section 1103 via control section 1109.

Nonvolatile storage section 1108 stores access point profile information. Reading and writing of this stored profile information is performed.

Profile information includes such information as a base station ID, frequency information used for scanning, and a digital modulation method used for basic capability exchange. That is to say, profile information indicates information necessary for performing connection to an access point, and is therefore stored for each access point.

Control section 1109 outputs a DL-MAP message signal from WiMAX interface section 1102 to state change detection section 1101, and also outputs service area information from WiMAX interface section 1102 to service area information acquisition section 1112.

Control section 1109 also outputs an acquisition request for access point information received from service area information acquisition section 1112 to WiMAX interface section 1102.

Control section 1109 also outputs a signal from profile information acquisition section 1111 to priority order setting section 1110.

Control section 1109 also outputs a signal indicating profile information read termination input from profile information acquisition section 1111 to priority order setting section 1110.

Control section 1109 also outputs an access point to which connection is possible input from scanning section 1103 to ranging section 1104.

Control section 1109 outputs a request MAC message from ranging section 1104 to WiMAX interface section 1102, and also outputs an access point request MAC message response input from an access point via WiMAX interface section 1102 to basic capability exchange section 1105.

Priority order setting section 1110 receives a profile read termination report, references service area information and connection record information, and performs priority order setting of profile information acquired by profile information acquisition section 1111. Specifically, based on input information, state change detection section 1101 performs priority order setting giving priority to profile information of an access point located in the direction of movement from among profile information of access points located in the neighborhood of the currently connected access point and access points located in the surrounding region.

Also, if there are a plurality of access points located in the neighborhood of the connected access point as profile information for connecting to an access point located in the direction of movement, priority order setting section 1110 sets profile information indicating an access point for which there is no connection record in the course of movement so as to have the highest priority.

Profile information acquisition section 1111 receives a signal indicating service area information storage confirmation input from control section 1109, and reads items of schedule information (see FIG. 29) stored in storage section 1113 via control section 1109. Also, profile information acquisition section 1111 reads profile information corresponding to the read items of schedule information (hereinafter referred to as "schedules") from nonvolatile storage section 1108, and stores this profile information in storage section 1113. Profile information acquisition section 1111 confirms the storage of profile information in storage section 1113, and outputs a signal indicating this to control section 1109. Location information (for example, a pointer) indicating a profile information location (address) in nonvolatile storage section 1108 is associated with <place> of schedule information in storage section 1113. Using this location information, profile information acquisition section 1111 acquires corresponding profile information from nonvolatile storage section 1108.

On completion of profile information reading, profile information acquisition section 1111 outputs a signal indicating reading termination to be reported to priority order setting section 1110 to control section 1109.

This profile information is per-access-point information, and indicates information necessary for performing connection to an access point, including such information as a base station ID indicating an access point, frequency information used for scanning, and a digital modulation method used for basic capability exchange. Profile information does not include access point location information, and is stored in nonvolatile storage section 1108 for each access point.

Based on state change information detected by state change detection section 1101, service area information acquisition section 1112 reports to transmitting antenna 119 an acquisition request for service area information for a service area located adjacent to or in the surroundings of an access point providing the service area to which wireless communication apparatus 1100 currently belongs (the local service area).

Service area information whose acquisition is requested by service area information acquisition section 1112 is information on an access point located in the region surrounding wireless communication apparatus 1100. For example, service area information has a text-based configuration, and includes <access point information> indicating the base station ID of the currently connected access point or an access point located in the surrounding region (an ID capable of identifying each access point). Service area information also includes <location information> indicating the positional relationship between wireless communication apparatus 1100 and the currently connected access point. Furthermore, service area information includes <connected access point> indicating that this is the currently connected access point, <adjacent access point> indicating information on an access point adjacent to the currently connected access point, and <surrounding access point> indicating information on an access point in the surrounding region.

Service area information acquisition section 1112 stores service area information acquired via control section 1109 in storage section 1113 via control section 1109, confirms storage of the acquired service area information, and outputs a signal indicating confirmation of storage of the acquired service area information to profile information acquisition section 1111 via control section 1109.

Storage section 1113 stores schedule information and service area information in a freely readable fashion.

Here, schedule information includes <time> information indicating a scheduled time, and <place> information indicating a meeting place or destination to be located at <time>, and is stored in storage section 1113 as a schedule table. There is associated with <place> in schedule information, information indicating an access point to be prioritized as a connection destination at a place indicated by that <place>, and it is possible to reference <place> and read access point information linked to <place>.

Also, service area information indicates information on an access point located in the region surrounding wireless communication apparatus (mobile terminal) 1100 including a connection-destination access point. For example, service area information may be associated with location information comprising access point information indicating a connection-destination access point, access point information indicating an access point adjacent to a connection-destination access point, and access point information indicating an access point located in the region surrounding a connection-destination access point.

In storage section 1113, <place> information in a schedule table is managed as a one-dimensional array. A pointer to an address of profile information stored in nonvolatile storage section 1108 is stored associated with each array.

Storage section 1113 also stores connection record information that is connection information of an access point to which wireless communication apparatus 1100 was connected prior to the present time.

Figure 33:
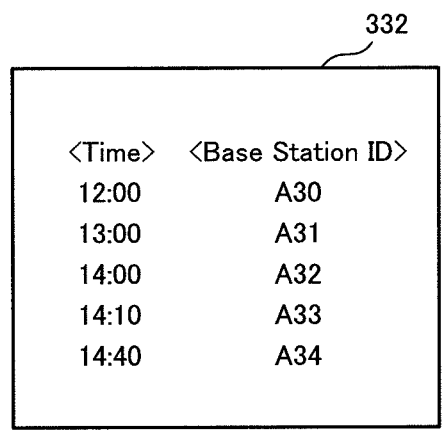
FIG. 33 is a drawing showing an example of connection record information.

Connection record information comprises <time> at which connection occurred, and <base station ID> of the connection destination at that time, stored in associated fashion, in the order of occurrence of access point connections (see FIG. 33). This connection record information is updated by connection record information update section 1114 at timing at which a report (here, an authentication response from an access point in WiMAX communication) is received from a connection-destination access point via WiMAX interface section 1102.

On receiving a report from authentication processing section 1106 via control section 1109, connection record information update section 1114 performs registration processing for the current time and the base station ID of the access point for which authentication was successful in connection record information stored in storage section 1113. Specifically, connection record information update section 1114 reads connection record information from storage section 1113, and records the base station ID of the access point for which authentication processing was successful and the current time acquired from wireless communication system 900 in this read connection record information.

Next, the access point control method used by wireless communication apparatus 1100 according to Embodiment 4 of the present invention will be described.

Figure 28:
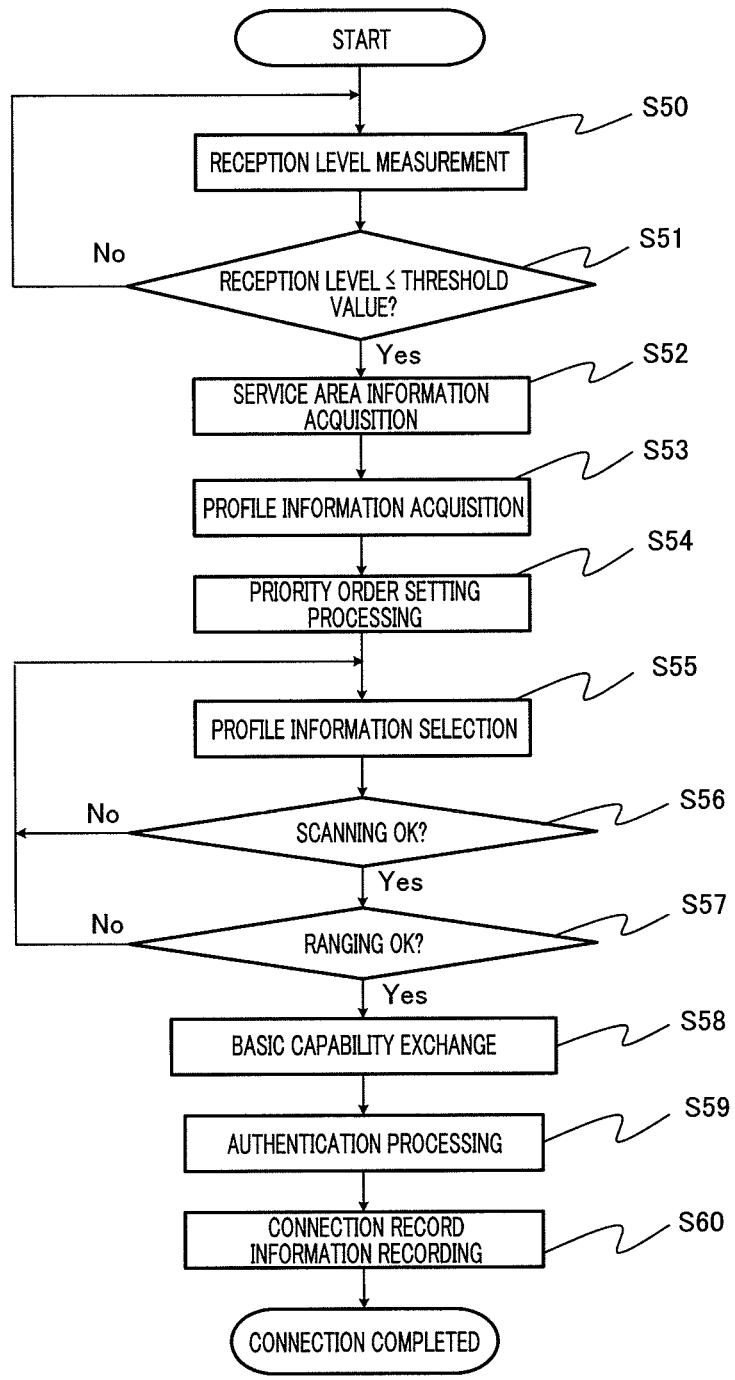
FIG. 28 is a flowchart explaining access point connection by a wireless communication apparatus according to Embodiment 4 of the present invention.

FIG. 28 is a flowchart explaining access point connection by a wireless communication apparatus according to Embodiment 4 of the present invention.

While moving between different service areas, wireless communication apparatus 1100 performs connection to access points forming the service areas using schedule information, connection record information, and so forth.

Here, access point connection will be described by way of example for a case in which wireless communication apparatus 1100 moves through service areas E21, E22, and E23 in that order in accordance with a schedule table including schedule information stored in storage section 1113 in wireless communication system 900 shown in FIG. 26.

Figure 29:
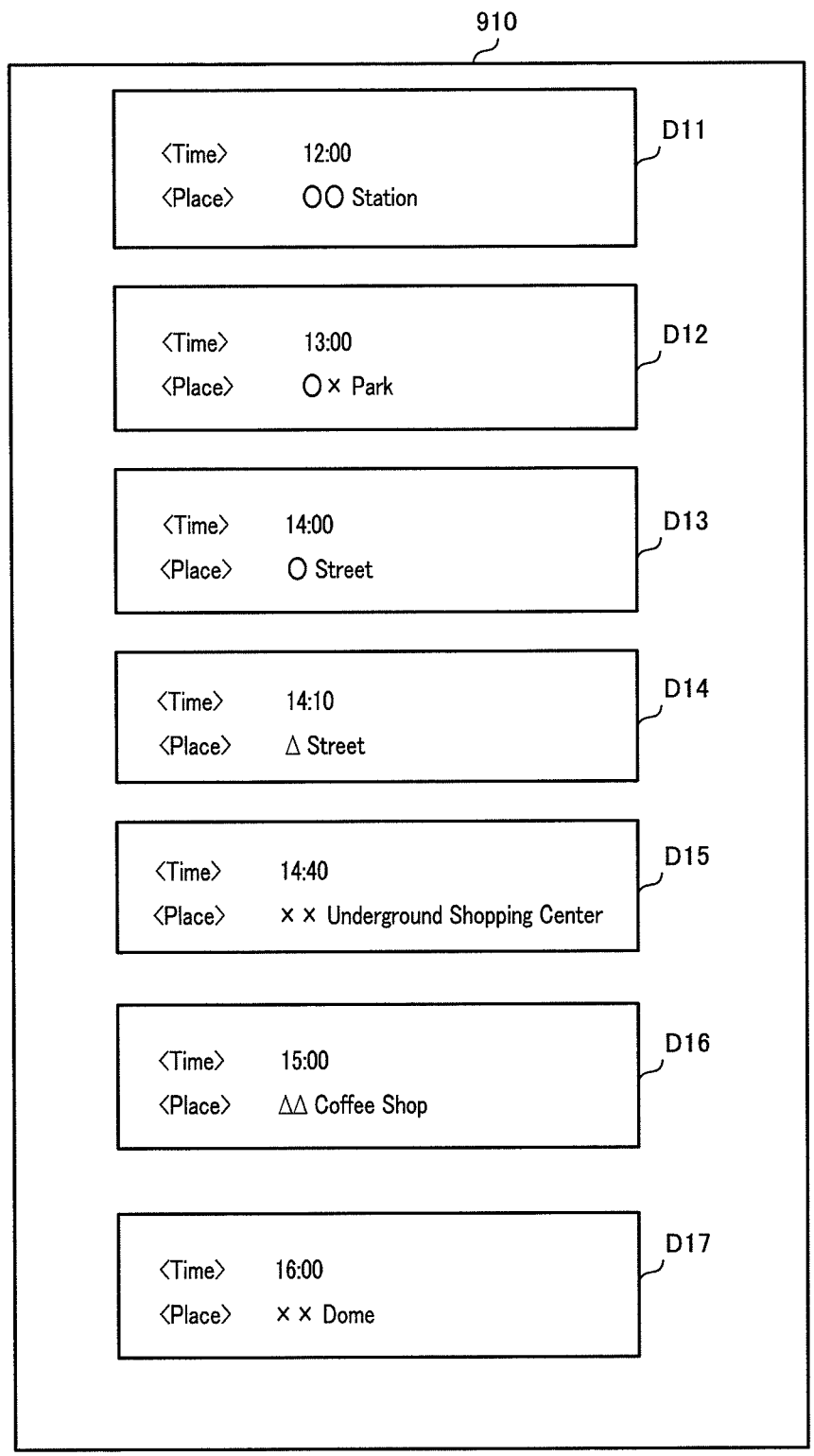
FIG. 29 is a drawing showing an example of a schedule table provided in a wireless communication apparatus according to Embodiment 4 of the present invention.

FIG. 29 is a drawing showing an example of a schedule table provided in a wireless communication apparatus.

Schedule table 910 shown in FIG. 29 is provided with schedules D11 through D17 in which destination <place> and <time> for which being located at that <place> is scheduled are mutually associated.

Specifically, it is assumed that, in wireless communication system 900 (see FIG. 26), wireless communication apparatus 1100 arrived in service area E21 at time 12:00 of schedule D11 of schedule table (schedule information) 910 (see FIG. 29) and connected to access point A30, then moved and arrived in service area E22 at time 14:40 of schedule D15, and is currently connected to access point A34. It is also assumed that wireless communication apparatus 1100 is scheduled to move on to area E23 at time 15:00 of schedule D16.

In wireless communication apparatus 1100, a DL-MAP message including information such as a base station ID issued by currently connected access point A34 is received by WiMAX interface section 1102, and is reported to state change detection section 1101 via control section 1109.

In wireless communication apparatus 1100, state change detection section 1101 measures the reception level (connection reception level) of the DL-MAP message including information such as a base station ID received from currently connected access point A34 (step S50).

Also, state change detection section 1101 determines whether or not the reception level of the measured DL-MAP message (including information such as a base station ID, received from currently connected access point A34) is lower than or equal to a threshold value (step S51).

If the reception level exceeds the threshold value, the processing flow returns to step S50, whereas if the reception level is lower than or equal to the threshold value, state change detection section 1101 outputs a signal indicating this to service area information acquisition section 1112 via control section 1109.

That is to say, in step S51, state change detection section 1101 measures the reception level of the DL-MAP message, and determines whether or not the measured reception level is lower than or equal to a threshold value. If the result of this determination is that the reception level exceeds that threshold value, connection to currently connected access point A34 is continued, whereas if the result of the determination is that the reception level is lower than or equal to the threshold value, this is reported to service area information acquisition section 1112 via control section 1109.

On receiving a report from state change detection section 1101 via control section 1109, service area information acquisition section 1112 issues an acquisition request to the access point providing the service area to which wireless communication apparatus 1100 currently belongs (the local service area: here, access point A34) for service area information of a service area that is adjacent or located in the surrounding region, and acquires service area information (step S52).

On acquiring service area information, service area information acquisition section 1112 outputs a signal indicating service area information acquisition confirmation to profile information acquisition section 1111 via control section 1109.

Specifically, in step S52, on receiving a report from control section 1109, service area information acquisition section 1112 reports an acquisition request to access point A34 providing the service area to which wireless communication apparatus 1100 currently belongs (the local service area) for information on an access point that is adjacent or located in the surrounding region via control section 1109 and WiMAX interface section 1102. On receiving this report, control section 1109 outputs a service area information acquisition request to WiMAX interface section 1102. WiMAX interface section 1102 transmits the signal output by service area information acquisition section 1112 to access point A34. On receiving a service area information acquisition request, access point A34 transmits service area information to the wireless communication apparatus using a neighboring connection information reporting section that reports information on an access point located in the neighborhood. Specifically, a service area information request receiving section receives a service area information acquisition request from wireless communication apparatus 1100 (to be specific, service area information acquisition section 1112 shown in FIG. 27). On receiving a service area information acquisition request, the access point reads service area information indicating access points forming the service area in which wireless communication apparatus 1100 that issued the service area information request is currently located and a neighboring service area different from the service area in which wireless communication apparatus 1100 is currently located (access points belonging respectively to the service area formed by that access point, a service area adjacent to that service area, and a service area in the surrounding region), and transmits this information to wireless communication apparatus 1100 that issued the service area information request via the neighboring connection information reporting section.

Service area information transmitted from access point A34 is received by WiMAX interface section 1102 of wireless communication apparatus 1100, and the received signal is reported to service area information acquisition section 1112 via service area information acquisition section 1112. Service area information acquisition section 1112 stores acquired service area information in storage section 1113, and when storage of the acquired service area information is confirmed, this is reported to profile information acquisition section 1111 via control section 1109.

The data structure of acquired service area information will now be described.

FIG. 30 is a drawing showing examples of service area information acquired from an access point and stored in storage section 1113.

Service area information 330 and 331 acquired by service area information acquisition section 1112 shown in FIG. 30 indicate information on access points located around wireless communication apparatus 1100. It is assumed that service area information 330 and 331 have a text-based configuration in this embodiment, and at least one of them is acquired by service area information acquisition section 1112.

First service area information 330 shown in FIG. 30A includes two kinds of information: <Access point information> and <Location information>.

<Access point information> indicates the base station ID of the currently connected access point or an access point located in the surrounding region (an ID capable of identifying each access point), and <Location information> indicates a positional relationship with respect to the currently connected access point.

Here, location information of the currently connected access point in service area information 330 is indicated by "0 (zero)." Also, in service area information 300, location information with a minus sign indicates an access point located in a rearward direction opposite to the direction of movement, counting in integer units from the connected access point. For example, <Location information>"−1" associated with A33 indicates an access point located in a rearward direction opposite to the direction of movement, being an access point one removed from the currently connected access point.

Furthermore, in first service area information 300, <Location information> indicated by an integer indicates an access point located in the direction of movement, counting in integer units from the connection-destination access point. For example, <Location information>"1" associated with A35 indicates that this is access point A35 that is one removed from currently connected access point A34.

Unlike first service area information 330, second service area information 331 shown in FIG. 30B here includes three kinds of information: <Connected access point>, <Adjacent access point(s)>, and <Surrounding access point(s)>.

In second service area information 331, <Connected access point> indicates an access point having base station ID "A34" as the currently connected access point. Also, <Adjacent access point(s)> indicates access points having base station IDs "A33" and "A35" as access points adjacent to the currently connected access point. Furthermore, <Surrounding access point(s)> indicates access points having base station IDs "A30", "A31", "A32", and "A36" as surrounding access points other than adjacent access points. Access points indicated by <Connected access point>, <Adjacent access point(s)>, and <Surrounding access point(s)> each form above-described predetermined different service areas.

One of such first service area information 330 and second service area information 331 is acquired by service area information acquisition section 1112.

When either first service area information 330 or second service area information 331 is acquired by service area information acquisition section 1112 and stored in storage section 1113, a signal indicating storage confirmation is input to profile information acquisition section 1111 via control section 1109 together with the service area information.

On receiving a signal from service area information acquisition section 1112 via control section 1109, profile information acquisition section 1111 reads profile information corresponding to access points of the acquired service area information from nonvolatile storage section 1108 using schedule information stored in advance in storage section 1113 (here, schedules D11, D12, D13, D14, D15, D16, D17, and so forth, shown in FIG. 29).

In addition, profile information acquisition section 1111 then stores the profile information in storage section 1113. When the profile information is stored in storage section 1113, this fact is reported to priority order setting section 1110 via control section 1109 (step S53).

Figure 31:
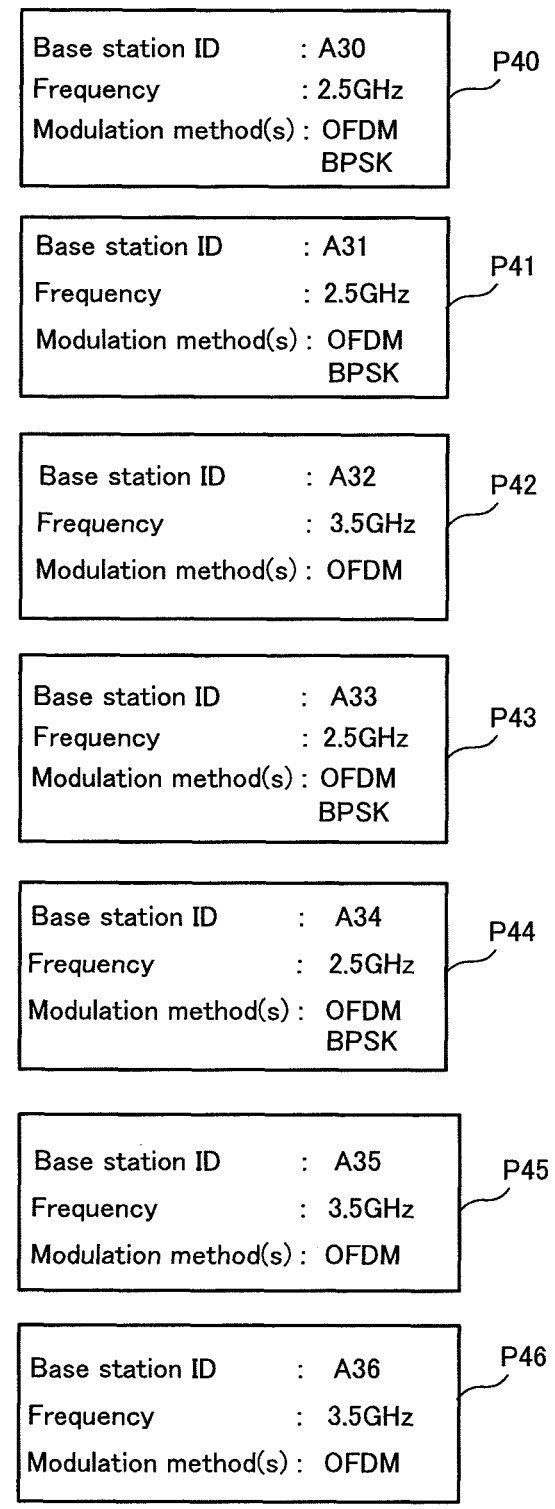
FIG. 31 is a drawing showing an example of profile information read from a nonvolatile storage section by a profile information acquisition section of a wireless communication apparatus according to Embodiment 4 of the present invention.

FIG. 31 is a drawing showing an example of profile information read from a nonvolatile storage section by a profile information acquisition section in a wireless communication apparatus of Embodiment 4. Here, profile information P40, P41, P42, P43, P44, P45, and P46 shown in FIG. 31 corresponds to schedule information.

The profile information shown in FIG. 31 has a text-based structure, for example, with profile information of access points A30 through A36 that are access points forming service areas being indicated by profile information P40 through P46.

In FIG. 31, profile information P40 includes "A30" as a base station ID for identifying an access point providing service, frequency "2.5 GHz" used for scanning, and digital modulation methods "OFDM" and "BPSK" used for basic capability exchange. The access point indicated by base station ID "A30" belongs to service area E21. Similarly, profile information P41 includes "A31" as a base station ID for identifying an access point providing service, frequency "2.5 GHz" used for scanning, and digital modulation method "OFDM" used for basic capability exchange. The access points indicated by base station IDs "A30" and "A31" belong to service area E21. Thereafter, similarly, profile information P42 through P46 includes information such as a base station ID, a frequency used for scanning, a digital modulation method used for basic capability exchange, and so forth.

In step S53, profile information acquisition section 1111 reads information linked to <place> by referencing <place> set in schedule table 910 schedule information (for example, schedules D11 through D17).

Figure 32:
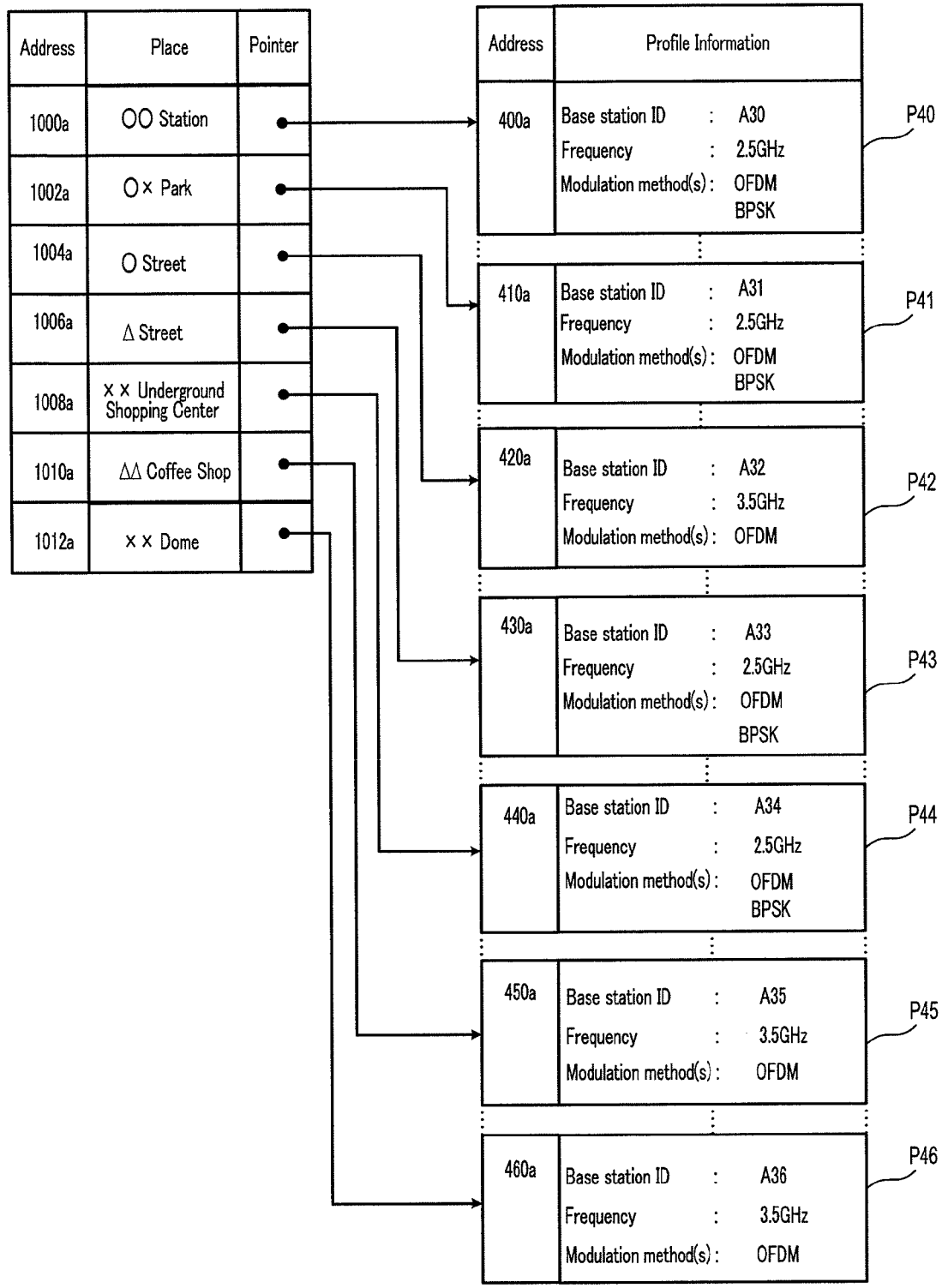
FIG. 32 is a drawing provided to explain reading of profile information using a schedule table by a profile information acquisition section.

FIG. 32 is a drawing provided to explain reading of profile information using a schedule table by a profile information acquisition section.

As shown in FIG. 32, in storage section 1113, <place> information in a schedule table is managed as a one-dimensional array, and a pointer to an address of profile information stored in nonvolatile storage section 1108 is associated with each array. Also, for the individual schedules, storage section 1113 assigns and stores addresses "1000a", "1002a", "1004a", "1006a", "1008a", "1010a", and "1012a."

In this way, by reading <place> in a schedule in storage section 1113, profile information acquisition section 1111 can use a pointer associated with the read <place> to read profile information of an address indicated by the pointer from nonvolatile storage section 1108.

On completion of the above-described profile information reading by profile information acquisition section 1111, profile information acquisition section 1111 reports read termination to priority order setting section 1110 via control section 1109.

On receiving this profile read termination report, priority order setting section 1110 references service area information and connection record information, and performs priority order setting of profile information acquired by profile information acquisition section 1111 (step S54).

In the profile information priority order setting in step S54, different setting methods are used when service area information acquisition section 1112 has acquired first service area information 330 and when service area information acquisition section 1112 has acquired second service area information 331.

<When First Service Area Information 330 has been Acquired>

Priority order setting section 1110 first performs selection of profile information in descending order of possibility of use, using first service area information 330 (see FIG. 30A) acquired by service area information acquisition section 1112.

First service area information 330 acquired by service area information acquisition section 1112 includes a base station ID capable of identifying an access point and location information of the access point having that base station ID, and the nearest access point located in the direction of movement is identified by referencing the location information. In this case, an access point having base station ID "A35" for which location information is "1" is identified as being the access point with the highest possibility of connection. Therefore, priority order setting section 1110 sets profile information P45 containing base station ID "A35" as highest-priority profile information.

Next, priority order setting section 1110 references service area information 330 and determines that an access point having base station ID "A36" is the access point with the next-highest possibility of connection among access points located in the direction of movement. Therefore, priority order setting section 1110 sets profile information P46 containing base station ID "A36" as second-highest-priority profile information. On completion of priority order setting of profile information for connecting to access points located in the direction of movement in this way, priority order setting processing is performed for the remaining profile information.

Priority order setting section 1110 performs priority order setting of profile information necessary for connection to access points located in a direction opposite to the direction of movement in order of proximity to the current location. In this case, when base station IDs are sorted in order of proximity to the current location based on service area information 330 location information, the order is determined to be [A34]→[A34]→[A33]→[A32]→[A31]→[A30]. Therefore, priority order setting section 1110 performs priority order setting of profile information containing information on base station IDs "A34", "A33", "A32", "A31", and "A30" in descending order, and assigns a priority order of P44→P43→P42→P41→P40.

As described above, when service area information acquisition section 1112 performs priority order setting processing for profile information using first service area information 330, a priority order is set for profile information (see FIG. 31) by using access point information and location information contained in service area information 330 acquired from access point A34.

In the situation in this embodiment, priority order setting section 1110 in wireless communication apparatus 1100 sets a connection destination priority order as P45→P46→P44→P43→P42→P41→P40 for profile information P40, P41, P42, P43, P44, P45, and P46.

<When Second Service Area Information 331 has been Acquired>

Priority order setting section 1110 first performs selection of profile information having a high possibility of being used, using second service area information 331 acquired by service area information acquisition section 1112.

Second service area information acquired by service area information acquisition section 1112 contains a base station ID capable of identifying an access point.

Priority order setting section 1110 reads a base station ID of an adjacent access point with a high possibility of being connected to next—that is, a base station ID belonging to an <adjacent access point>—and performs selection of profile information with which that base station ID is associated. In second service area information 331 shown in FIG. 30B, base station IDs of adjacent access points are "A33" and "A35." Therefore, profile information P43 and P45 with which base station IDs "A33" and "A35" are associated is selected from nonvolatile storage section 1108 as profile information with a high possibility of being used.

Next, priority order setting section 1110 references connection record information stored in storage section 1113, and decides on a final profile information priority order.

FIG. 33 is a drawing showing an example of connection record information stored in a storage section. In connection record information table 332 shown in FIG. 33, information on access points to which wireless communication apparatus 1100 was connected prior to the current time (<time> at which wireless communication apparatus 1100 was connected in the past and <base station ID> of the connection destination at that <time>) is stored in the order of times at which the connections occurred. For example, in connection record information table 332 in FIG. 33, an entry containing <time>12:00 and <base station ID> A30 indicates that connection was made to an access point having base station ID "A30" at time 12:00.

By reading connection record information table 332 configured in this way from storage section 1113, priority order setting section 1110 can determine that connections were made to access points having base station IDs "A30," "A31," "A32," "A33," and "A34" in the course of movement. That is to say, priority order setting section 1110 determines that profile information having base station IDs "A30," "A31," "A32," "A33," and "A34" has already been used in the course of movement of wireless communication apparatus 1100, and determines the priorities of profile information necessary for connecting to access point A30 having base station ID "A30," access point A31 having base station ID "A31," access point A32 having base station ID "A32," access point A33 having base station ID "A33," and access point A34 having base station ID "A34," to be low.

From the above, state change detection section 1101 identifies the fact that the access point with the highest possibility of being connected to is A35 (the access point having base station ID "A35"), which has no record of connection in the course of movement and is adjacent, and sets profile information P45 containing base station ID "A35" as highest-priority profile information.

Next, priority order setting section 1110 decides on second-highest-priority profile information. Specifically, priority order setting section 1110 performs identification of an access point that is located in the surrounding region (a <surrounding access point> contained in second service area information 331 in FIG. 30B) and has not been recorded in connection record information table 332 (see FIG. 33).

Here, using second service area information 331 (see FIG. 30B) and connection record information table 332 (see FIG. 33), priority order setting section 1110 determines that an access point having base station ID "A36" is an access point that meets the conditions, and sets profile information P46 containing base station ID "A36" as second-highest-priority profile information.

Then, using second service area information 331 (see FIG. 30B) and connection record information table 332 (see FIG. 33), priority order setting section 1110 performs priority order setting processing for profile information P44 used for connection to currently connected access point A34, and also for profile information P40, P41, P42, and P43 used in the past.

Here, when a situation in which wireless communication apparatus 1100 moves on from point M22 at which it is currently located is considered, profile information that has been used further in the past is determined by priority order setting section 1110 to have a correspondingly lower possibility of being used. Therefore, priority order setting section 1110 performs priority order setting in order from the most recently used profile information.

Priority order setting section 1110 performs reading of connection record table (connection record information) 332 from storage section 1113, and performs <base station ID> reading in order of proximity to the current time. Using the read <base station ID> items, profile information is read from storage section 1113, and priority order setting is performed. That is to say, priorities of items of profile information containing base station IDs are set in the order of those base station IDs read from connection record information 332.

For example, priority order setting section 1110 performs reading of the base station ID of a recently connected access point using connection record information table 332. In this case, <time>14:40 and base station ID "A34" connected at this <time> are read.

Priority order setting section 1110 reads profile information P44 having read base station ID "A34" from nonvolatile storage section 1108, and sets this as the highest-priority profile information among profile information used in the past.

In a similar way, priority order setting section 1110 sets priorities for profile information P43, P42, P41, and P40, and, including profile information P45 and P46 for which priorities were set earlier, finally sets a priority order of profile information P45→P46→P44→P43→P42→P41→P40.

After performing priority order setting as described above, priority order setting section 1110 reports priority order setting termination to priority profile information selection section 1107 via control section 1109.

On receiving this priority order setting termination report, priority profile information selection section 1107 selects highest-priority profile information P43, and reads this from storage section 1113 (step S55).

On completion of profile information reading by priority profile information selection section 1107, a priority profile information selection section 1107 termination report is sent to scanning section 1103 via control section 1109.

Scanning section 1103 performs scanning processing of a radio wave emitted by a base station (step S56).

In step S56, wireless communication apparatus 1100 performs radio section scanning and synchronization processing by means of scanning section 1103 using frequency information contained in profile information (for example, highest-priority A35) and digital modulation method information, and determines whether or not communication with the access point indicated by that profile information (for example, access point A35) is possible. If communication is determined not to be possible, the processing flow returns to step S55, and selection of profile information is performed for setting the next priority.

Specifically, a radio wave emitted from an access point set as a connection destination (for example, access point A35) includes various kinds of parameters (frequency information, a base station ID, a digital modulation method, transmission timing, and suchlike parameters), and above parameters received by WiMAX interface section 1102 are reported to scanning section 1103 via control section 1109.

Scanning section 1103 performs confirmation as to whether the frequency information, base station ID, and digital modulation method contained in profile information (for example, profile information "P45") selected in order by priority profile information selection section 1107 match, and if they match, determines that communication with access point A35 is possible.

If information contained in profile information (for example, profile information "P45") does not match, the processing flow returns to step S54, and selection of the next profile information for which a priority is to be set is performed.

If it is determined that communication with access point A35 is possible as a result of scanning processing by scanning section 1103, this is reported to ranging section 1104 via control section 1109.

On receiving a scanning section 1103 report, ranging section 1104 performs transmission of a request MAC (Media Access Control) message equivalent to a probe request and connection request in a wireless LAN communication environment. The transmitted request MAC message is output to WiMAX interface section 1102 via control section 1109. WiMAX interface section 1102 transmits the output request MAC message to access point A33.

An access point request MAC message response is reported to control section 1109 via WiMAX interface section 1102. That is to say, on receiving an access point request MAC message response presence report, control section 1109 determines that ranging is good (step S57), and reports this to basic capability exchange section 1105.

Basic capability exchange section 1105 performs communication power exchange by performing radio parameter negotiation with an access point (for example, access point A35) (step S58).

Specifically, when wireless communication apparatus 1100 performs communication, parameters including information as to which modulation method is to be used, which frequency band is to be used, and so forth, are read from profile information P43 and output to WiMAX interface section 1102. WiMAX interface section 1102 transmits the output above-described parameters to an access point (for example, access point A35). The access point (for example, access point A35) analyzes the information in the received above-described parameters, and determines whether or not that information comprises a permissible function. If so, this fact is returned as a response. If not, permissible parameters are decided, and that information is transmitted as a response.

A response from an access point (for example, access point A35) predicted to be the next connection destination is received by WiMAX interface section 1102 of wireless communication apparatus 1100, and reported to ranging section 1104. On receiving a response from access point A35, ranging section 1104 reports this to authentication processing section 1106 via control section 1109.

On receiving a report from ranging section 1104, authentication processing section 1106 issues an authentication request to access point A35, and acquires a key for encrypting data from an access point (for example, access point A35) (step S59).

Specifically, authentication processing section 1106 transmits an X.509 certificate containing an encryption algorithm possessed by wireless communication apparatus 1100 to an access point (for example, access point A35) via WiMAX interface section 1102. On receiving the above certificate, an access point (for example, access point A35) checks the attributes of wireless communication apparatus 1100, and decides on an encryption algorithm and protocol to be used. Then the access point returns an authentication response including a key to be used by wireless communication apparatus 1100. The authentication response is reported to authentication processing section 1106 via WiMAX interface section 1102 and control section 1109.

On receiving this report from control section 1109, authentication processing section 1106 issues a request for connection record information table 332 update processing to connection record information update section 1114.

On receiving an update processing request report from authentication processing section 1106 via control section 1109, connection record information update section 1114 performs registration processing for the current time and the base station ID of the access point for which authentication was successful in connection record information 332 (step S60).

Specifically, on receiving a report from authentication processing section 1106, connection record information update section 1114 records the base station ID of the access point for which authentication processing was successful and the current time acquired from the system in connection record information 332 read from storage section 1113.

As described above, according to wireless communication apparatus 1100 of Embodiment 4, by performing priority order setting of profile information based on service area information and connection record information, it is only necessary to issue a connection request to a preset desired access point in the course of movement according to a schedule, quick connection can be performed to that access point, and a reduction in power consumption can be achieved.

Priority order setting of profile information by priority order setting section 1110 in wireless communication apparatus (mobile terminal) 1100 of Embodiment 4 can also be applied to wireless communication system 100 equipped with wireless communication apparatus 200, wireless communication system 400 equipped with wireless communication apparatus 500, and wireless communication system 700 equipped with wireless communication apparatus (mobile terminal) 800.

In these cases, priority order setting sections 211, 504, and 808 in wireless communication apparatuses 200, 500, and 800 in wireless communication systems 100, 400, and 700 are replaced by priority order setting section 1110. In addition, connection record information update section 1114 is added in wireless communication apparatuses 200, 500, and 800, and furthermore, service area information acquisition sections 204 and 812 are given a configuration capable of acquisition of first service area information 330 and second service area information 331 shown in FIG. 30.

A case has here been described by way of example in which the present invention is configured as hardware, but it is also possible for the present invention to be implemented by software. For example, the same kind of functions as those of a wireless communication apparatus according to the present invention can be realized by writing an algorithm of an access point connection method according to the present invention in a programming language, storing this program in memory, and having it executed by an information processing means.

The disclosure of Japanese Patent Application No. 2007-67639, filed on Mar. 15, 2007, including the specification, drawings and abstract, is incorporated herein by reference in its entirety.

INDUSTRIAL APPLICABILITY

A wireless communication apparatus and access point connection method according to the present invention have an effect of making it possible to connect quickly to an access point of a destination service area without wasting power when moving between different service areas, and are suitable for use as/in a mobile wireless communication terminal.

The invention claimed is:

1. A wireless communication apparatus having a processor comprising:
 a state change detecting section that detects a change in a connection reception state of a signal from a connected access point;
 a profile information acquisition section that acquires profile information necessary for connecting to an access point forming a service area in which the wireless communication apparatus is currently located and a service area different than the service area in which the wireless communication apparatus is currently located and located in a neighborhood of the service area in which the wireless communication apparatus is currently located;
 a priority order setting section that performs priority order setting for profile information acquired from the profile information acquisition section in the service area in which the wireless communication apparatus is currently located as profile information indicating an access point that is a next connection destination;
 a connection record information update section that updates an access point to which a connection was made at a previous time in a course of movement, as connection record information;
 a priority profile information selection section that selects highest-priority profile information; and
 an access point connection determination section that, when a connection reception level lower than a fixed value is detected by the state change detecting section, issues a connection request to an access point indicated by the highest-priority profile information selected by the priority profile information selection section from priority-ordered profile information;
 wherein the priority order setter uses information on the neighboring service area and information on the access point for which there is a connection record indicated by the connection record information, and when there are a plurality of access points located in the neighborhood of a connected access point as profile information for connecting to an access point located in a direction of movement, sets profile information indicating an access point for which there is no connection record in the course of movement so as to have highest priority.

2. The wireless communication apparatus according to claim 1, the processor further comprising a service area information acquisition section that acquires service area information indicating an access point forming the service area in which the wireless communication apparatus is currently located and a neighboring service area different from a service area in which the wireless communication apparatus is currently located, from a connected access point,
 wherein the profile information acquisition section acquires profile information necessary for connection to an access point corresponding to an access point of service area information acquired from an access point of the connection destination.

3. The wireless communication apparatus according to claim 2, wherein:
 the service area information acquisition section issues an information acquisition request to an access point present in a currently connected service area, and acquires information on a neighboring service area; and
 the priority profile information selection section, when a connection request by the access point connection determination section to an access point indicated by previously selected profile information is not permitted, selects next priority-ordered profile information for the profile information priority-ordered by the priority order setting section.

4. A base station apparatus serving as an access point connected to the wireless communication apparatus according to claim 2, the base station apparatus having a processor comprising:
 a service area information request receiver receiving section that receives a service area information acquisition request from the service area information acquisition section of the wireless communication apparatus; and
 a neighboring connection information reporting section that receives a service area information request, and reports, to the wireless communication apparatus that issued the service area information request, service area information indicating an access point forming the service area in which the wireless communication apparatus is currently located and the neighboring service area different from the service area in which the wireless communication apparatus is currently located.

5. The wireless communication apparatus according to claim 1, the processor further comprising a control section that, after completion of profile information acquisition by the profile information acquisition section, issues in advance a processing request for performing priority order setting to the priority order setting section, before movement to a service area different from the service area in which the wireless communication apparatus is currently located is started, in accordance with a drop in the connection reception level, wherein the priority profile information selection section selects highest-priority profile information from among priority-ordered profile information.

6. The wireless communication apparatus according to claim 1, wherein, when a connection request to the access point by the access point connection determination section has not been permitted:

the service area information acquisition section again collects service area information indicating the service area in which the wireless communication apparatus is currently located and a service area located in the neighborhood of the service area in which the wireless communication apparatus is currently located; and the priority order setting section performs priority order setting for profile information corresponding to again collected service area information.

7. The wireless communication apparatus according to claim 1, wherein the priority order setting section performs priority order setting in an order indicating an access point of a next-to-be-connected service area for acquired profile information of each service area in a service area in which the wireless communication apparatus is currently located; and the processor further comprising a control section that, when the connection reception level is lower than a fixed value, issues a probe request to an access point indicated by the highest-priority profile information selected by the priority profile information selection section from priority-ordered profile information, and performs a determination whether or not it is possible to connect to an access point that is an object of the probe request.

8. The wireless communication apparatus according to claim 1, wherein the priority order setting section performs priority order setting for profile information necessary for connection to an access point forming the service area in which the wireless communication apparatus is currently located and the service area present in the neighborhood of the service area in which the wireless communication apparatus is currently located respectively, the processor further comprising: a received radio field intensity acquisition section that issues, to an access point indicated by highest-priority profile information, a probe request using that profile information, and performs received radio field intensity measurement from a response from the access point corresponding to the probe request; and an access point connection determination section that determines whether or not it is possible to connect to a probe-request-destination access point using an acquired reception state, and if connection is possible, issues a connection request to the probe-request-destination access point.

9. An access point connection method that is an access point connection method of a wireless communication apparatus, the access point connection method comprising:

detecting a change in a connection reception state of a signal from a connected access point;

acquiring profile information necessary for connecting to an access point forming a service area in which the wireless communication apparatus is currently located and a service area different than the service area in which the wireless communication apparatus is currently and located in a neighborhood of the service area in which the wireless communication apparatus is currently located;

performing priority order setting for profile information acquired by the profile information acquiring in a service area in which the wireless communication apparatus is currently located as profile information indicating an access point that is a next connection destination;

updating an access point to which a connection was made at a previous time in a course of movement, as connection record information;

selecting highest-priority profile information; and when a connection reception level lower than a fixed value is detected by the detecting of a change in a connection reception state, issuing a connection request to an access point indicated by highest-priority profile information selected by the priority profile information selecting from priority-ordered profile information, wherein the priority order setting uses information on the neighboring service area and information on the access point for which there is a connection record indicated by the connection record information, and when there are a plurality of access points located in the neighborhood of a connected access point as profile information for connecting to an access point located in a direction of movement, sets profile information indicating an access point for which there is no connection record in the course of movement so as to have highest priority.

* * * * *